United States Patent
Knowles et al.

(10) Patent No.: US 7,040,540 B2
(45) Date of Patent: *May 9, 2006

(54) BAR CODE SCANNING SYSTEM WITH WIRELESS COMMUNICATION LINKS

(75) Inventors: Carl H. Knowles, Moorestown, NJ (US); George B. Rockstein, Audubon, NJ (US); David M. Wilz, Sr., Sewell, NJ (US); Stephen J. Colavito, Brookhaven, PA (US); Gennady Germaine, Cherry Hill, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 24 days.

This patent is subject to a terminal disclaimer.

(21) Appl. No.: 10/638,344

(22) Filed: Aug. 12, 2003

(65) Prior Publication Data

US 2004/0046031 A1    Mar. 11, 2004

Related U.S. Application Data

(60) Division of application No. 09/824,122, filed on Apr. 2, 2001, now Pat. No. 6,688,527, which is a continuation of application No. 09/346,859, filed on Jul. 2, 1999, now abandoned, which is a continuation of application No. 08/890,576, filed on Jul. 9, 1997, now Pat. No. 6,015,091, which is a continuation of application No. 08/292,237, filed on Aug. 17, 1994, now Pat. No. 5,808,285, and a continuation-in-part of application No. 07/898,919, filed on Jun. 12, 1992, now Pat. No. 5,340,973, which is a continuation-in-part of application No. 07/821,917, filed on Jan. 16, 1992, now abandoned, and a continuation-in-part of application No. 07/761,123, filed on Sep. 17, 1991, now Pat. No. 5,340,971, which is a continuation-in-part of application No. 07/583,421, filed on Sep. 17, 1990, now Pat. No. 5,260,553.

(51) Int. Cl.
*G06K 7/10* (2006.01)

(52) U.S. Cl. ............... 235/462.14; 235/462.2; 235/462.43; 235/462.45; 235/462.46; 235/472.01; 235/472.02

(58) Field of Classification Search ........... 235/462.46, 235/472.02, 462.45, 462.48, 462.14, 462.43, 235/462.44, 472.01, 462.2; 250/566
See application file for complete search history.

(56) References Cited

U.S. PATENT DOCUMENTS

| | | | |
|---|---|---|---|
| 3,793,636 | A | 2/1974 | Clark et al. |
| 3,806,131 | A | 4/1974 | Evans |
| 3,826,900 | A | 7/1974 | Moellering |
| 3,911,270 | A | 10/1975 | Traub |
| 3,925,639 | A | 12/1975 | Hester |
| 3,953,798 | A | 4/1976 | Sjostrand et al. |
| 3,961,198 | A * | 6/1976 | Aungst ................. 250/566 |
| 3,978,317 | A | 8/1976 | Yamaguchi et al. |
| 3,991,389 | A | 11/1976 | Dwire et al. |
| 4,005,388 | A | 1/1977 | Morley et al. |
| 4,016,532 | A | 4/1977 | Rose |
| 4,072,859 | A | 2/1978 | McWaters |
| 4,086,476 | A | 4/1978 | King |
| 4,090,135 | A | 5/1978 | Farstad et al. |
| 4,115,662 | A | 9/1978 | Guinet et al. |
| 4,136,821 | A | 1/1979 | Sugiura et al. |
| 4,160,156 | A | 7/1979 | Sherer |
| 4,184,116 | A | 1/1980 | Olson et al. |
| 4,232,299 | A | 11/1980 | Eisenberg |
| 4,240,064 | A | 12/1980 | DevChoudhury |
| 4,247,908 | A | 1/1981 | Lockhart, Jr. et al. |
| 4,251,798 | A * | 2/1981 | Swartz et al. ............ 235/462.2 |
| 4,387,297 | A | 6/1983 | Swartz et al. |
| 4,409,470 | A | 10/1983 | Shepard et al. |
| 4,415,065 | A | 11/1983 | Sandstedt |
| 4,418,277 | A | 11/1983 | Tremmel et al. |
| 4,431,912 | A | 2/1984 | Dickson et al. |
| 4,460,120 | A | 7/1984 | Shepard et al. |
| 4,496,831 | A | 1/1985 | Swartz et al. |
| 4,521,678 | A | 6/1985 | Winter |
| 4,570,057 | A | 2/1986 | Chadima, Jr. et al. |
| 4,575,625 | A | 3/1986 | Knowles ................. 235/462.3 |
| 4,588,881 | A | 5/1986 | Pejas et al. |
| 4,603,262 | A | 7/1986 | Eastman et al. ............ 250/566 |

| | | | | | | |
|---|---|---|---|---|---|---|
| 4,639,606 A | | 1/1987 | Boles et al. | 5,880,452 A * | 3/1999 | Plesko ................... 235/472.01 |
| 4,672,658 A | | 6/1987 | Kavehrad | 5,928,292 A | 7/1999 | Miller et al. .................... 701/1 |
| 4,673,805 A | | 6/1987 | Shepard et al. | 5,939,701 A * | 8/1999 | Rockstein et al. ..... 235/472.01 |
| 4,736,095 A | | 4/1988 | Shepard et al. | 5,949,056 A | 9/1999 | White ................... 235/472.01 |
| 4,751,500 A | | 6/1988 | Minasy et al. | 5,962,837 A | 10/1999 | Main et al. ............ 235/462.44 |
| 4,766,297 A | | 8/1988 | McMillan | 5,979,766 A * | 11/1999 | Rockstein et al. ..... 235/462.46 |
| 4,766,299 A | | 8/1988 | Tierney et al. | 6,015,091 A * | 1/2000 | Rockstein et al. ..... 235/472.01 |
| 4,789,983 A | | 12/1988 | Acampora et al. | 6,053,413 A | 4/2000 | Swift et al. ............ 235/472.01 |
| 4,793,812 A | * | 12/1988 | Sussman et al. ............. 434/116 | 6,138,914 A * | 10/2000 | Campo et al. ......... 235/472.01 |
| 4,800,444 A | * | 1/1989 | Suzuki et al. ................ 358/473 | 6,412,699 B1 | 7/2002 | Russell et al. ......... 235/472.01 |
| 4,816,660 A | | 3/1989 | Swartz et al. .......... 235/462.21 | 6,460,769 B1 * | 10/2002 | Knowles et al. ....... 235/472.01 |
| 4,825,057 A | | 4/1989 | Swartz et al. .......... 235/472.01 | 6,536,670 B1 * | 3/2003 | Postman et al. ............ 235/487 |
| 4,829,540 A | | 5/1989 | Waggener, Sr. et al. | 6,761,317 B1 * | 7/2004 | Knowles et al. ....... 235/472.01 |
| 4,841,132 A | | 6/1989 | Kajitani | 2002/0113129 A1* | 8/2002 | Metlitsky et al. ...... 235/462.44 |
| 4,845,349 A | | 7/1989 | Cherry | 2002/0125324 A1* | 9/2002 | Yavid et al. ........... 235/462.45 |
| 4,850,009 A | | 7/1989 | Zook et al. | 2003/0019938 A1* | 1/2003 | Byun et al. ............ 235/462.43 |
| 4,870,391 A | | 9/1989 | Cooper | | | |
| 4,877,949 A | | 10/1989 | Danielson et al. .......... 235/462 | FOREIGN PATENT DOCUMENTS | | |
| 4,897,532 A | | 1/1990 | Swartz et al. ................ 235/467 | JP | 3-233785 | 10/1991 |
| D305,885 S | | 2/1990 | Barkan et al. | JP | 3-266195 | 11/1991 |
| 4,916,441 A | | 4/1990 | Gombrich | | | |
| D307,894 S | | 5/1990 | Siemiatkowski | | | |

OTHER PUBLICATIONS

"Hand-Held Halographic Scanner Having Highly Visible Locator Beam" R. T. Cato, published in IBM Technical Disclosure Bulletin, vo. 27, No. 4A, Jul. 1989.

Sales brochure entitled "Depth of Field" by Metrologic Instruments, Inc. of Blackwood, NJ, dated 1991, no month.

Sales brochure entitled "Stands, Holders and Accessories" Oct. 1989.

* cited by examiner

*Primary Examiner*—Karl D. Frech
*Assistant Examiner*—Allyson N Trail

(57) ABSTRACT

A code symbol reading device includes a portable housing that contains a source of optical energy. This optical energy is projected into a scan field external to the housing and is incident upon a code symbol situated on an object located within the scan field. Optical energy reflected off the code symbol is detected within the housing to produce scan data that is indicative of the detected optical energy. The scan data is processed to detect and decode the code symbol and to produce symbol character data that are representative of the decoded code symbol. A data packet utilizing the symbol character data is constructed and then used to modulate an electromagnetic carrier sign that is transmitted to a base unit. At the base unit, the carrier signal is demodulated and the data packet is recovered. The received data packet is processed to recover the symbol character data, and an acknowledgment signal is generated to acknowledge the receipt of the symbol character data at the base unit.

8 Claims, 55 Drawing Sheets

| | | | |
|---|---|---|---|
| 4,930,848 A | | 6/1990 | Knowles |
| 4,933,538 A | | 6/1990 | Heiman et al. |
| 4,970,379 A | | 11/1990 | Danstrom |
| 5,017,765 A | | 5/1991 | Shepard et al. |
| 5,029,183 A | | 7/1991 | Tymes |
| 5,059,777 A | | 10/1991 | Wittensoldner et al. |
| 5,065,003 A | | 11/1991 | Wakatsuki et al. |
| 5,086,215 A | | 2/1992 | Carsner et al. |
| 5,105,070 A | | 4/1992 | Wike, Jr. et al. |
| 5,107,100 A | | 4/1992 | Shepard et al. |
| 5,132,523 A | | 7/1992 | Bassett |
| 5,142,131 A | | 8/1992 | Collins, Jr. et al. |
| 5,148,009 A | | 9/1992 | Lindacher |
| 5,157,687 A | * | 10/1992 | Tymes ........................ 375/140 |
| 5,180,904 A | | 1/1993 | Shepard et al. |
| 5,189,291 A | | 2/1993 | Siemiatkowski |
| 5,210,398 A | | 5/1993 | Metlitsky |
| 5,214,270 A | | 5/1993 | Rando |
| 5,216,231 A | | 6/1993 | Ouchi |
| 5,237,161 A | | 8/1993 | Grodevant |
| 5,250,790 A | | 10/1993 | Melitsky et al. |
| 5,329,106 A | | 7/1994 | Hone et al. |
| 5,334,821 A | | 8/1994 | Campo et al. |
| 5,340,971 A | | 8/1994 | Rockstein et al. |
| 5,340,973 A | | 8/1994 | Knowles et al. |
| 5,361,871 A | * | 11/1994 | Gupta et al. ................... 186/61 |
| 5,378,860 A | * | 1/1995 | Dingfelder et al. ...... 177/25.19 |
| 5,404,001 A | | 4/1995 | Bard |
| 5,412,193 A | * | 5/1995 | Swartz et al. ................ 235/383 |
| 5,479,441 A | | 12/1995 | Tymes et al. ................ 375/200 |
| 5,539,194 A | | 7/1996 | Miller et al. ........... 235/472.02 |
| 5,607,187 A | * | 3/1997 | Salive et al. .................. 283/67 |
| 5,668,803 A | | 9/1997 | Tymes et al. ................ 370/312 |
| 5,691,528 A | | 11/1997 | Wyatt et al. ............ 235/462.07 |
| 5,763,867 A | | 6/1998 | Main et al. ............ 235/462.46 |
| 5,808,285 A | | 9/1998 | Rockstein et al. |
| 5,811,786 A | | 9/1998 | Rockstein et al. |
| 5,844,229 A | * | 12/1998 | Rockstein et al. ..... 235/472.01 |

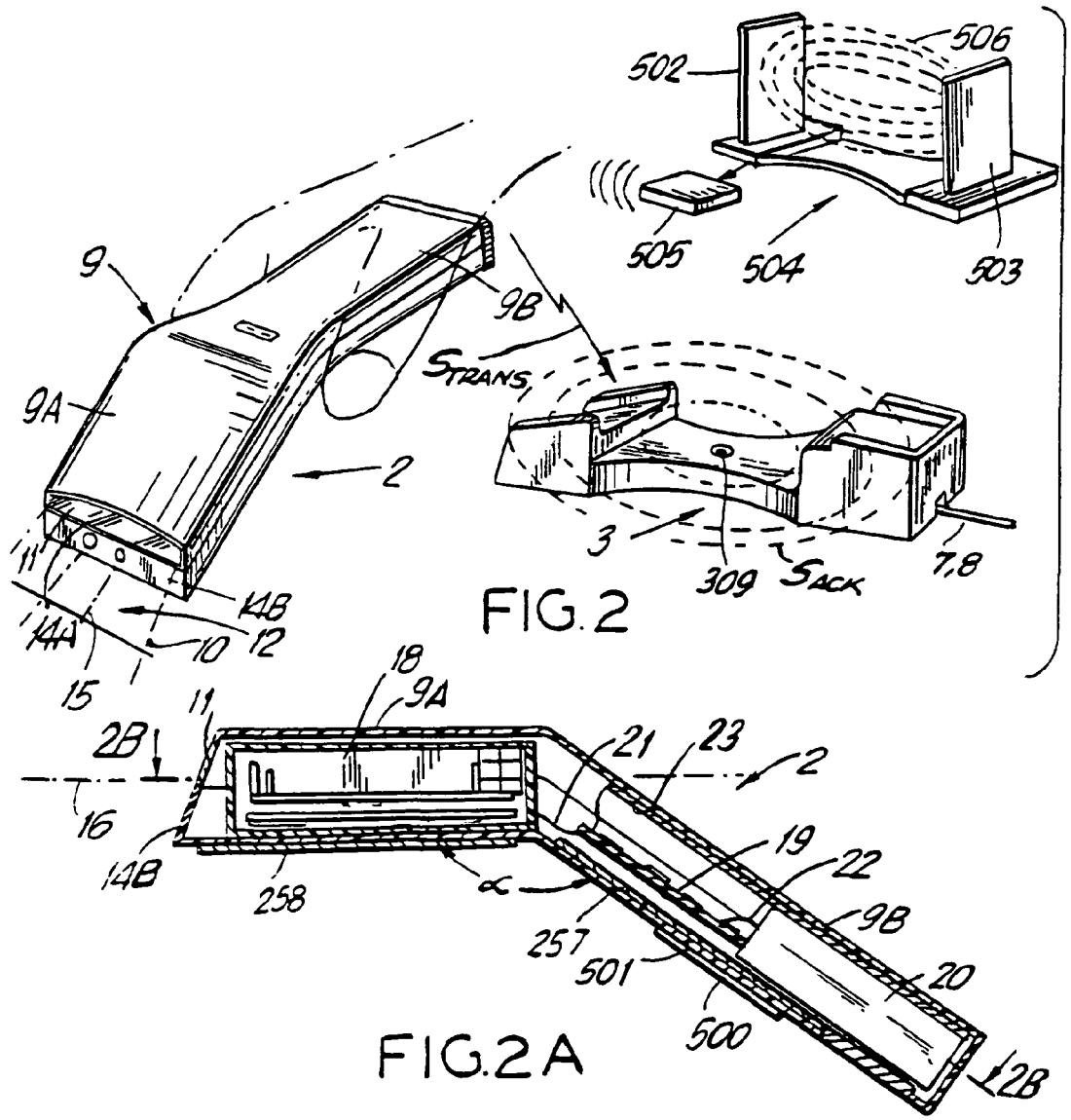
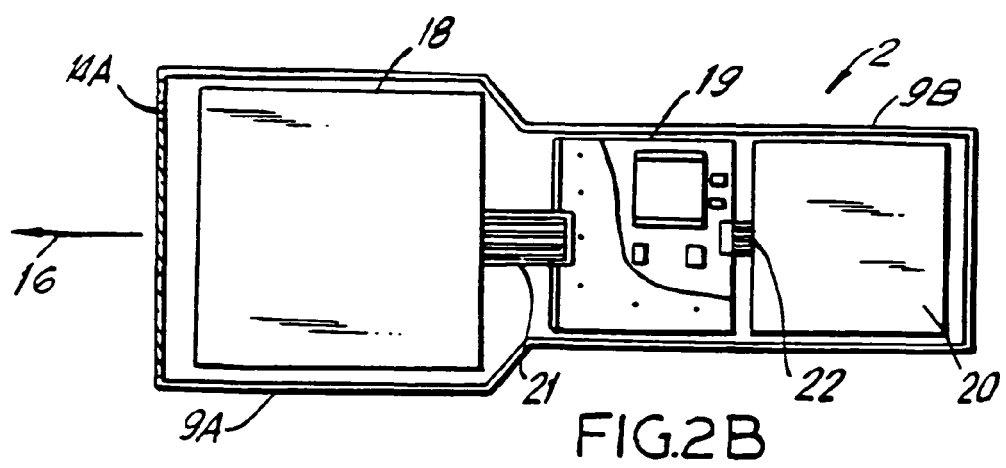

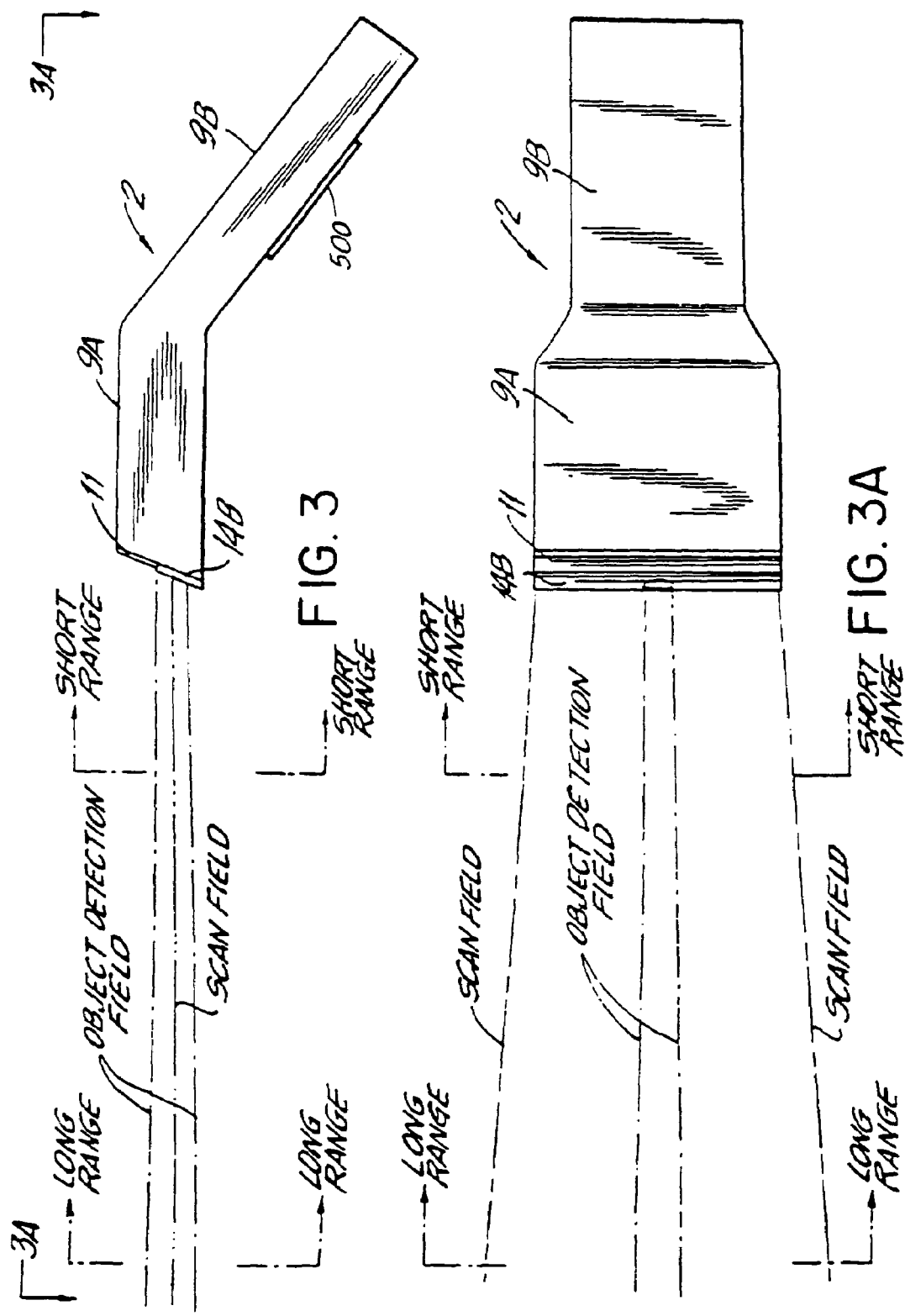

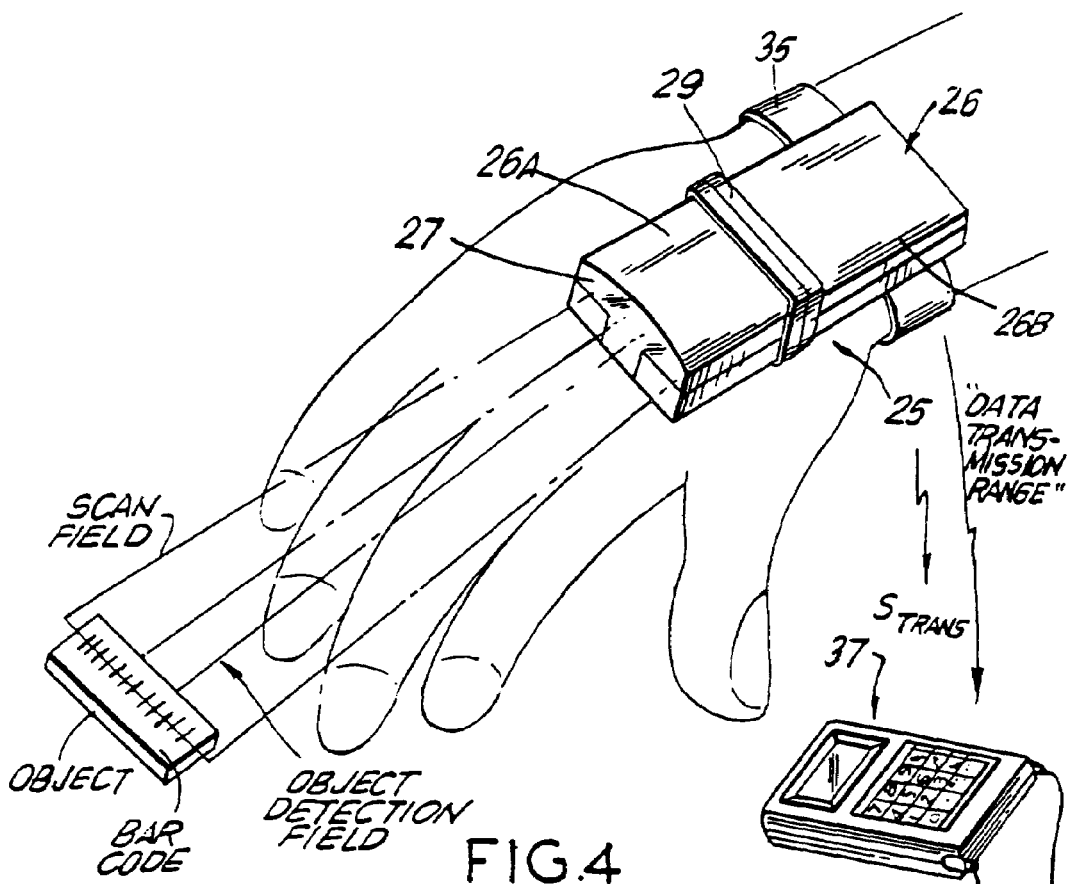
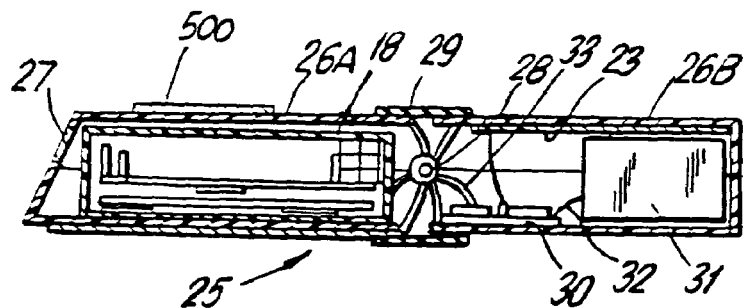
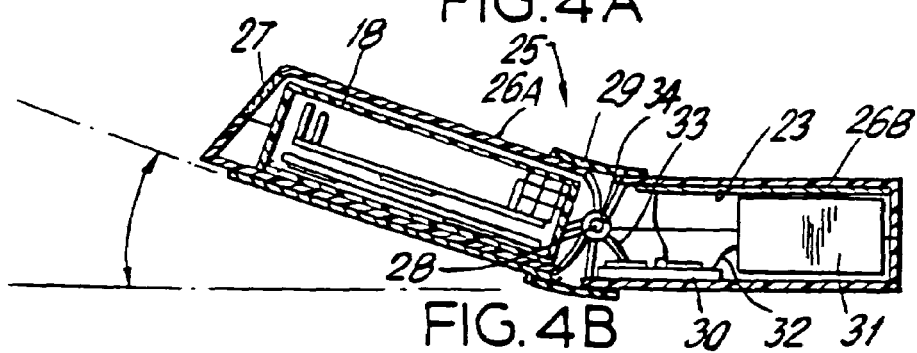

$$E_0 = \overline{(B + A_0)(C_3/C_2 - 1)}$$
$$E_1 = (C_3/C_2 - 2) + B$$
$$E_2 = (C_2/C_1)(T_1)$$

| R | $C_3/C_2-1$ | $C_3/C_2-2$ | $E_3$ | $C_2/C_1$ |
|---|---|---|---|---|
| 0 | X | X | $A_{2L}$ | 0 |
| 1 | 0 | 0 | $A_{2L}$ | 0 |
| 1 | 0 | 1 | $A_{2S}$ | 0 |
| X | 1 | 1 | X | 1 |
| | | X = DON'T CARE | | |

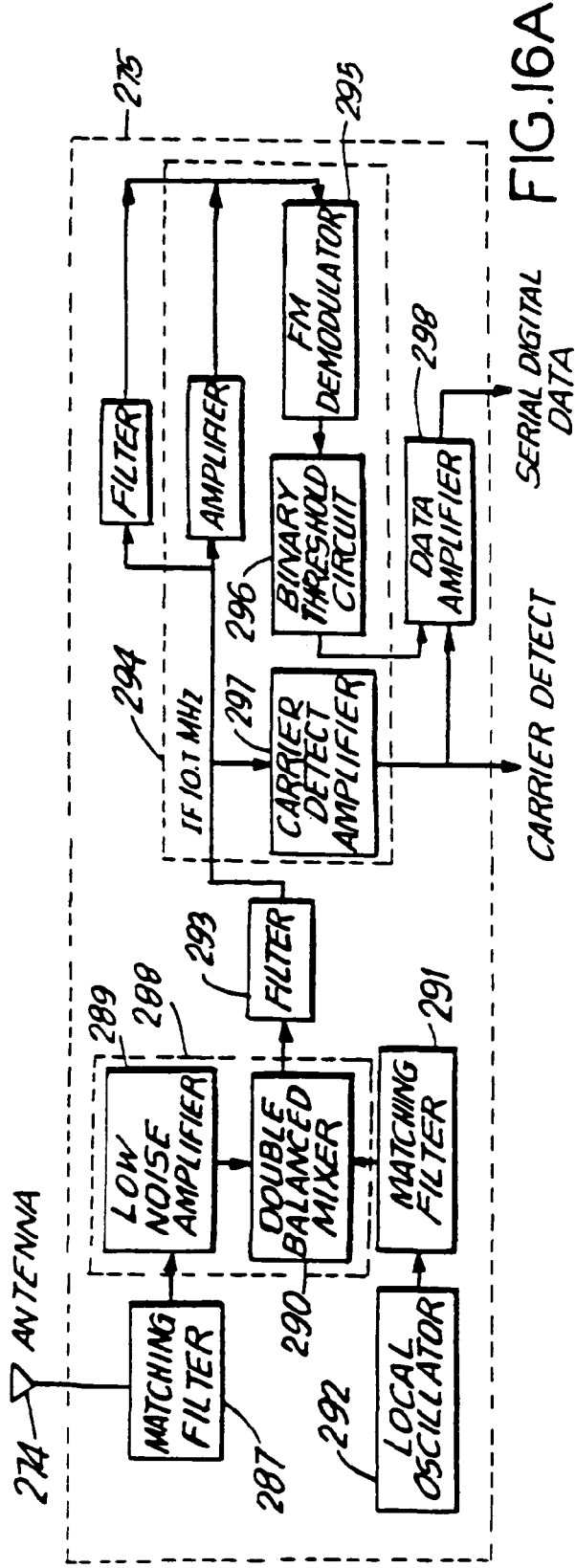
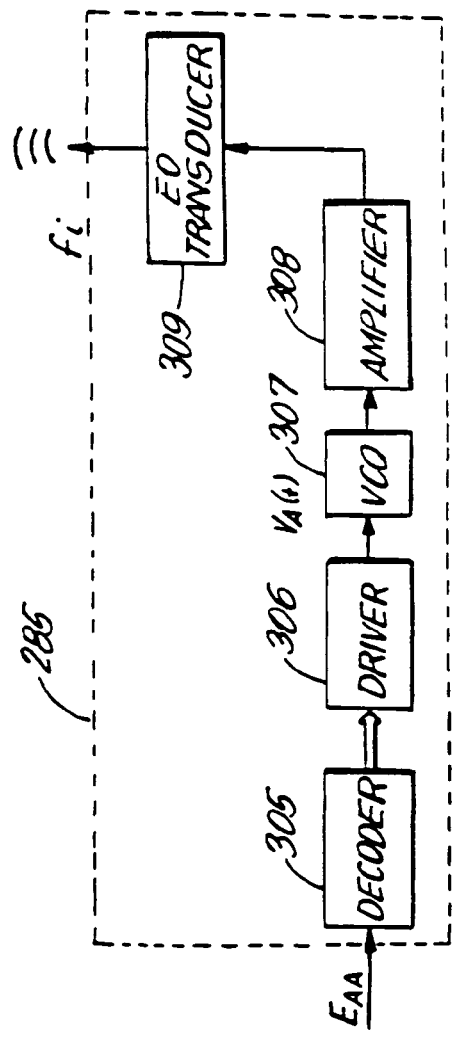
FIG.16A
FIG.16B

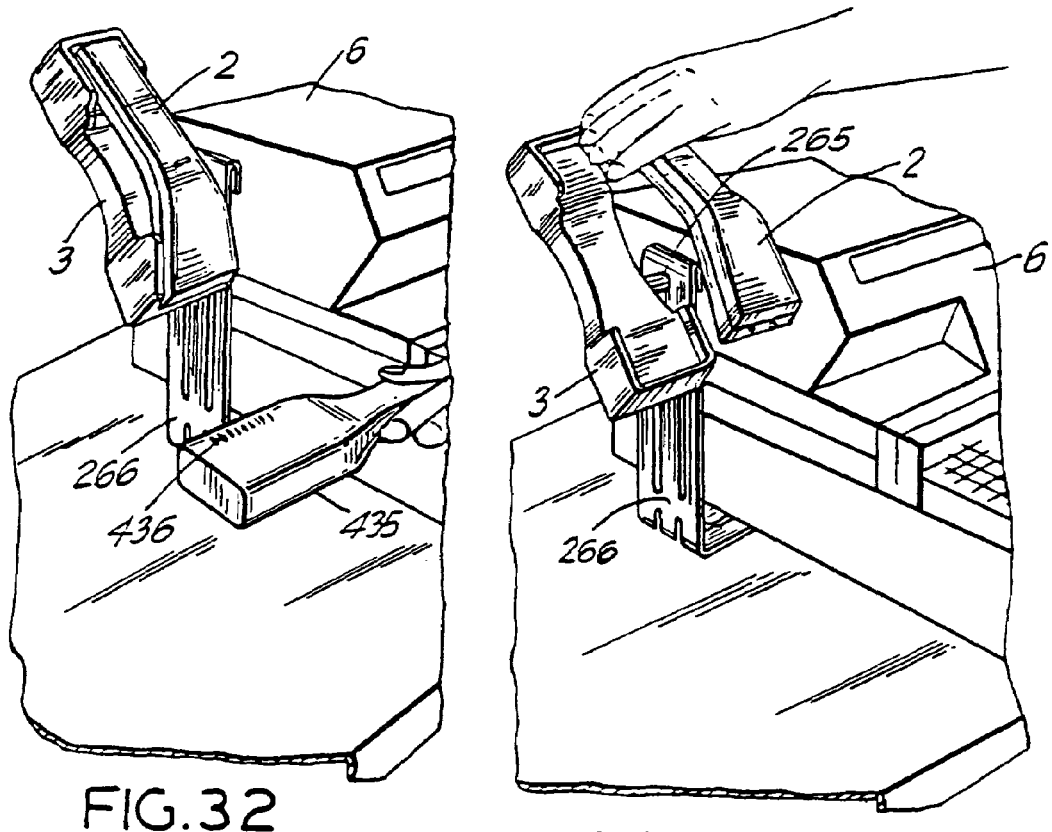
FIG. 32
FIG. 33A
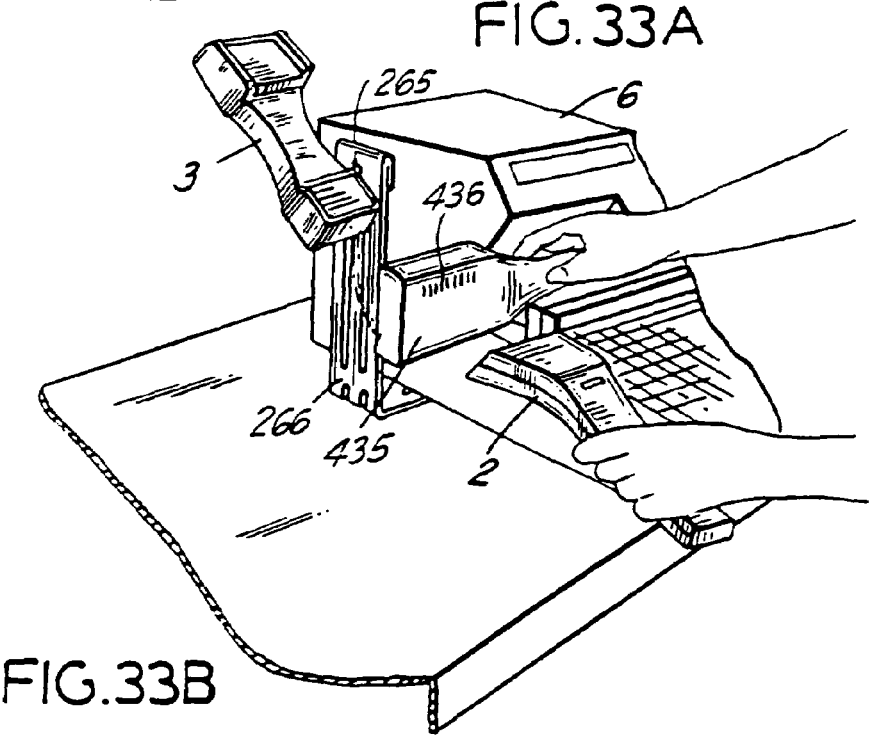
FIG. 33B

BAR CODE SCANNING SYSTEM WITH WIRELESS COMMUNICATION LINKS

RELATED APPLICATIONS

This is a Divisional of patent application Ser. No. 09/824,122 filed on now U.S. Pat. No. 6,688,527 Apr. 2, 2001, which is a Continuation of patent application Ser. No. 09/346,859, filed on Jul. 2, 1999 now abandoned, which is a Continuation of patent application Ser. No. 08/890,576 filed on Jul. 9, 1997, now issued as U.S. Pat. No. 6,015,091 on Jan. 18, 2000, which is a Continuation of patent application Ser. No. 08/292,237 filed on Aug. 17, 1994, now issued as U.S. Pat. No. 5,808,285; said patent application Ser. No. 08/292,237 being a Continuation-In-Part of patent application Ser. No. 07/898,919, filed Jun. 12, 1992, now issued as U.S. Pat. No. 5,340,973, a Continuation-In-Part of patent application Ser. No. 07/821,917, filed on Jan. 16, 1992, now abandoned, and a Continuation-In-Part of patent application Ser. No. 07/761,123, filed Sep. 17, 1991, now issued as U.S. Pat. No. 5,340,971; said patent application Ser. No. 07/761,123 being a Continuation-In-Part of patent application Ser. No. 07/583,421, filed on Sep. 17, 1990, and now issued as U.S. Pat. No. 5,260,553.

BACKGROUND OF THE INVENTION

1. Field of the Invention

The present invention relates generally to bar code symbol reading systems and, more specifically, to systems having one or more base stations and one or more hand-held bar code symbol readers equipped to communicate with these base stations.

2. Brief Description of the Prior Art

Bar code symbols have become widely used in many commercial environments including point-of-sale (POS) stations in retail stores and supermarkets, inventory and document tracking, and diverse data control applications. To meet the growing demands of this technological innovation, bar code symbol readers of various types have been developed for scanning and decoding bar code symbol patterns, and for producing symbol character data to be used as input in automated data processing systems.

In general, prior art hand-held bar code symbol readers using laser scanning mechanisms can be classified into two major categories. The first category includes manually-actuated trigger-operated systems having lightweight laser scanners which can be held in a user's hand. The user positions the hand-held laser scanner at a specified distance from an object bearing a bar code symbol. Next, the user manually activates the scanner to initiate reading, and then moves the scanner over other objects bearing bar code symbols to be read. Prior art bar code symbol readers illustrative of this first category are disclosed in U.S. Pat. Nos. 4,387,297 to Swartz; 4,575,625 to Knowles; 4,845,349 to Cherry; 4,825,057 to Swartz, et al.; 4,903,848 to Knowles; 5,107,100 to Shepard, et al.; 5,080,456 to Katz, et al.; and 5,047,617 to Shepard, et al.

The second category of hand-held laser-based bar code symbol readers includes automatically actuated systems having lightweight triggerless hand-held laser scanners which can be supported in the hand of the user. The user positions the hand-held laser scanner at a specified distance from the object bearing the bar code, whereupon the presence of the object is automatically detected. The presence of the bar code symbol on the object is also detected, and thereafter the detected bar code symbol automatically read. Prior art illustrative of this second category of laser-based bar code symbol reading systems are disclosed in U.S. Pat. Nos. 4,639,606 to Boles, et al., and 4,933,538 to Heiman, et al.

Presently, there are basically two methods of interconnecting a hand-held laser-based bar code scanner to a base station which, depending on the particular application, may be either a controller, a keyboard-scanner interface device, or a central or host computer. The first method of interconnection employs physical wiring between each hand-held bar code scanner and an associated base unit. Typically, the physical wiring is realized as flexible cord having a coiled structure to permit elongation as required during bar code symbol reading operations.

A major drawback with bar code symbol reading systems using the physical-wiring method of interconnection is that the movement of the portable hand-held laser scanning device is restricted by the overall (extended) length of the flexible cord. In many applications, such as product inventory, the use of such bar code symbol reading systems is simply unacceptable. The second method of interconnection employs a "wireless" electromagnetic communication link between each hand-held bar code scanner (or reader) and its associated base unit. Typically, the electromagnetic communication link is established by transmitting and receiving electromagnetic signals over the radio-frequency (RF) or infra-red (IR) region of the electromagnetic spectrum. Examples of such systems are disclosed in U.S. Pat. Nos. 4,418,277 to Tremmel, et al. and 5,157,687 to Tymes, and in the U.S. Patents cited therein.

While prior art bar code symbol reading systems employing the wireless method of interconnection offer a marked degree of flexibility over systems utilizing the physical wiring method, such systems nevertheless suffer from a number of shortcomings and drawbacks. In particular, these systems require two-way packet communications which involves the use of complex data communications protocols and a separate transmitter and a receiver (i.e., transceiver) at each hand-held bar code symbol reader and base unit in the system. Typically, these data communications requirements increase the cost of manufacture of such systems, and substantially increase the electrical power consumed by each hand-held bar code symbol reader.

Thus, there is a great need for a bar code symbol reading system and method which overcomes the above-described shortcomings and drawbacks without compromising system performance and versatility.

OBJECTS AND SUMMARY OF THE INVENTION

Accordingly, it is a primary object of the present invention to provide a bar code symbol reading system having at least one hand-supportable bar code symbol reading device which, after successfully reading a code symbol, automatically constructs and then transmits a data packet to a base unit positioned within the data transmission range of the bar code symbol reading device.

It is another primary object of the invention to provide a bar code symbol reading system which, upon successful receipt of the transmitted data packet and recovery of symbol character data therefrom, employs a base unit that generates an acoustical acknowledgment signal. This acknowledgment signal is perceptible to a user of the bar code symbol reading device who is located within the data transmission range thereof.

A further object of the present invention is to provide such a system with one or more automatic (i.e., triggerless) hand-supportable laser-based bar code symbol reading devices, each of which is capable of automatically transmitting data packets to its base unit after successfully reading a bar code symbol.

A further object of the present invention is to provide such a bar code symbol reading system in which the hand-supportable bar code symbol reading device can be used as a portable hand-supported laser scanner in an automatic hands-on mode of operation, or as a stationary laser projection scanner in an automatic hands-free mode of operation.

A further object of the present invention is to provide such a bar code symbol system, in which the base unit is adapted to mechanically support the hand-supportable bar code symbol reading device in its automatic hands-free mode of operation.

A further object of the present invention is to provide such a bar code symbol system in which the base unit contains a battery recharging device that automatically recharges batteries contained in the hand-supportable device when the hand-supportable device is supported within the base unit.

It is another object of the present invention to provide such an automatic bar code symbol reading system with a mode of operation that permits the user to automatically read one or more bar code symbols on one or more objects in a consecutive manner.

A further object of the present invention is to provide such an automatic bar code symbol reading system, in which a plurality of automatic hand-supportable bar code symbol reading devices are used in conjunction with a plurality of base units, each of which is mated to a particular bar code symbol reading device.

A further object of the present invention is to provide such an automatic bar code symbol reading system, in which radio frequency (RF) carrier signals of the same frequency are used by each hand-supportable bar code symbol reading device to transmit data packets to respective base units.

A further object of the present invention is to provide such an automatic bar code symbol reading system, in which a novel data packet transmission and reception scheme is used to minimize the occurrence of data packet interference at each base unit during data packet reception.

A further object of the present invention is to provide such an automatic bar code symbol reading system, in which the novel data packet transmission and reception scheme enables each base unit to distinguish data packets associated with consecutively different bar code symbols read by a particular bar code symbol reading device, without the transmission of electromagnetically-based data packet acknowledgment signals after receiving each data packet at the base unit.

A further object is to provide such an automatic bar code symbol reading device, in which the automatic hand-supportable bar code (symbol) reading device has an infrared (IR) based object detection field which spatially encompasses at least a portion of its visible laser light scan field along the operative scanning range of the device, thereby improving the laser beam pointing efficiency of the device during the automatic bar code reading process of the present invention.

Another object of the present invention is to provide such an automatic bar code symbol reading system, in which the base unit has a support frame that supports the hand-supportable housing of the device in a selected mounting position, and permits complete gripping of the handle portion of the hand-supportable housing prior to removing it from the support frame.

A further object of the present invention is to provide such an automatic bar code symbol reading system, in which the hand-supportable bar code reading device has long and short-range modes of object detection, bar code symbol detection and/or bar code symbol reading. The long and short range modes of object detection may be manually selected by the user by way of manual activation of a switch on the hand-supportable housing of the device. In one illustrative embodiment, the long-range modes of object detection may be automatically selected when the hand-supportable bar code reading device is placed within the support stand during the hands-free mode of operation. In this embodiment, the short-range mode of object detection is automatically selected whenever the hand-supportable bar code reading device is removed from the support stand and used in its hands-on mode of operation.

In another embodiment, the short range mode of bar code presence detection may be automatically selected upon decoding a predesignated bar code symbol preprogrammed to induce the short-range mode of bar code presence detection. In the short-range mode of bar code presence detection, the automatic bar code reading device not only detects the presence of a bar code within the scan field by analysis of collected scan data, but it further processes the collected scan data to produce digital count data representative of the measured time interval between bar and/or space transitions. Bar code symbols that are present within the short range of the scan field will produce scan data having time interval characteristics falling within a prespecified timing data range. Using the results of this analysis, only bar code symbols scanned within the short-range field are deemed "detected," and only bar code symbols detected within the short-range of the scan field activate the decoding module of the device and thus enable bar code symbol reading.

A further object of the present invention is to provide such an automatic bar code symbol reading system, in which the hand-supportable bar code reading device has long and short range modes of bar code symbol reading within its scan field. In the short-range mode of bar code symbol reading, the only decoded bar code symbols residing within the short-range portion of the scan field, are deemed "read".

Another object of the present invention is to provide an automatic hand-supportable bar code reading device which has both long and short-range modes of object detection and bar code symbol reading that are automatically selectable by placing the hand-supportable device within its support stand and removing it therefrom. Pursuant to this particular embodiment of the present invention, the automatic bar code symbol reading system can be used in various bar code symbol reading applications, such as, for example, charge coupled device (CCD) scanner emulation and bar code "menu" reading in the hands-on short-range mode of operation, and counter-top projection scanning in the hands-free long-range mode of operation.

An even further object of the present invention is to provide an automatic hand-supportable bar code reading device which prevents multiple reading of the same bar code symbol due to dwelling of the laser scanning beam upon a bar code symbol for an extended period of time.

A further object of the present invention is to provide a point-of-sale station incorporating the automatic bar code symbol reading system of the present invention.

It is a further object of the present invention to provide an automatic hand-supportable bar code reading device having a control system which has a finite number of states through which the device may pass during its automatic operation, in response to diverse conditions automatically detected within the object detection and scan fields of the device.

It is yet a further object of the present invention to provide a portable, fully automatic bar code symbol reading system which is compact, simple to use and versatile.

Yet a further object of the present invention is to provide a novel method of reading bar code symbols using an automatic hand-supportable laser scanning device.

A further object of the present invention is to provide a wireless automatic bar code symbol reading device having a housing that can be comfortably mounted to the wrist of its user, similar to a wrist bracelet or a watch, and which can be reconfigured when not in use to provide its user greater hand mobility.

A further object of the present invention is to provide such a bar code symbol reading, in which the laser scanning plane thereof extends upwardly, downwardly, or laterally transverse to the pointing direction of the wearer's hand on which the device is mounted.

A further object of the present invention is to provide such a bar code symbol reading system, in which the base unit functions as a "desktop wedge" (i.e., keyboard interface device) for interfacing a keyboard and the bar code symbol reading device with a computer, so that "keyboard-scan formatted" data produced from the keyboard and the bar code reading device is identically formatted for entry into the computer through a single data input port, and subsequent processing therein.

A further object of the present invention is to provide a desk-top bar code symbol reading having a base unit with a small bar code symbol printing engine.

An even further object of the invention is to provide such a bar code reading system, in which the base unit is realized as a PCMCIA card installable in the PCMCIA port of personal computer system, including notebook computers, palm top computers, personal digital assistant devices, desktop computers and the like.

A further object of the present invention is to provide a point-of-sale station incorporating the automatic bar code symbol reading system of the present invention.

These and further objects of the present invention will become apparent hereinafter and in the claims.

BRIEF DESCRIPTION OF THE DRAWINGS

For a fuller understanding of the Objects of the Present Invention, the Detailed Description of the Illustrated Embodiments of the Present Invention should be read in conjunction with the accompanying drawings, wherein:

FIG. 2 is a perspective view of the first illustrative embodiment of the automatic hand supportable bar code symbol reading device of the present invention, demonstrated in the automatic hands-on mode of operation;

FIG. 2A is an elevated, cross-sectional side view taken along the longitudinal extent of the automatic bar code symbol reading device of FIG. 2, showing the various components contained therein, including the automatic bar code symbol reading engine of the present invention;

FIG. 2B is a cross-sectional plan view taken along line 2B—2B of FIG. 2A, showing the various components contained therein;

FIG. 3 is an elevated side view of the first illustrative embodiment of the automatic bar code symbol reading device of the present invention, illustrating the spatial relationship between the object detection and scan fields of the device, and the long and short-ranges of programmed object detection, bar code presence detection, and bar code symbol reading;

FIG. 3A is a plan view of the automatic bar code symbol reading device taken along line 3A—3A of FIG. 3;

FIG. 4 is a perspective view of a second illustrative embodiment of the automatic bar code symbol reading device of the present invention, shown mounted on the wrist of an operator with its object and scan fields extending along the pointing direction of the operator's hand during automatic hands-free operation;

FIG. 4A is an elevated, cross-sectional side view of the automatic bar code symbol reading device of FIG. 4, taken along the longitudinal extent thereof, while configured in its reading configuration, showing the various components contained therein;

FIG. 4B is an elevated, cross-sectional side view of the automatic bar code symbol reading device of FIG. 4, taken along the longitudinal extent thereof, while configured in its non-reading configuration, showing the various components contained therein, including the automatic bar code symbol reading engine of the present invention;

FIG. 16A is a functional block diagram of the radio receiver subcircuit of the data packet receiving circuit of FIG. 16;

FIG. 16B is a functional block diagram of the digitally controlled acoustical acknowledgment signal generating circuit of the present invention;

FIG. 32 is a perspective view of a point-of-sale station according to the present invention, showing the countertop base unit of FIG. 15C pivotally supported above a horizontal counter surface by way of a pedestal base mounted under an electronic cash register, and the automatic hand-supportable bar code symbol reading device of FIG. 1 received in the base unit while being used in its automatic "hands-free" long-range mode of operation; and FIGS. 33A and 33B are perspective views of a point-of-sale station according to the present invention, showing the counter-top base unit of FIG. 15C pivotally supported above a horizontal counter surface by way of a pedestal base, and the automatic hand-supportable bar code symbol reading device being used in its automatic "hands-on" short range mode of operation.

DESCRIPTION OF THE ILLUSTRATIVE EMBODIMENTS OF THE PRESENT INVENTION

In FIGS. 1 to 6D, four different embodiments of the automatic hand-supportable bar code symbol reading system of the present invention are shown. FIGS. 1 to 3A illustrate a first embodiment of the automatic bar code symbol reading system. In FIGS. 4 to 4B, a second embodiment of the automatic bar code symbol reading system is shown. FIGS. 5 to 5C illustrate a third embodiment of the automatic bar code symbol reading system. In FIGS. 6A to 6D, a fourth embodiment of the automatic bar code symbol reading system is shown. For each of these systems, the hand-supportable bar code symbol reading device includes the automatic bar code symbol reading engine of the present invention as shown in FIGS. 7A to 7F and schematically illustrated in FIGS. 8 to 9. The operation of these embodiments of the automatic bar code symbol reading device of the present invention will now be described with reference to FIGS. 10 to 14.

As there are numerous possible embodiments of the automatic bar code symbol reading device of the present invention, there are also numerous possible embodiments of the base unit of the present invention. For exemplary purposes only, four illustrative embodiments of the base unit are shown in FIGS. 15A to 26. In FIGS. 15A to 17, a first embodiment of the base unit is illustrated. FIGS. 18A to 20D illustrate a second embodiment of the base unit. In FIGS. 21A to 23, a third embodiment of the base unit is illustrated. FIGS. 24A to 26 show a fourth embodiment of the base unit. In FIGS. 27 to 30, a fifth embodiment of the base unit is illustrated. Each of these illustrative embodiments of the present invention will be described in greater detail hereinafter to enable one with ordinary skill in the art to practice the same in diverse user environments.

Figure 1:
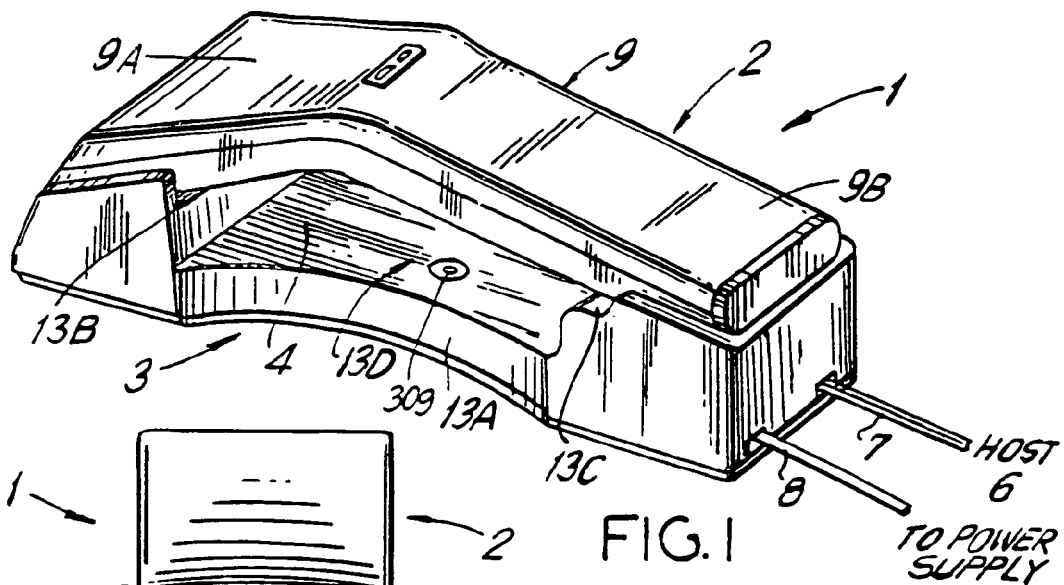
FIG. 1 is a perspective view of a first illustrative embodiment of the automatic bar code symbol reading device of the present invention, shown supported within the scanner support stand portion of its matching base unit, for automatic hands-free operation.
Figure 1A:
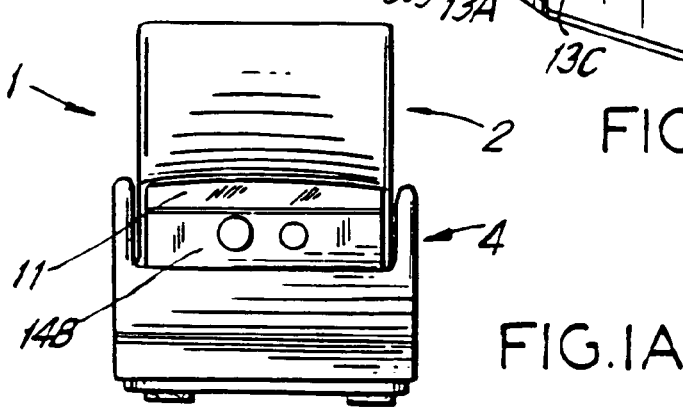
FIG. 1A is an elevated front view of the automatic bar code symbol reading device of FIG. 1, shown supported within the scanner support stand portion of its base unit.
Figure 1B:
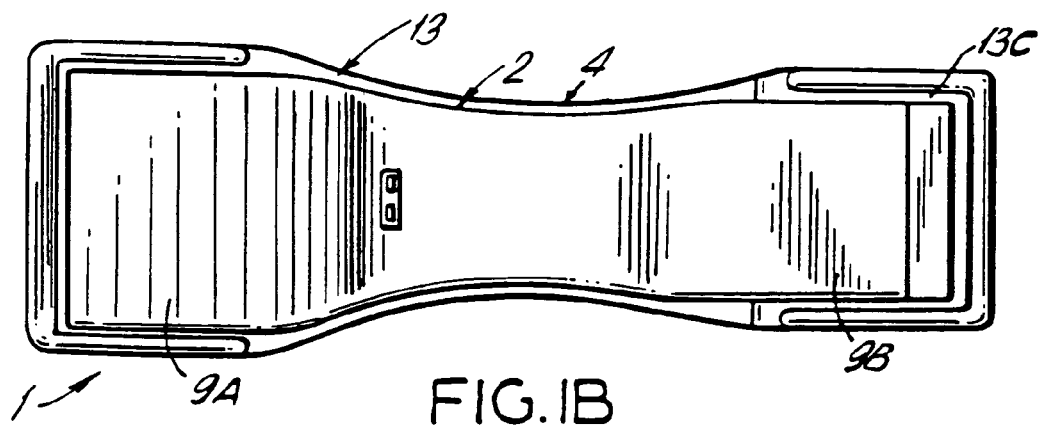
FIG. 1B is a plan view of the automatic bar code symbol reading system shown in FIG. 1.

As shown in FIGS. 1 to 2, automatic bar code symbol reading system 1 comprises an automatic (i.e., triggerless) portable bar code (symbol) reading device 2 operably associated with a base unit 3 having a scanner support stand 4. Bar code symbol reading device 2 is operably coupled with its base unit 3 by way of a one way electromagnetic link 5 that is momentarily created between bar code symbol reading device 2 and its mated base unit 3 after the successful reading of each bar code symbol by the bar code symbol reading device. Operable interconnection between the base unit and a host computer system (e.g., electronic cash register system, data collection device, etc.) 6 is achieved by a flexible multiwire communications cable 7 extending from the base unit and plugged directly into the the data-input communications port of the host computer system 6. In the illustrative embodiment, electrical power from a low voltage direct current (DC) power supply (not shown) is provided to the base unit by way of a flexible power cable 8. Notably, this DC power supply can be realized in host computer system 6 or as a separate DC power supply adapter insertable into a conventional 3-prong, 117-volt AC electrical outlet. As will be described in greater detail hereinafter, a rechargeable battery power supply unit is contained with bar code symbol reading device 2 in order to power the electrical and electro-optical components within the device.

Figure 1C:
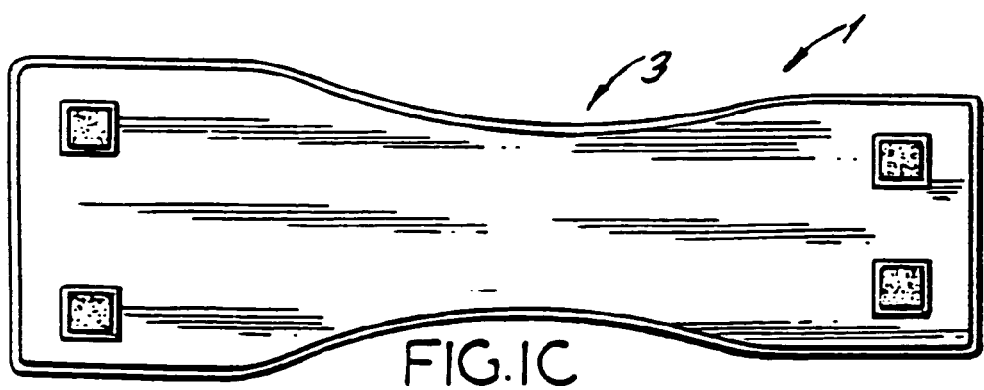
FIG. 1C is a bottom view of the automatic bar code symbol reading system shown in FIG. 1.

As illustrated in FIG. 1 through 1C, scanner support stand 4 is adapted for receiving and supporting portable bar code symbol reading device 2 in a selected position without user support, thus providing a stationary, automatic hands-free mode of operation. In general, portable bar code reading device 2 includes a lightweight, hand-supportable housing 9 having a contoured head portion 9A and a handle portion 9B. As will be described in greater detail hereinafter, head portion 9A encloses electro-optical components which are used to generate and project a visible laser beam 10 through a light transmissive window 11 in housing head portion 9A, and to repeatedly scan the projected laser beam across a scan field 12 defined external to the hand-supportable housing.

As illustrated in FIGS. 1 through 1C, the scanner support stand portion 3 includes a support frame which comprises a base portion 13A, a head portion support structure 13B, a handle portion support structure 13C and a finger accommodating recess 13D. As shown, base portion 13A has a longitudinal extent and is adapted for selective positioning with respect to a support surface, e.g., countertop surface, counter wall surface, etc. Head portion support structure 13B is connected to base portion 13A, for receiving and supporting the head portion of bar code symbol reading device 2. Similarly, handle portion support structure 13C is connected to base portion 13A, for receiving and supporting the handle portion of the code symbol reading device.

In order that the user's hand can completely grasp the handle portion of the hand-supportable bar code reading device, (i.e., prior to removing it off and away from the scanner support stand), finger accommodating recess 13D is disposed between head and handle portion support structures 13B and 13C and above base portion 13A of the support frame. In this way, finger accommodating recess 13D is laterally accessible so that when the head and handle portions 9A and 9B are received within and supported by head portion support structure and handle portion support structure, respectively, the fingers of a user's hand can be inserted through finger accommodating recess 13D and can completely encircle the handle portion of the hand-supportable device.

As illustrated in FIGS. 2 through 2B in particular, head portion 9A continuously extends into contoured handle portion 9B at an obtuse angle a which, in the illustrative embodiment, is about 146 degrees. It is understood, however, that in other embodiments obtuse angle .alpha. may be in the range of about 135 to about 180 degrees. As this ergonomic housing design is sculptured (i.e., form-fitted) to the human hand, automatic hands-on scanning is rendered as easy and effortless as waving one's hand. Also, this ergonomic housing design reduces the risk of musculoskeletal disorders, such as carpal tunnel syndrome, which can result from repeated biomechanical stress commonly associated with pointing prior art gun-shaped scanners at bar code symbols, squeezing a trigger to activate the laser scanning beam, and then releasing the trigger.

As illustrated in FIGS. 2 through 3A, the head portion of housing 9 has light transmission aperture 11 formed in upper portion of front panel 14A, to permit visible laser light to exit and enter the housing, as will be described in greater detail hereinafter. The lower portion of front panel 14B is optically opaque except at optical wavelengths over the infra-red (IR) region of the electromagnetic spectrums, as are all other surfaces of the hand supportable housing.

As best shown in FIGS. 2A and 2B, the automatic bar code symbol reading engine 18 of the present invention is securely mounted within the head portion of hand-supportable housing 9, while a printed circuit board 19 and a rechargeable battery supply unit 20 are mounted within the handle portion of the hand-supportable housing. As will be described in greater detail hereinafter, the data packet transmission circuit of the present invention is realized on PC board 19 and is operably connected to bar code symbol reading engine 18 by way of a first flexible wire harness 21, while electrical power is supplied from rechargeable battery 20 to the data packet transmission circuit and the bar code symbol reading engine by way of a second flexible wire harness 22. As shown, a transmitting antenna 23 is operably connected to the data packet transmission circuit on PC board 19 and is mounted within hand-supportable housing 9 for transmission of a data packet modulated RF carrier signal. The structure and the functionalities of the automatic bar code symbol reading engine will be described in greater detail hereinafter with reference to FIGS. 7A to 14.

As shown in FIGS. 4 to 4B, the second illustrative embodiment of the bar code symbol reading device, indicated by reference numeral 25 comprises a wrist-mountable housing 26 having a head portion 26A with a light transmission window 27, and a tail portion 26B that is hingedly connected to the head portion 26B by way of a hinge mechanism 28. As shown, housing tail portion 26B is mountable to the wrist of its user by way of a wrist band or strap 35 that may be made from one or more different types of material. Also, an elastic gasket 29 is disposed about the physical interface of the housing head portion and the housing tail portion in order to seal off the housing interior from environmental debris, such as dust and the like.

As shown in FIGS. 4A and 4B, an automatic bar code symbol reading engine 18 is mounted within the head portion of the housing 26A, whereas a small PC board 30 and a miniature rechargeable battery supply unit 31 are mounted within the tail portion of the housing 26B. The data packet transmission circuit of the present invention is realized on PC board 30. Electrical power is provided from the battery supply unit 31 to PC board 30 by way of a first flexible wire harness 32, and from PC board 30 to bar code symbol reading engine 18 by way of a second flexible wire harness 33, as shown. In order to selectively connect and disconnect the flow of electrical power from PC board 30 to bar code symbol reading engine 18, a rotatable switch 34 associated with hinge mechanism 28 is connected in series with the electrical power lines extending along the second wire harness. In this way, when housing head portion 26A and housing tail portion 26B are both configured to extend in the same plane as shown in FIG. 4A, switch 34 is closed and electrical power is permitted to flow from PC board 30 to the bar code symbol reading engine. When the housing head portion and housing tail portion are configured in slightly different planes, as shown in FIG. 4B, then switch 34 is opened and electrical power is prevented from flowing from PC board 30 to the bar code symbol reading engine.

In general, bar code symbol reading device 25 can be used in conjunction with any of the base units of the present invention. However, in the preferred embodiment shown in FIG. 4, bar code symbol reading device 25 is used in conjunction with portable data collection base unit 37 in order to receive data packets that have been transmitted by the bar code symbol reading device upon the successful reading of each bar code symbol. The method of data packet transmission between the bar code symbol reading device and the portable base unit, will be described in detail hereinafter.

Figure 5A:
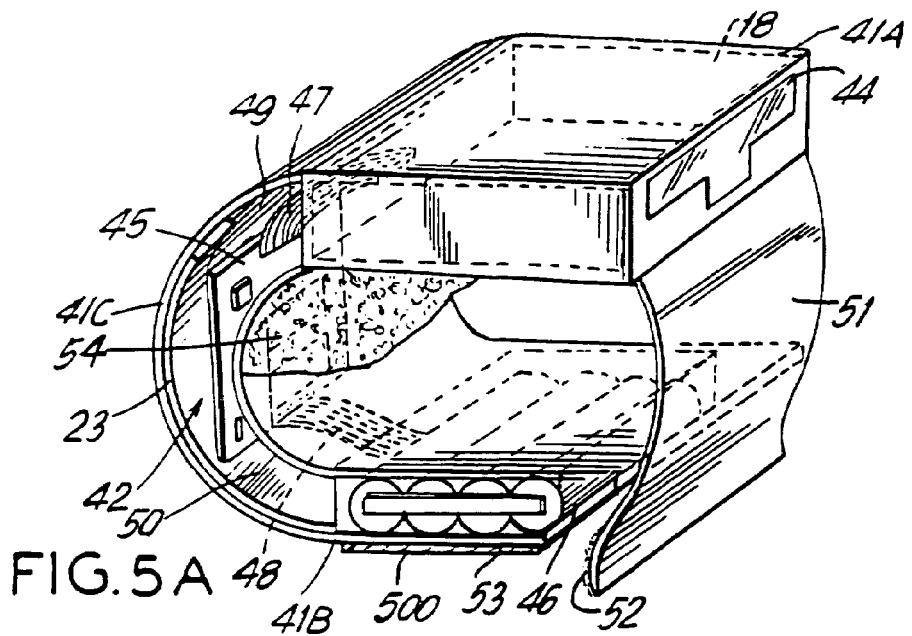
FIG. 5A is a perspective view of a third illustrative embodiment of the automatic bar code symbol reading device of the present invention, showing its wrist-mountable housing and the various system components contained therein.

As illustrated in FIGS. 5A to 5D, the third illustrative embodiment of the bar code symbol reading device of the present invention indicated by reference numeral 40, comprises a U-shaped wrist-mountable housing 41 having an upper housing portion 41A, a lower housing portion 41B, and a C-shaped housing portion 41C connecting the upper and lower housing portions, as shown. In the illustrative embodiment, each of these housing portions has a hollow interior of volumetric expanse which is laterally accessible by a side wall opening 42 shown in FIG. 5A that is typically closed off by a U-shaped side panel 43 that snap fits over side wall opening 42. As shown, the front side wall of the upper portion of the housing has a light aperture window 44 through which laser light is permitted to pass to and from a bar code symbol reading engine 18 mounted within the interior of the upper portion of the U-shaped housing. A small PC board 45, on which the data packet transmission circuit is realized, is mounted within the interior of the C-shaped portion of the housing along with transmitting antenna 23, while a rechargeable battery power supply unit 46 is mounted within the interior of the lower portion of the housing, as shown in FIG. 5A. Electrical power is provided from battery supply unit 46 to PC board 45 by way of a first flexible wire harness 48, and from PC board 45 to the bar code symbol reading engine by way of a second flexible wire harness 47. As shown, a first passageway 49 is provided between the interior volume within the upper housing portion and the C-shaped housing portion in order to permit wire harness 47 to extend between PC Board 45 and the bar code symbol reading engine 18. Similarly, a second passageway 50 is provided between the lower housing portion and the C-shaped housing portion in order to permit wire harness 48 to extend between the battery supply unit 46 to PC board 45.

As shown in FIG. 5A, a flexible strap 51 extends from the bottom of the front panel of the upper portion of the housing and has a piece of hook-type material 52 attached to the free end portion thereof. A piece of loop-type material 53 is securely affixed to the bottom side of the lower portion of the housing. With such an arrangement, the free end of strap 51 can be fastened to the bottom side of the lower portion of the housing, and thus securely attach the housing to the wrist of the user. Foam or cushioning material 54 can be used to line the interior surfaces of the housing in order to comfortably mount bar code reading device 40 on the wrist of its user.

Figure 5B:
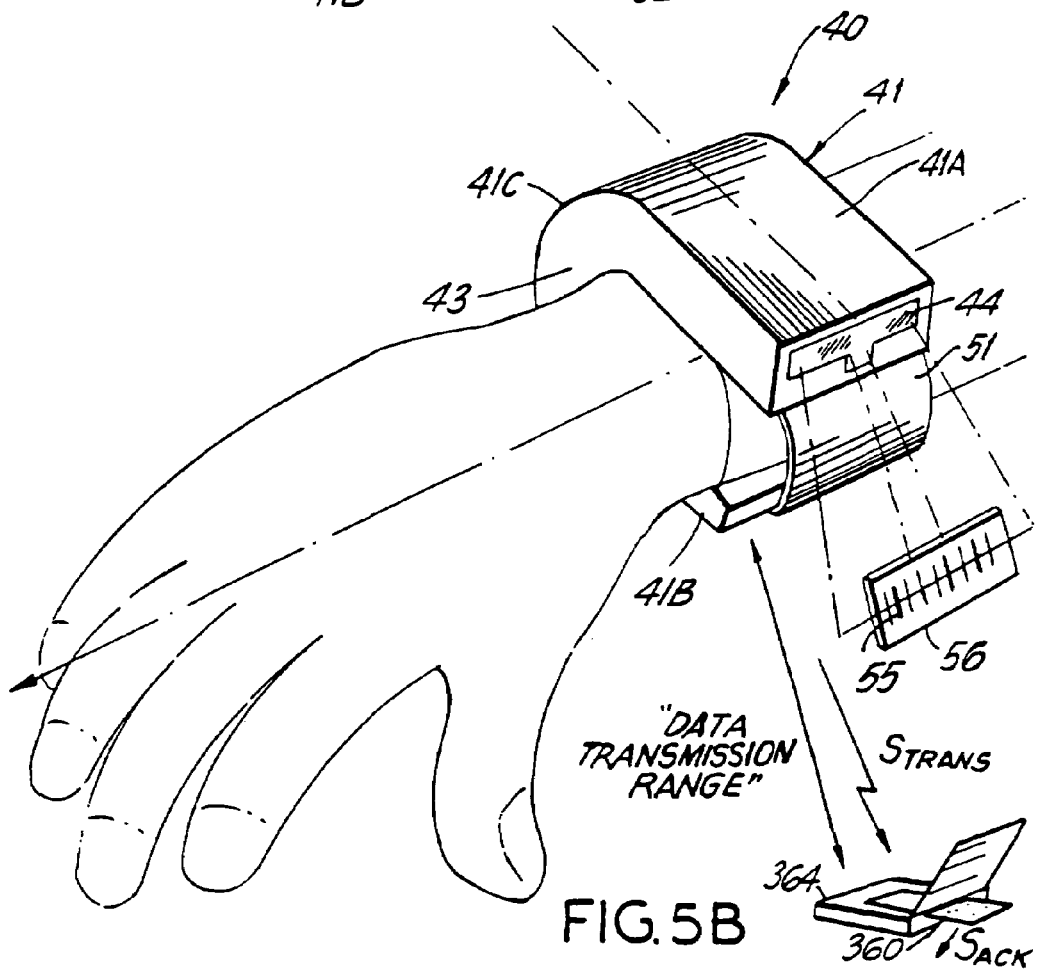
FIG. 5B is a perspective view of the automatic bar code symbol reading device of FIG. 5A, shown mounted on the wrist of an operator with its object and scan fields extending laterally transverse to the pointing direction of the operator's hand during automatic hands-free operation.
Figure 5C:
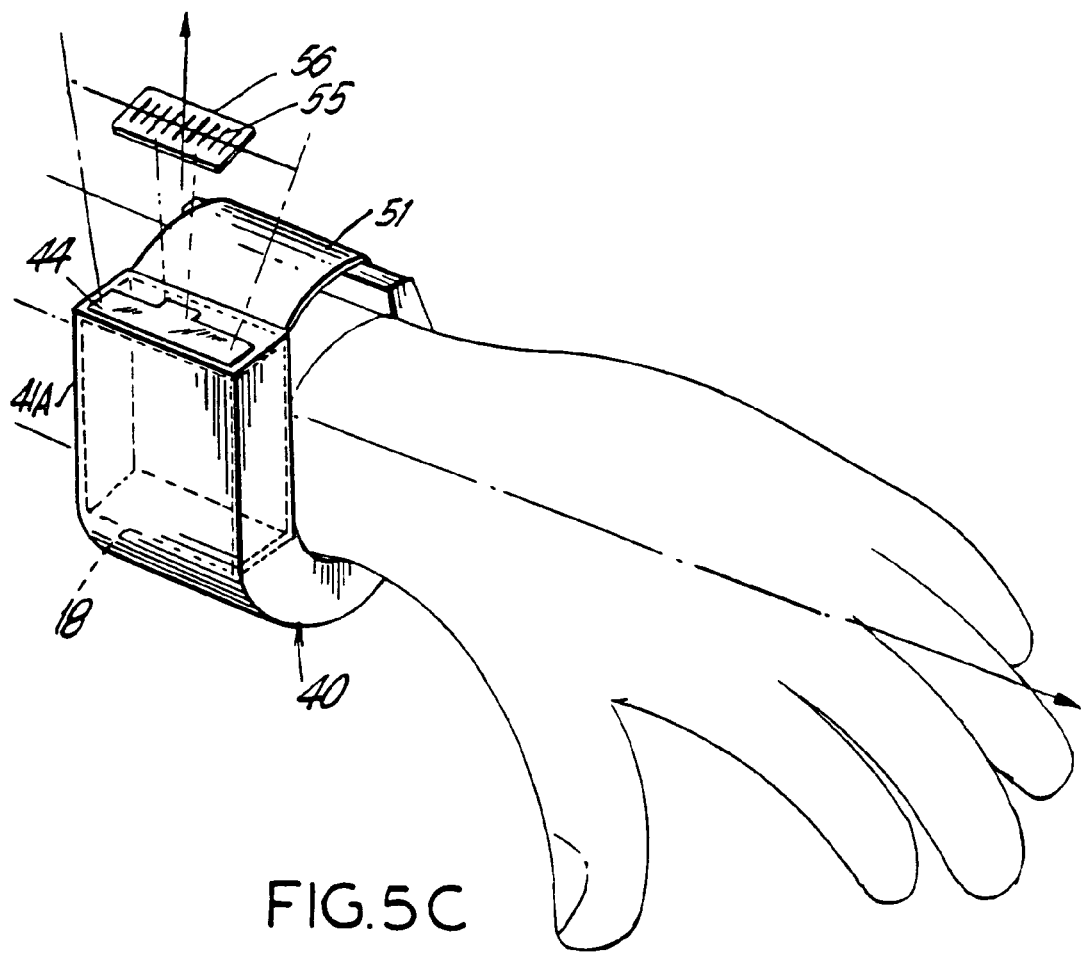
FIG. 5C is a perspective view of the automatic bar code symbol reading device of FIG. 5A, shown mounted on the wrist of an operator with its object and scan fields extending upwardly transverse to the pointing direction of the operator's hand during automatic hands-free operation.
Figure 5D:
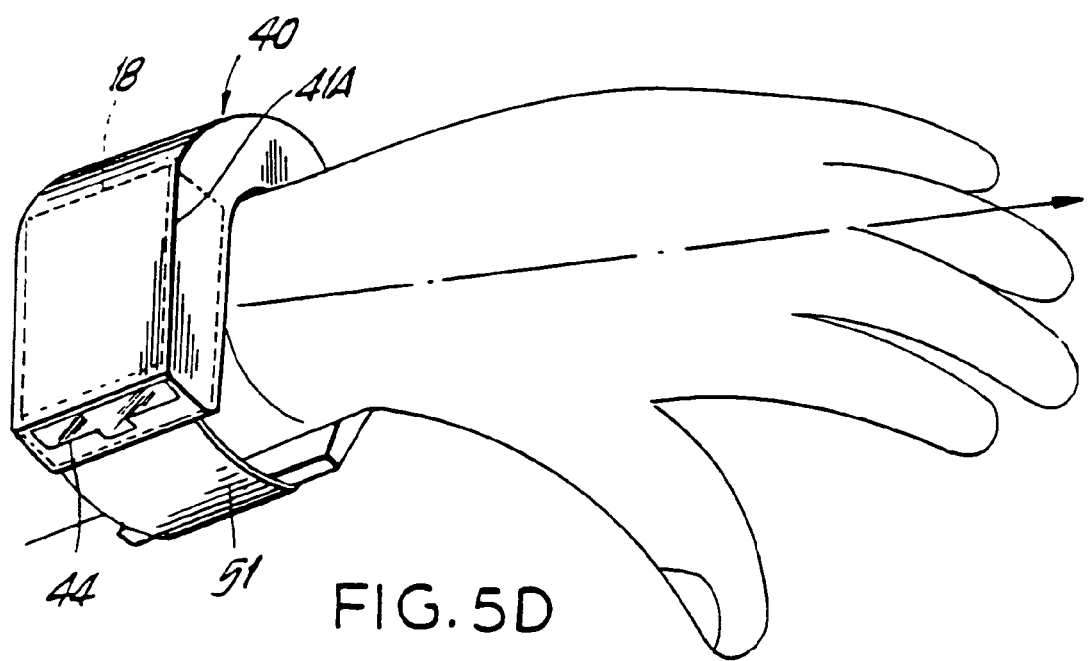
FIG. 5D is a perspective view of the automatic bar code symbol reading device of FIG. 5A, shown mounted on the wrist of an operator with its object and scan fields extending downwardly transverse to the pointing direction of the operator's hand during automatic hands-free operation.

In FIGS. 5B, 5C, and 5D three different wrist mounting arrangements are shown for bar code symbol reading device 40. As shown in FIG. 5B, the laser scan and object detection fields extend laterally transverse to the pointing direction of the user's hand on which the bar code symbol reading device is mounted. With this laser scanning arrangement, the user reads a bar code symbol 55 on an object by either presenting the bar code symbol to the light transmission window of the bar code symbol reading device, or by moving the light transmission window of the bar code symbol reading device such that the laser scanning beam projects across the bar code symbol to be read. This scanning arrangement is advantageous in various applications where the user desires to read a bar code symbol on a detected object that is not located along the natural pointing direction of the user's hand.

As shown in FIG. 5C, the laser scan and object detection fields extend upwardly transverse to the pointing direction of the user's hand on which the bar code symbol reading device is mounted. This scanning arrangement is advantageous in various applications where the user desires to read a bar code symbol 55 on a detected object 56 that is not located along the natural pointing direction of the user's hand or laterally disposed thereto, as in FIG. 5B. With this alternative mounting arrangement, the user reads a bar code symbol by presenting the bar code symbol on the object to the object bearing the bar code symbol.

As shown in FIG. 5D, the laser scan and object detection fields extend downwardly transverse to toward the pointing direction of the user's hand on which the bar code symbol reading device is mounted. This scanning arrangement is advantageous in various applications where the user desires to read a bar code symbol 55 on a detected object 56 that is not located along the pointing direction of the user's hand or laterally disposed thereto, as in FIG. 5B. With this alternative mounting arrangement, the user reads a bar code symbol by presenting the bar code symbol on the object to light transmission window of the bar code symbol reading device.

In general, bar code symbol reading device 40 can be used in conjunction with any one of the base units of the present invention. However, in the preferred embodiment shown in FIG. 5B, bar code symbol reading device 40 is used in conjunction with portable computer system 364, equipped with PCMCIA-card base unit 360. As will be described in greater detail hereinafter, PCMCI-card base unit 360 is capable of receiving data packets transmitted from device 40 upon the successful reading of each bar code symbol. The method of data packet transmission and reception between bar code symbol reading device 40 and base unit 360 will be described in detail hereinafter.

In FIGS. 6A to 6D, another embodiment of the bar code symbol reading system of the present invention is shown. In general, bar code symbol reading system 60 comprises a base unit 61 operably connected to a bar code symbol printing engine 62, and a portable automatic bar code symbol reading device 63. As shown, system 60 is interfaced with a host computer system (e.g., desk-top computer) 64 by way of a serial data communications cable 65. An electrical power signal is provided to the base unit by way of power cable 66, and is supplied to a primary transformer 67, by way of PC board 68 and wires 69. As in the other described embodiments of the invention, the function of primary inductive coil 67 is to inductively transfer electrical power to a rechargeable battery 70 contained within the compact housing 71 of the bar code reading device when the base portion thereof is placed within matched recess 72 formed in the top portion of housing 73. Bar code symbol printing engine 62 is provided so that the user can easily print bar code symbols on adhesive labels or the like, as desired, using a conventional bar code application program executed by the processor in the host computer system and a suitable print driver program executed by the processor within the base unit. The internal structure and functionalities of base unit 61 will be described in greater detail hereinafter.

Figure 6A:
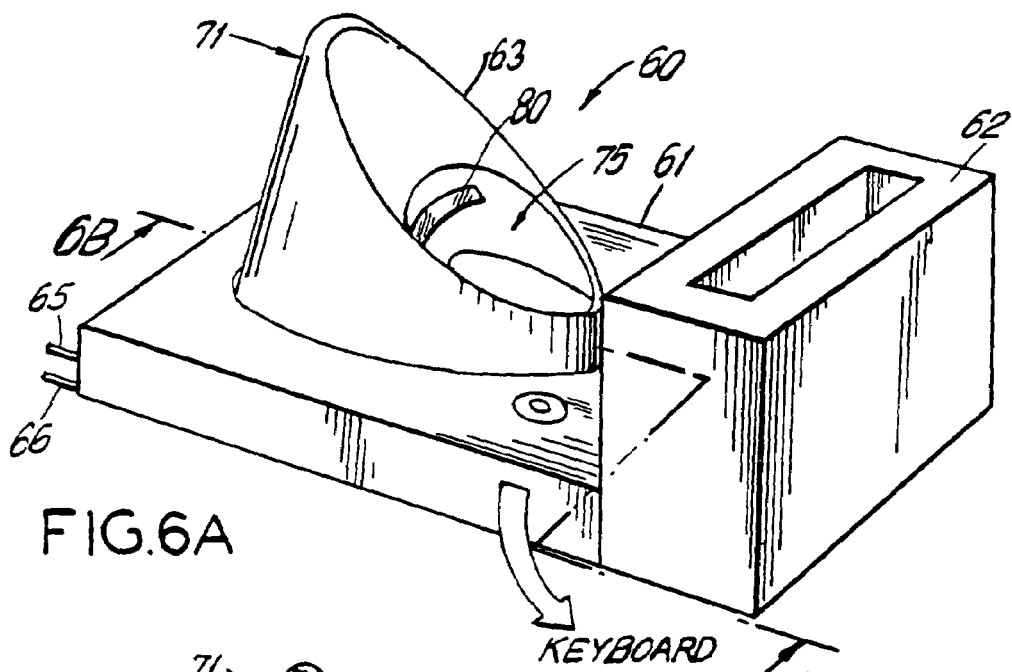
FIG. 6A is a perspective view of a fourth illustrative embodiment of the automatic bar code symbol reading device of the present invention, shown supported in its rechargeable base unit, equipped with a bar code symbol printing engine connected thereto.
Figure 6B:
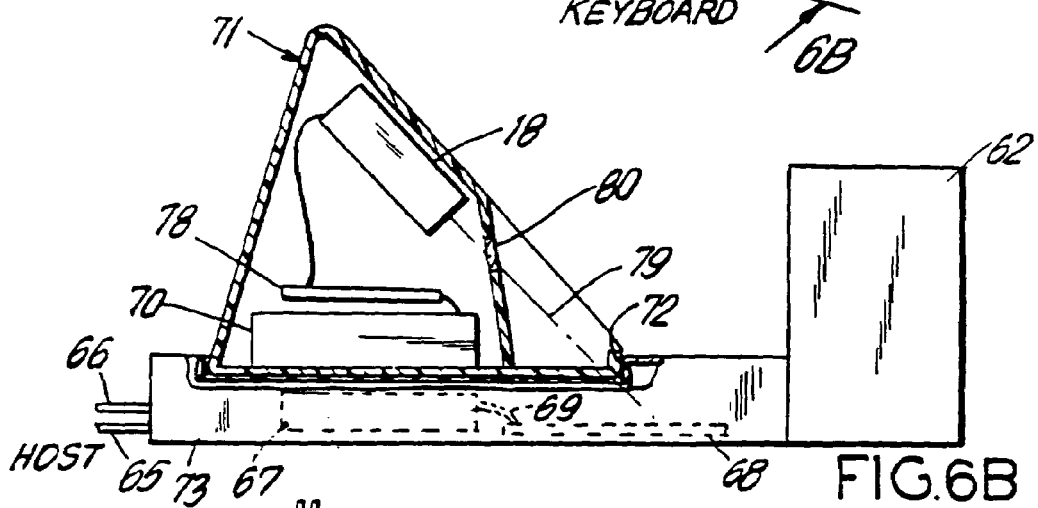
FIG. 6B is a cross-sectional view of the fourth illustrative embodiment of the bar code symbol reading device, taken along line 6B—6B of FIG. 6A, showing the device resting in its base unit: during a battery recharging operation.
Figure 6C:
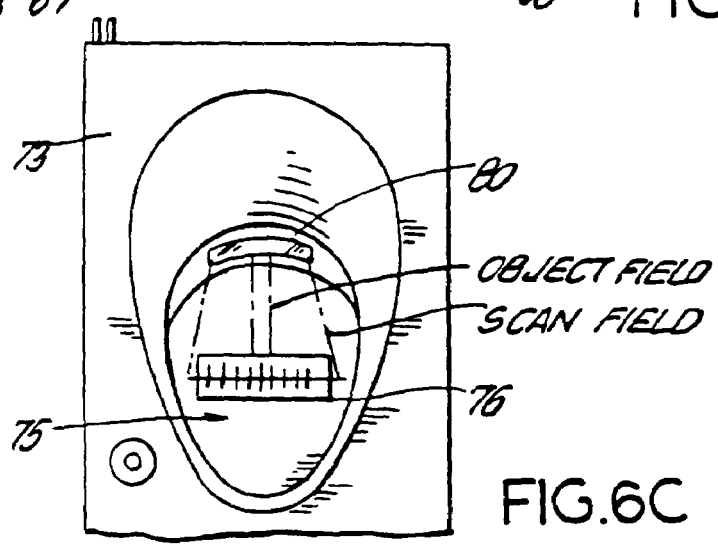
FIG. 6C is a plan view of the fourth illustrative embodiment of the bar code symbol reading device of the present invention, shown reading a bar code symbol printed on a sheet of paper.
Figure 6D:
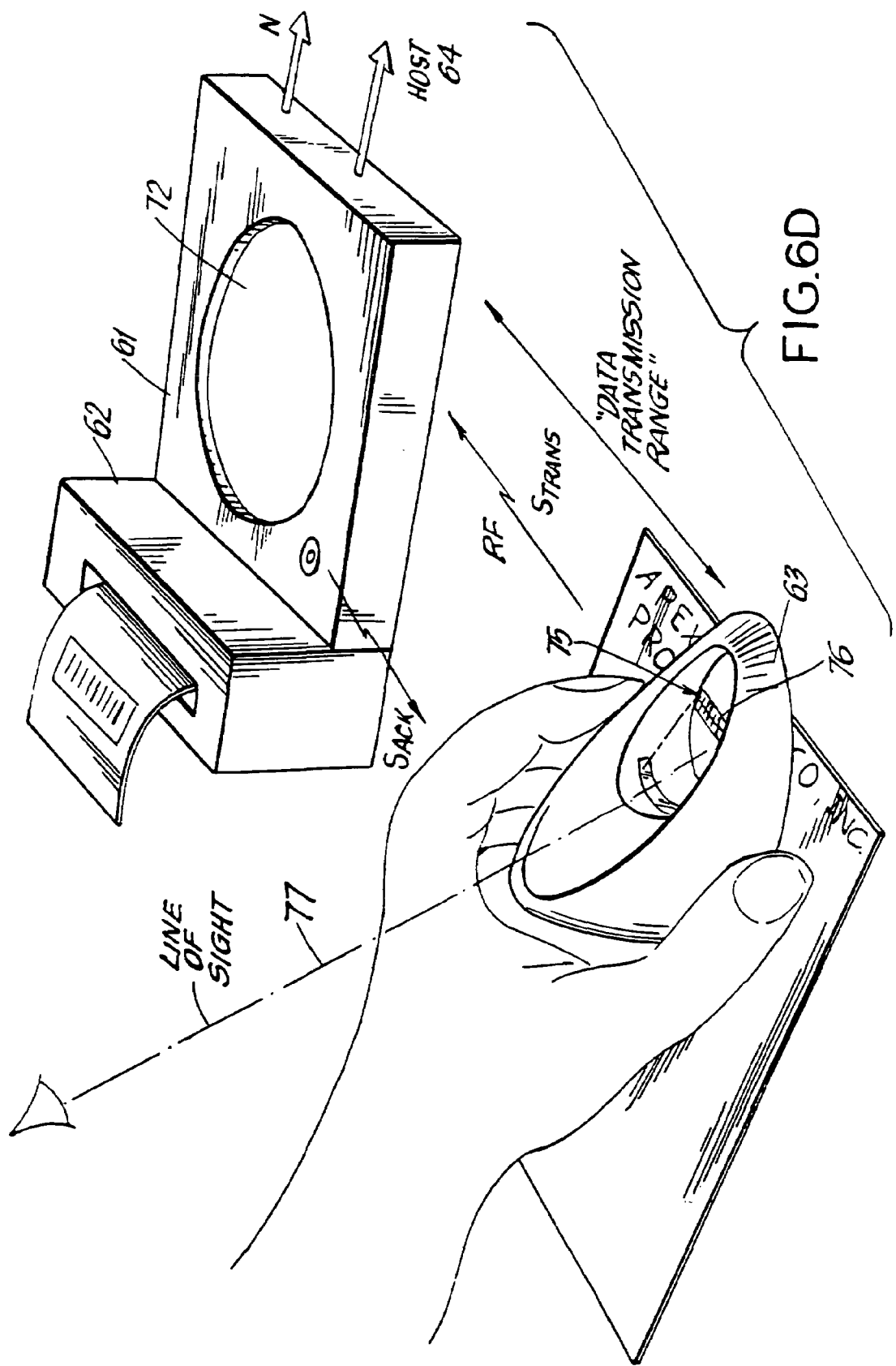
FIG. 6D is is a perspective view of the fourth illustrative embodiment of the bar code symbol reading device of the present invention, shown reading a bar code symbol printed on a sheet of paper while in proximity with its mated base unit.

As shown in FIG. 6B, the compact housing 71 of bar code symbol reading device has a wedge-like geometry when observed from its side view and an oval-like geometry when observed along its plan view. As shown in FIGS. 6A to 6D, a large eccentrically located "viewing aperture" 75 is formed through the entire housing of the device. As best illustrated in FIG. 6D, the function of the viewing aperture is to permit the user to encircle a bar code symbol 76 within the viewing aperture while the bar code symbol is being viewed along the line of sight 77 of the user. As shown in FIG. 6B, bar code symbol reading device 18 is disposed at an angle of about 45 to 60 degrees from the planer base of the housing.

A PC board 78 supporting the data packet transmission circuit of the present invention and the like is disposed below the engine and above rechargeable battery unit 70. As such, the laser scanning plane 79 projected from light transmission window 80 in housing 71 bisects the oval opening formed through the base of the housing, as shown. This permits the user to easily align the visible laser beam across the bar code symbol encircled within and along the viewing window of the bar code symbol reading device. Thus, to read a bar code symbol, all the user has to do is encircle the bar code symbol to be read through the viewing aperture of the device, align the projected visible laser beam with encircled bar code symbol, and automatically the bar code symbol is detected, scanned, and decoded by the bar code symbol reading engine 18, and the produced symbol character data is automatically transmitted to the receiver circuitry in the base unit. When the transmitted symbol character data is received by the base unit and retransmitted to the host computer system, an acoustical acknowledgement signal $S_{ACK}$ is emitted to the ambient environment for the user to hear. Thereafter, the user may leave the bar code symbol reading device to rest anywhere on the desk top, or may place it within recess 72 in order to automatically recharge the battery unit within the bar code symbol reading device.

When using any of the bar code symbol reading devices of the present invention in commercial environments, such as retail stores, the wireless nature of the bar code symbol reader/base unit interface permits the operator thereof to accidently or deliberately walk off with the bar code symbol reading device. This could have serious financial consequences which could prevent commercially successful utilization of the system in such operating environments. In the illustrative embodiments, this problem is solved by providing each bar code symbol reader with an electrically-passive tuned resonant circuit 500 (i.e., target), realized on an ultra-thin adhesive label 501 affixed to either the exterior or interior of the hand supportable housing. The tuned resonant circuit 500 is identical to those used on products such as library books, compact discs, and other valuable goods sold in retail outlets. When the bar code symbol reader is moved through the exit door of the store, the tuned resonant circuit 500 absorbs energy from the magnetic field produced by magnetic field generation panels 502 and 503 installed of an electronic article surveillance system 504 installed at the store exit. When a bar code symbol reader bearing tuned resonant circuit 500 is moved through the magnetic interrogation field produced by panels 502 and 503, the tuned resonant circuit absorbs power from the magnetic field and the corresponding current fluctuation is detected by current sensing circuitry which triggers an audible alarm 505, notifying store management that the bar code symbol reader has been removed from the store without authorization. Various types of targets, interrogation field panels and electronic current sensing circuitry may be used to practice this aspect of the present invention. Suitable anti-theft detection (or electronic article surveillance) systems for practicing this aspect of the present invention can be found in U.S. Pat. Nos. 4,870,391 to Cooper; 4,751,500 to Minasy, et al.; and 4,684,930 to Minasy, et al., which are hereby incorporated by reference in their entirety. This method provides an inexpensive way of securing bar code symbol scanning devices, and is less expensive and much simpler than providing a signal receiver within the bar code symbol scanner itself.

Having described the four illustrative embodiments of the bar code symbol reading device hereof, it is appropriate at this juncture to describe in greater detail the laser scan and object detection fields thereof.

As illustrated in FIGS. 2, 4, 5 and 6C in particular, each embodiment of the bar code symbol reading device generates from its bar code symbol reading engine, two different types of fields external to its hand-supportable housing. As explained below, these fields function to carry out a novel bar code symbol reading process according to the principles of the present invention. The first field, referred to as the "object detection field", indicated in FIG. 2 by broken and dotted lines 15, is provided external to the housing for detecting energy reflected off an object (bearing a bar code symbol) located in the object detection field. The second field, referred to as the "scan field", has at least one laser beam scanning plane 10, as shown in FIG. 2, and is provided external to the housing for scanning a bar code symbol on the object in the object detection field. In the preferred embodiment, bar code symbol scanning is achieved using a visible laser beam which, after reflecting off the bar code symbol in the scan field, produces laser scan data that is collected for the purpose of automatically detecting the bar code symbol and subsequently reading (i.e., scanning and decoding) the same.

In general, detected energy reflected from an object during object detection can be optical radiation or acoustical energy, either sensible or non-sensible by the user, and may be either generated from the automatic bar code reading device or an external ambient source. However, as will be described in greater detail hereinafter, the provision of such energy is preferably achieved by transmitting a wide beam of pulsed infrared (IR) light away from transmission aperture 11, in a direction substantially parallel to longitudinal axis 16 of the hand-supportable housing. In the preferred embodiment, the object detection field, from which such reflected energy is collected, is designed to have a narrowly diverging pencil-like geometry of three-dimensional volumetric expanse, which is spatially coincident with at least a portion of the transmitted infrared light beam. This feature of the present invention ensures that an object residing within the object detection field will be illuminated by the infrared light beam, and that infrared light reflected therefrom will be directed generally towards the transmission aperture of the housing where it can be automatically detected to indicate the presence of the object within the object detection field. In response, a visible laser beam is automatically generated within the interior of the bar code symbol reading engine, projected through the light transmission aperture of the housing and repeatedly scanned across the scan field, within which at least a portion of the detected object lies. At least a portion of the scanned laser light beam will be scattered and reflected off the object and directed back towards and through light transmissive window 11 for collection and detection within the interior of the bar code symbol reading engine, and subsequently processed in a manner which will be described in detail hereinafter.

To ensure that the user can quickly align the visible laser beam with the bar code symbol on the detected object, the object detection field is designed to spatially encompass at least a portion of the scan field along the operative scanning range of the device, as illustrated in FIGS. 3 and 3A, for the first illustrative embodiment of the present invention. This structural feature of the present invention provides the user with an increased degree of control, as once an object is detected, minimal time will be required by the user to point the visible laser beam towards the bar code symbol for scanning. In effect, the laser beam pointing efficiency of the device is markedly improved during the automatic bar code reading process, as it is significantly easier for the user to align the laser beam across the bar code symbol upon object detection.

Figure 7A:
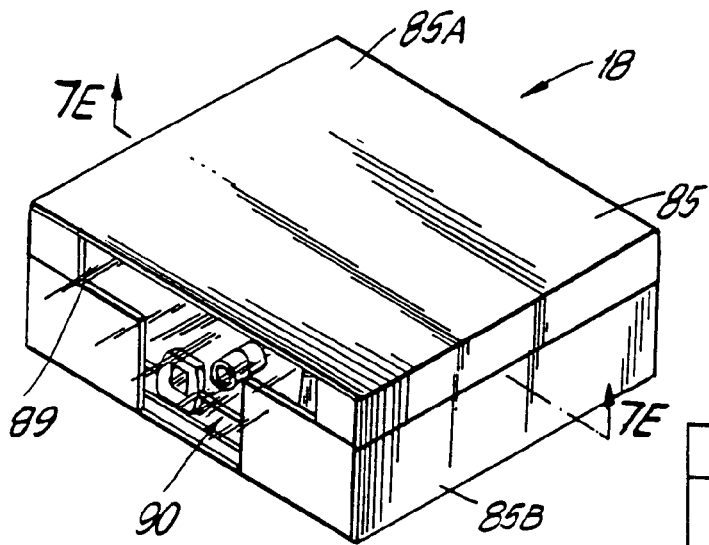
FIG. 7A is a perspective view of the automatic laser-based bar code symbol reading engine of the present invention, showing an illustrative miniature "match-box" size housing.
Figure 7B:
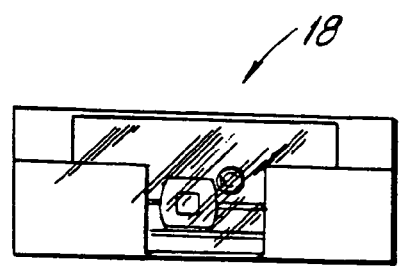
FIG. 7B is an elevated front view of the automatic bar code symbol reading engine of the present invention, showing illustrative geometrical characteristics for its light transmission window.
Figure 7C:
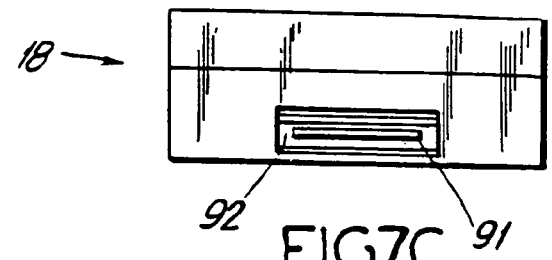
FIG. 7C is an elevated rear view of the automatic bar code symbol reading engine of the present invention, showing its input/output signal port.
Figure 7D:
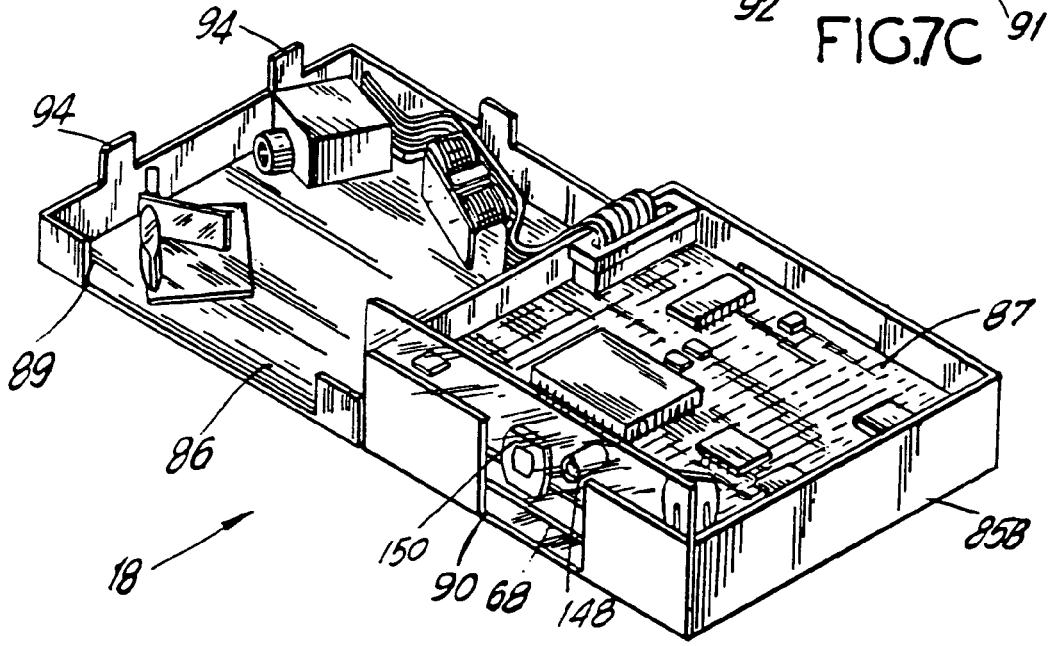
FIG. 7D is a perspective view of the automatic bar code symbol reading engine of the present invention, shown within the upper portion of the miniature match-box size housing removed from the lower housing portion thereof.
Figure 7E:
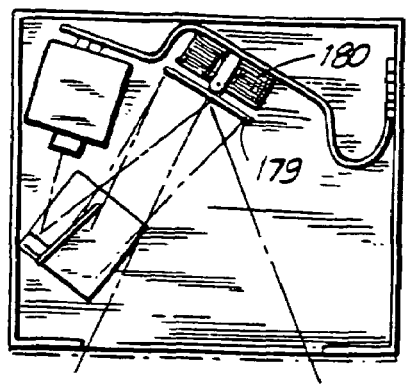
FIG. 7E is a plan view of the underside of the upper portion of the match-box size housing, showing the optical layout of the laser beam scanning optics of the device.
Figure 7F:
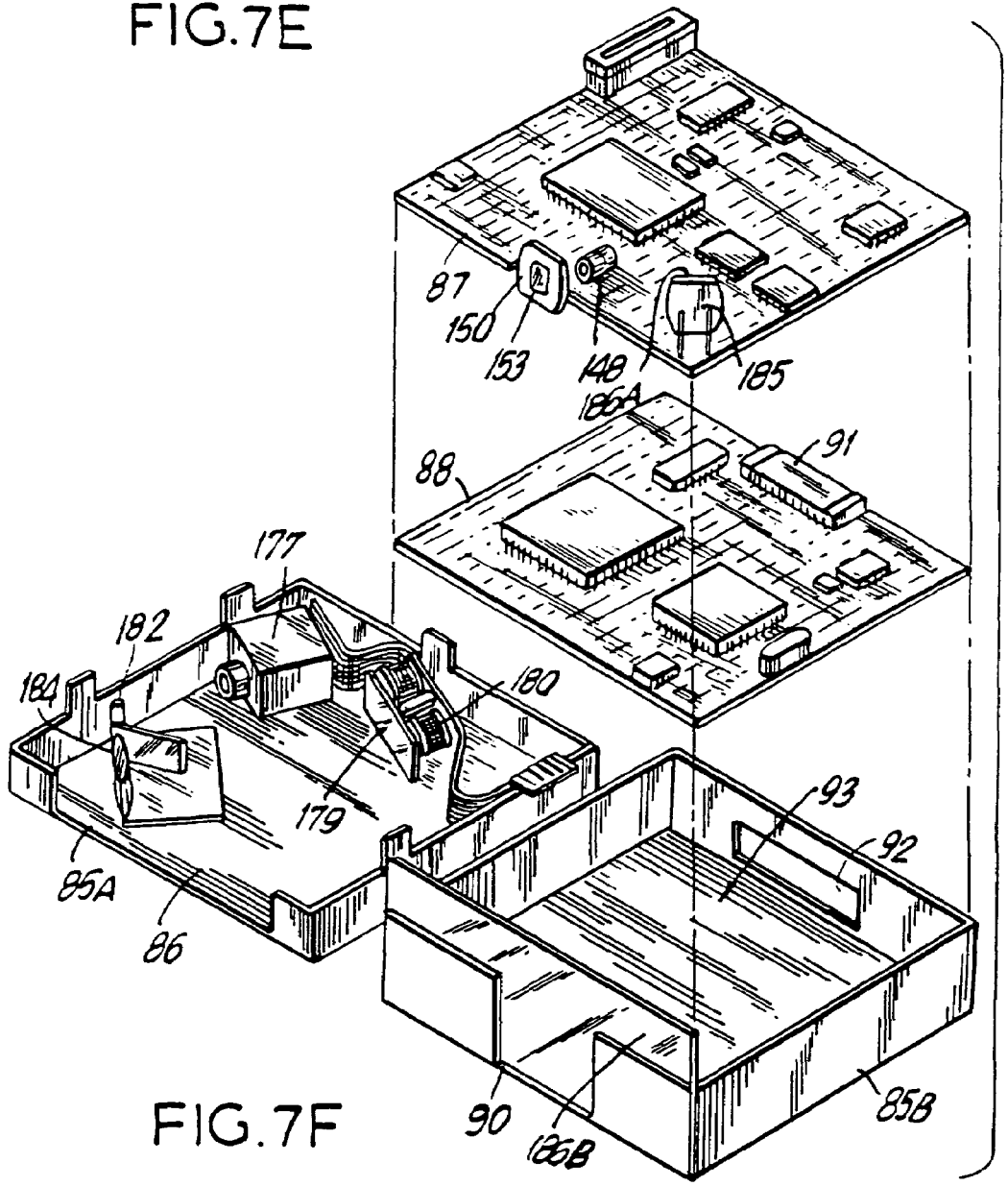
FIG. 7F is a perspective exploded view of the automatic bar code symbol reading engine of the present invention, showing illustrative spatial relationships among the printed circuit boards, the upper and lower housing portions, and the laser beam scanning optics thereof.
Figure 8:
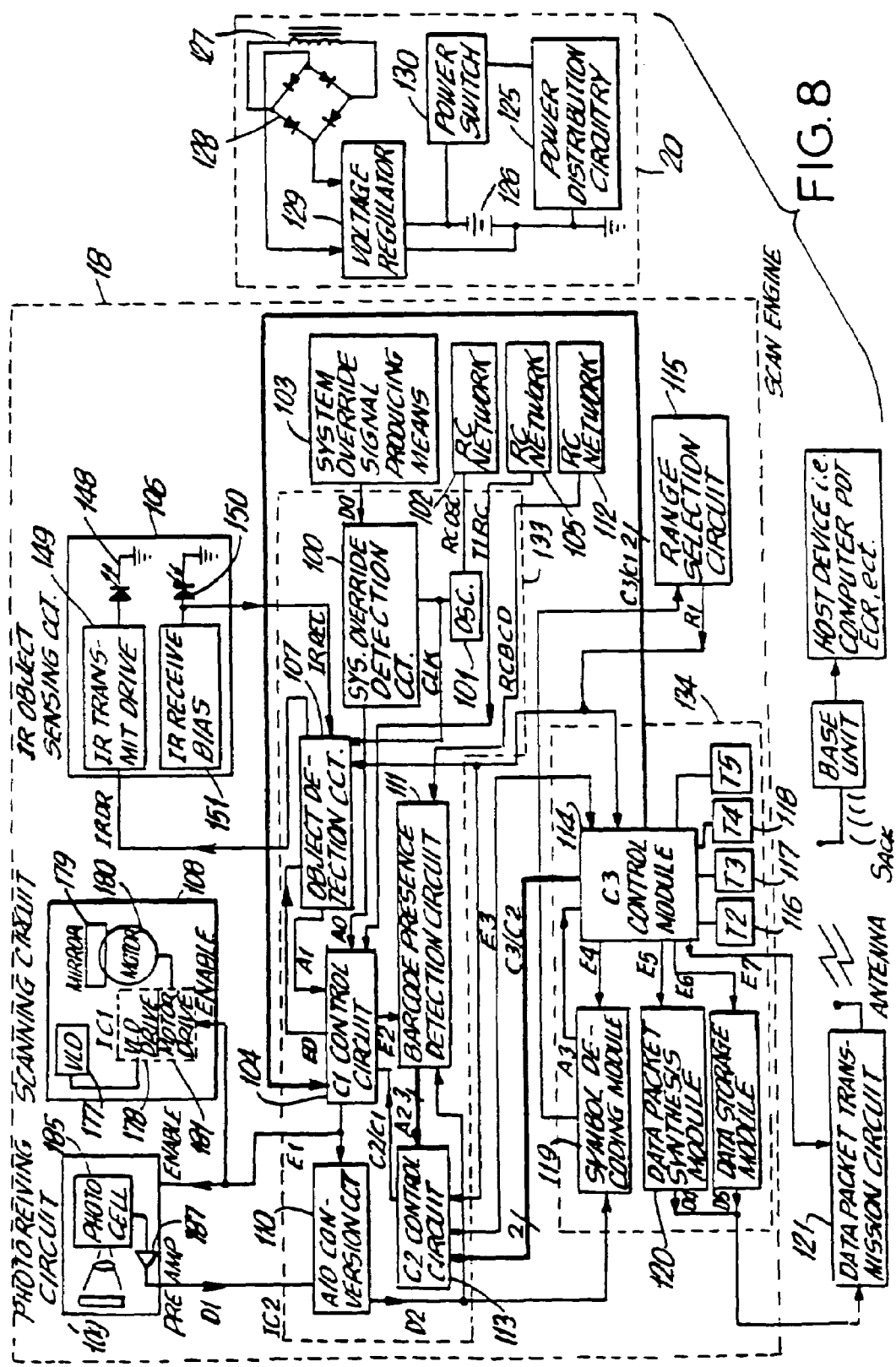
FIG. 8 is a system block functional diagram of the automatic bar code symbol reading system of the present invention, illustrating the principal components integrated with the control (sub)system thereof.

As shown in FIGS. 7A to 7F, the automatic bar code symbol reading engine 18 of the present invention contains a number of electronic, electro-optical and optical components arranged in a strategic manner within a miniature housing 85. In the illustrative embodiment, the miniature housing has match-book size dimensions (e.g., a width along light transmission window of 1.8", a depth of 1.6", and a height of 0.6") and an interior volume of about 1.7 cubic inches. As shown, housing 85 has an upper portion 85A and a lower portion 85B. The underside 86 of the upper housing portion 85A functions as an optical bench (i.e., platform) upon which the majority of optical and electro-optical components of the engine are mounted. The lower housing portion 85B supports two PC boards 87 and 88 on which the circuits of FIG. 8 are realized using surface-mount componentry and like technology known in the art. In order to permit the laser beam produced within housing 85 to exit the housing and to allow reflected laser light enter the same for detection, a first light transmission aperture 89 is provided in the front side panel of the upper housing portion 85A. In order to permit IR light to exit and enter the housing, a second light transmission aperture 90 is formed in the front side panel of the lower housing portion 85B, as shown. To permit flexible wire harness 21, 28 or 47 (between the bar code symbol reading engine and the data packet transmission circuit on the PC board) to interconnect with the circuitry on PC board 88 by way of a conventional connector 91, an input/output aperture 92 is formed in the rear side panel of the lower housing portion 60B, as shown. With PC boards 87 and 88 installed within the interior 93 of the lower housing portion, as shown in FIG. 7A, the upper housing is snap-fitted with the lower housing portion 85B by way of tabs 94 that engage against tie interior surfaces of the side panels of the lower housing portion 85B. Additional details regarding the optical layout and construction details of the preferred embodiment of bar code reading engine 18, will be described hereinafter.

Figure 7G:
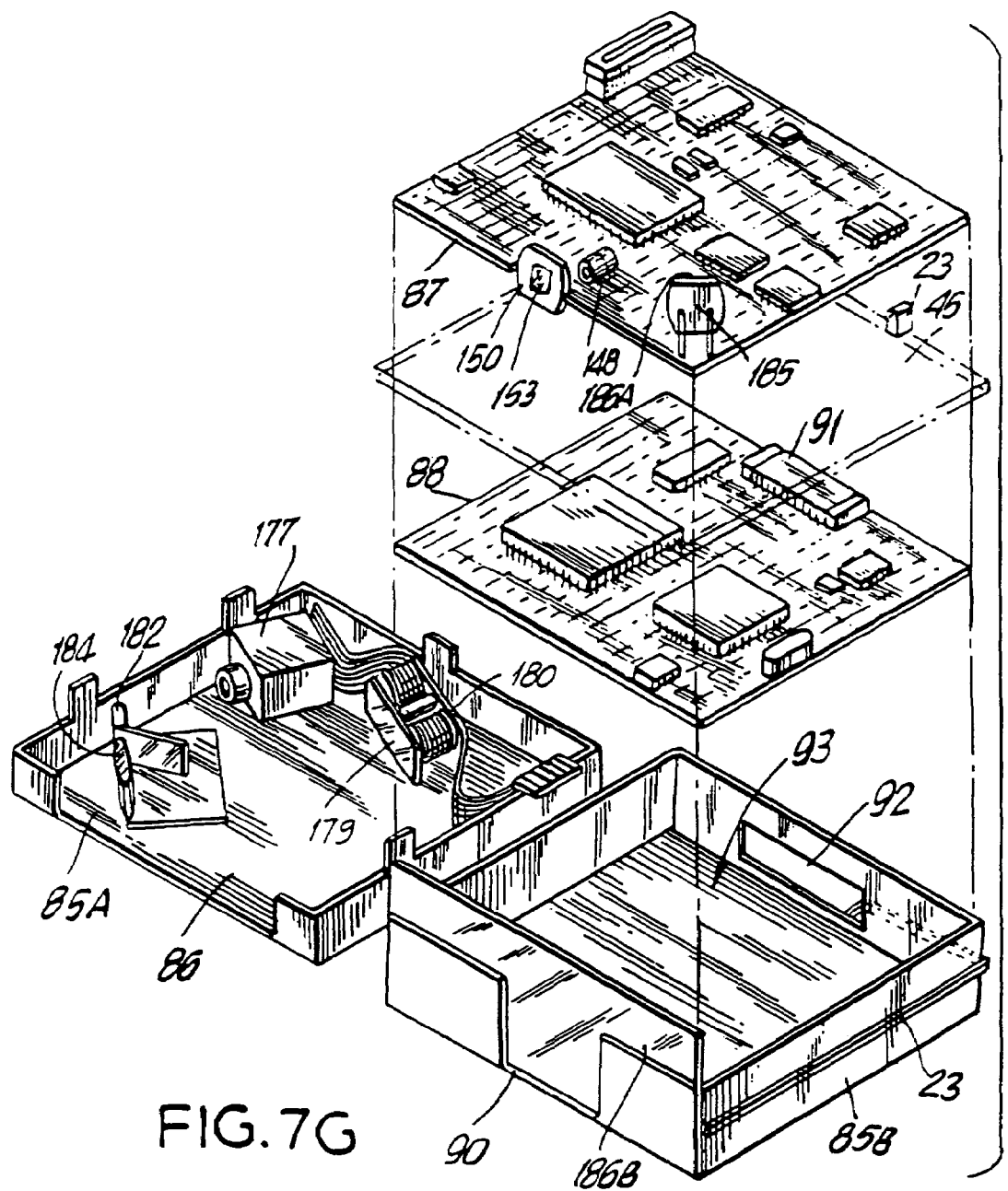
FIG. 7G is a perspective exploded view of an alternative embodiment of the automatic bar code symbol reading engine of the present invention, showing illustrative spatial relationships among the printed circuit boards, including the printed board supporting the data packet transmission circuit of the present invention.

In FIG. 7G, an alternative embodiment of the miniature automatic bar code symbol reading engine 18' is shown. As illustrated, this embodiment of the device further includes PC board 45 (shown in FIG. 5A) mounted between PC boards 87 and 88, contained within matchbox size housing 60. With data transmission circuit 121 realized on PC board 45, all that is required to operate automatic bar code symbol reading engine 18' is a supply of low voltage D.C. power, which can be provided by attaching a subminiature battery pack onto the end portion, bottom portion, top portion, or side portion of the housing 60. The transmitting antenna 23, connected to PC board 45, is mounted onto the exterior of housing 60 and the produced output from this embodiment of the bar code symbol reading engine is a RF carrier signal modulated by a serial data stream representative of the data packet group produced by the data packet transmission circuit in response to the successful reading of a bar code symbol. In alternative embodiments of the present invention, the battery pack may be physically incorporated within the interior of the housing modified in dimensions to accommodate the dimensions of the battery supply, and battery power recharging circuitry used in recharging the same.

As shown in FIG. 8, automatic bar code reading engine 18 is a system comprising a number of cooperating components, namely: a system override signal detection circuit 100 for detecting the production of a system override signal and producing in the presence thereof control activation signal $A_0=1$; a primary oscillator circuit 101 for producing a primary clock signal CLK for use by the system override signal detection circuit and object detection circuit 107; a first RC timing network 102 for setting the oscillation frequency of the primary oscillator circuit; means (e.g., Hall-effect sensor) 103 for producing a system override signal; first control means 104, realized as a first control circuit $C_1$, for performing localized system control functions; a second RC timing network 105 for setting a timer $T_1$ in control circuit $C_1$; means (e.g., an object sensing circuit 106 and an object detection circuit 107) for producing a first activation control signal $A_1=1$ upon the detection of an object bearing a bar code in at least a portion of the object detection field; a laser beam scanning mechanism 108 for producing and scanning a visible laser beam across the bar code symbol on the detected object; photoreceiving circuit 109 for detecting laser light reflected off the scanned bar code symbol and producing an electrical signal $D_1$ indicative of the detected intensity; a analog-to-digital (A/D) conversion circuit 110 for converting analog scan data signal $D_1$ into a corresponding digital scan data signal $D_2$; a bar code presence detection circuit 111 for processing digital scan data signal $D_2$ in order to automatically detect the digital data pattern of a bar code symbol on the detected object and produce control activation signal $A_2=1$; a third RC timing network 112 for setting a timer $T_{BCD}$ in the bar code symbol detection circuit; second control means 113, realized as a second control circuit $C_2$, for performing local system control operations in response to the detection of the bar code symbol; third control means 114, realized as third control module $C_3$; a range selection circuit 115 for supplying range selection signals to the object detection circuit; second control circuit $C_2$ and third control module $C_3$; timers $T_2$, $T_3$, and $T_4$ identified by reference numerals 116, 117 and 118, respectively; a symbol decoding module 119 for processing digital scan data signal $D_2$ so as to determine the data represented by the detected bar code symbol, generate symbol character data representative thereof, and produce activation control signal $A_3$ for use by third control module $C_3$; a data packet synthesis module 120 for synthesizing a group of formatted data packets for transmission to its mated base unit; and a data packet transmission circuit 121 for transmitting the group of data packets synthesized by the data packet synthesis module. As will be described in greater detail hereinafter, second control circuit $C_2$ is capable of "overriding" (i.e., inhibit and/or enable) first control circuit $C_1$, whereas third control module $C_3$ is capable of overriding first and second control circuits $C_1$ and $C_2$, respectively. As shown in FIG. 8, such control override signals are carried out by the generation of control override signals (i.e., $C_2/C_1$, $C_3/C_2$ and $C_3/C_1$) transmitted between respective control structures. Owing to the unique architecture of the control subsystem hereof, the automatic bar code symbol reading device of the present invention is capable of versatile performance and ultra-low power operation. The structure, function and advantages of this control subsystem architecture will become apparent hereinafter.

As shown in FIG. 8, electrical power is provided to the components of the bar code reading device by battery power supply unit (20) contained within the housing of the device. In the illustrative embodiment, the battery power supply unit is realized as a power supply distribution circuit 125 fed preferably by replaceable or rechargeable batteries 126. In the case of rechargeable batteries, a secondary inductive coil 127, bridge rectifier 128 and voltage regulation circuit 129 are contained within the hand-supportable housing, and configured as shown in FIG. 8. The function of second inductive coil 128 is to establish an electromagnetic coupling with the primary inductive coil contained in the base unit associated with the bar code reading device whenever the device is supported in the recharging portion of the base unit. In this configuration, electrical power is inductively transferred from the primary inductive coil in the base unit to secondary inductive coil 127, rectified by bridge rectifier 128, and filtered by voltage regulation circuit 129 to provide a regulated DC power supply for recharging rechargeable batteries 126. In addition, an externally accessible ON/OFF power switch 130 or functionally equivalent device is provided in series between battery supply unit 126 and power distribution circuitry 125 so as to permit the user to selectively energize and deenergize the device, as desired or required. Range selection circuit 115 may include a manual switch externally accessible to the housing, which the user can depress to select long or short-range modes of object detection, bar code presence detection and/or bar code symbol reading. Alternatively, Range Selection Circuit 115 can be activated to a particular range setting by symbol decoding module 119. In this mode of operation, the range setting can be set by decoding a bar code symbol predesignated to activate the long or short range modes of detection, as the case may be.

In the illustrative embodiment of the present invention, system override signal detection circuit 100, primary oscillator circuit 101, object detection circuit 107, first control circuit $C_1$, analog-to-digital conversion circuit 110, bar code symbol detection circuit 111, and second control circuit $C_2$ are all realized on a single Application Specific Integrated Circuit (ASIC) chip 133 using microelectronic circuit fabrication techniques known in the art. In the illustrative embodiment, the ASIC chip and associated circuits for laser scanning and light detection and processing functions, are mounted on PC board 87 Symbol decoding module 119, data packet synthesis module 120, timers $T_2$, $T_3$, $T_4$, and T5 and third control module $C_3$ are realized using a single programmable device, such as a microprocessor having accessible program and buffer memory, and external timing circuitry, collectively depicted by reference numeral 134 in FIG. 8. In the illustrative embodiment, these components and devices are mounted on PC board 88.

In the illustrative embodiment, when power switch 130 is engaged to its ON position, power from battery power unit 126 is provided to first control circuit $C_1$, system override detection circuit 100, primary oscillator circuit 101 and IR object sensing circuit 106 and object detection circuit 107 so as to enable their operation, while only biasing voltages are provided to all other system components so that they are each initially disabled from operation. In accordance with the principles of the present invention, the consumption of electrical power to all other system components occurs under the management of the control architecture formed by the interaction of distributed control centers $C_1$, $C_2$ and $C_3$.

Figure 8A:
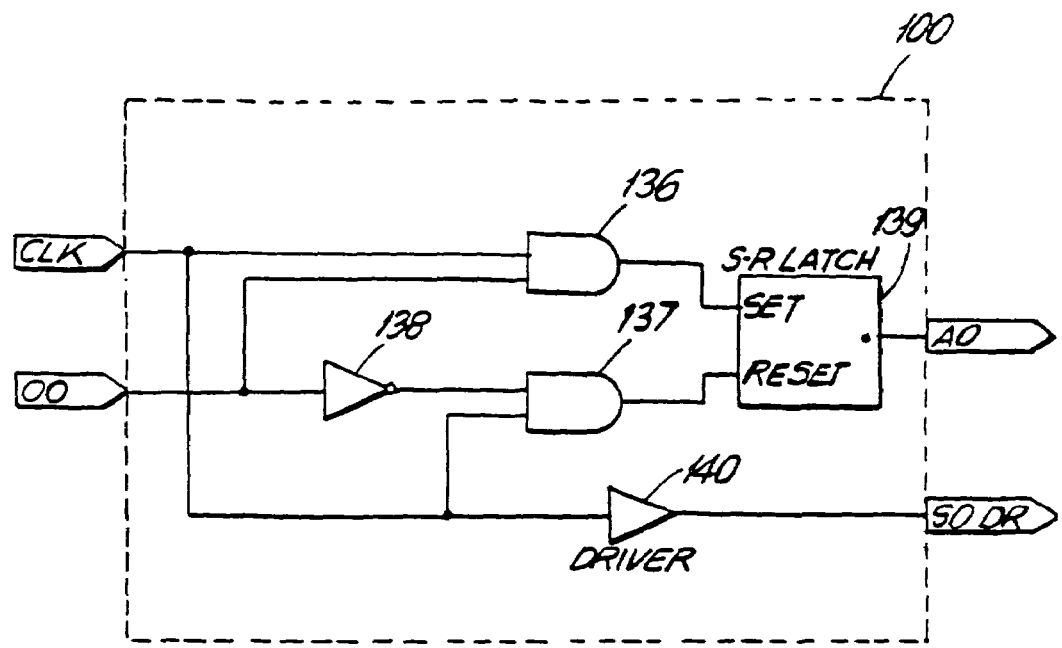
FIG. 8A is a functional logic diagram of the system override signal detection circuit in the Application Specific Integrated Circuit (ASIC) chip in the automatic bar code symbol reading engine of the present invention.

In some embodiments, it is desired to override (i.e., disable) the entire system from operation, such as when a hand-supportable bar code symbol reading device is placed in a holster worn on the user's belt. In such instances, the bar code symbol reading device of the present invention can be simply disabled by activating the system override signal producing device (e.g., Hall-effect sensor in the presence of a magnetic field) 103 mounted within the hand-supportable housing. As shown in FIG. 8A, system override signal detection circuit 100 comprises AND gates 136 and 137, an invertor 138, an S-R latch circuit 139 and a logical driver 140, configured as shown. As illustrated in FIG. 8A, the clock oscillator signal CLK (i.e., a periodic pulsed signal) is provided as one input of AND gate 136, one input of AND gate 137, and the input of logic driver 140. The system override signal SO from Hall-effect sensor 103 is provided to the input of invertor 138 and the second input of AND gate 136. The output of invertor 138 is provided to the input of AND gate 137. As shown, the output of AND gate 137 is provided to the RESET input of S-R latch 139, whereas the output of AND gate 136 is provided to the SET input of S-R latch 139. The output of S-R latch 139 is activation signal $A_0$ provided to first control circuit $C_1$, whereas the output of logic driver 140 is the driver signal SO DR which is used to drive (i.e., provide the supply voltage for) the Hall-effect sensor 103 mounted within the hand-supportable housing.

As shown in FIG. 8, primary clock oscillator circuit 101 supplies a periodic pulsed signal to both the system override signal detection circuit and the object detection circuit. In the illustrative embodiment, the primary oscillation circuit is designed to operate at a low frequency (e.g., about 1.0 Khz) and a very low duty cycle (e.g, about 1.0%). The "ON" time for the system override signal producing means and the IR object sensing circuit is proportional to the duty cycle of the primary oscillation circuit. This feature allows for minimal operating current when the bar code symbol reading engine is in the object detection mode and also when the system override signal producing device is activated (i.e., produces a system override signal).

Figure 8B:
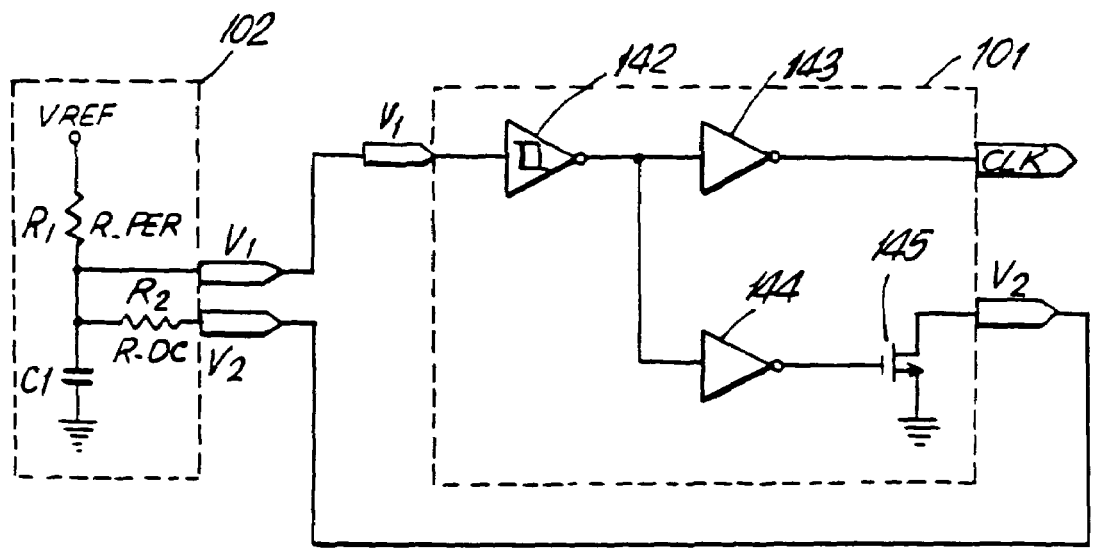
FIG. 8B is a functional logic diagram of the oscillator circuit in the ASIC chip in the automatic bar code symbol reading engine of the present invention.
Figure 8C:
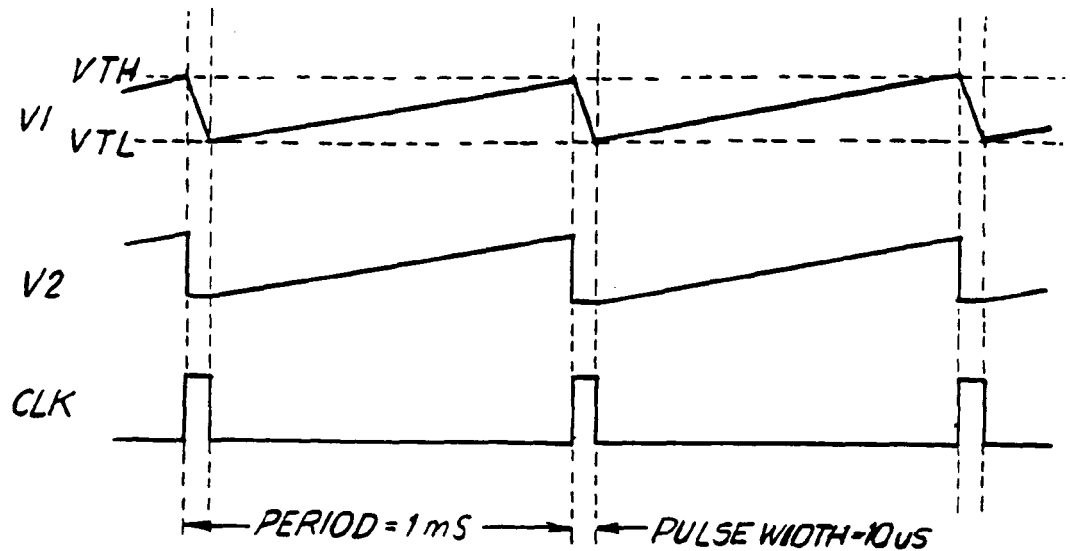
FIG. 8C is a timing diagram for the oscillator circuit of FIG. 8B.

As shown in FIG. 8B, primary oscillation circuit 101 comprises a Schmidtt trigger 142, invertors 143 and 144, and a NMOS Field-Effect Transistor (FET) 145. As shown, the output of trigger 142 is connected to the inputs of both invertors 143 and 144. The output of invertor 143 produces clock signal CLK which is provided to system override signal detection circuit 100 and object detection circuit 107. The primary oscillation circuit is connected to first RC network 102 which comprises resistors $R_1$ and $R_2$, and capacitor $C_1$ configured as shown in FIG. 8B. The function of the RC network 102 is to establish the duty cycle and the oscillation period of the primary oscillator circuit. As shown, two time constants (i.e., loads) are established by the network using capacitor $C_1$ and resistors $R_1$ and $R_2$. The RC combination of $R_1$ and $C_1$ establishes the period of the oscillator. The ratio of the $R_2$ to $R_1$ provides the duty cycle of the oscillator. The value of $R_2$ is approximately 100 times smaller than $R_1$ to establish a 1.0% duty cycle. As shown in the timing diagram of FIG. 8C, the clock signal CLK remains low while the $V_1$ 1 signal ramps up. This ramp up time is the time it takes for the capacitor $C_1$ to charge through $R_1$. The clock signal CLK then goes HIGH for the shorter discharge time of the capacitor through $R_2$. By adjusting the duty cycle (i.e., increasing or decreasing the value of resistor $R_2$), the sensitivity of the object detection circuit can be tuned such that it activates consistently at a specified distance from the light transmission window of the bar code symbol reading device.

In accordance with the present invention, the purpose of object detection circuit 107 is to produce a first control activation signal $A_1=1$ upon determining that an object (e.g., product, document, etc.) is present within the object detection field of the bar code symbol reading device, and thus at least a portion of the scan field thereof. As illustrated in FIG. 8, the object detection circuit is activated (i.e., enabled) by enabling signal $E_0$ supplied from first control circuit $C_1$, and the object detection circuit provides the first control circuit $C_1$ with first control activation signal $A_1=1$ when an object residing in the scan field is detected. In the illustrative embodiment, an "active" technique of automatic object detection is employed, although it is understood that "passive" techniques may be used with acceptable results. As shown in FIG. 8, the object detection means of the system comprises two major subcomponents, namely object sensing circuit 106 and object detection circuit 107, both of which are locally controlled by control circuit $C_1$. In the illustrative embodiment, object sensing circuit comprises an IR LED 148 driven by an IR transmitter drive circuit 149, and an IR phototransistor (or photodiode) 150 activated by an IR receive biasing circuit 151. As shown in FIGS. 7D and 7F, these components are arranged and mounted on PC board 87 so as to provide an object detection field that spatially encompasses the laser scanning plane, as described above. As shown in FIG. 8, the object detection circuit 107 produces an enable signal IR DR which is provided to the IR transmitter drive circuit 149. The signal produced from IR phototransistor 151, identified as IR REC, is provided as input signal to the object detection circuit 107 for signal processing in a manner which will be described in detail below. In the illustrative embodiment, infrared LED 148 generates a 900 nanometer signal that is pulsed at the rate of the primary oscillation circuit 101 (e.g., 1.0 KHZ) when the object detection circuit is enabled by enable signal $E_0$ produced from the first control circuit $C_1$. Preferably, the duty cycle of the primary oscillation circuit 101 is less than 1.0% in order to keep the average current consumption very low.

As shown in FIG. 7F, in particular, this pulsed optical signal is transmitted from infrared LED 148 to broadly illuminate the scan field. When an object is present within the object detection portion of the scan field, a reflected optical pulse signal is produced and focussed through focusing lens 153 onto photodiode 150. The function of photodiode 150 is to receive (i.e., sense) the reflected optical pulse signal and, in response thereto, produce a current signal IR REC.

Figure 8D:
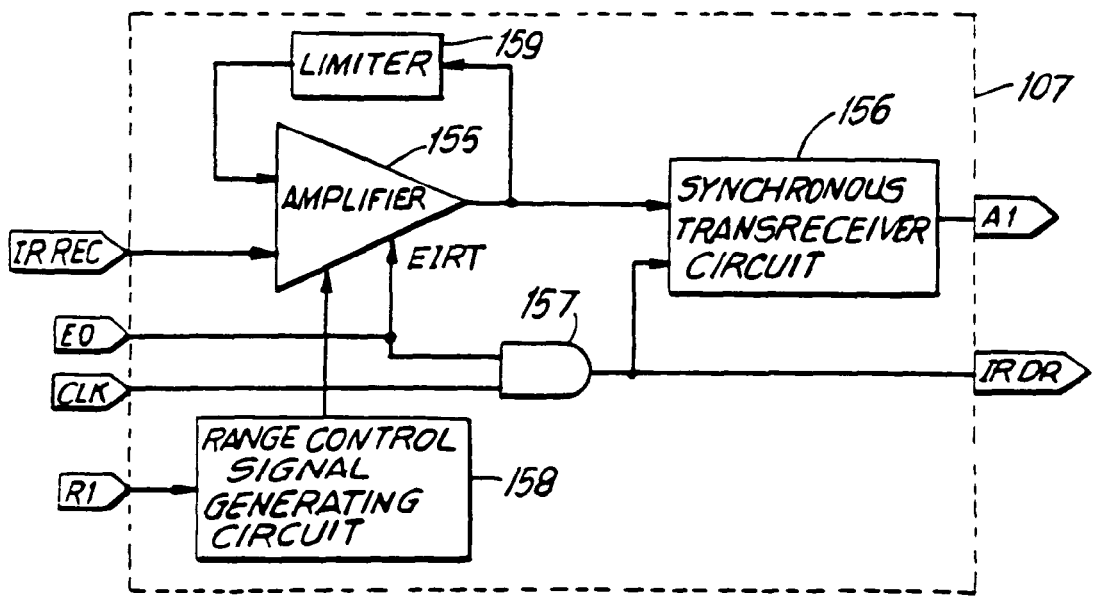
FIG. 8D is a block functional diagram of the object detection circuit (i.e., system activation mechanism) in the ASIC chip in the automatic bar code symbol reading engine of the present invention.

As shown in FIG. 8D, produced current signal IR REC is provided as input to the current-to-voltage amplifier (e.g., transconductance amplifier) 155 in the object detection circuit, and is converted into a voltage signal Vo. Within the object detection circuit 107, the infra-red LED drive signal IR DR is produced as the output of AND gate 157, whose inputs are enabling signal $E_0$ supplied from the first control circuit $C_1$ and the pulsed clock signal CLK supplied from the primary oscillation circuit 101.

As shown in FIG. 8D, enabling signal $E_0$ is also provided to current-to-voltage amplifier circuit 155, and the output voltage signal from AND gate 157 is provided as the second input to the synchronous transmitter/receiver circuit 156. Notably, the output voltage signal from AND gate 157 and the output voltage signal $V_0$ from the current-to-voltage amplifier correspond to the IR pulse signal trains transmitted from and received by object sensing circuit 106. The function of the synchronous transmitter/receiver circuit is to cyclically compare the output voltage signal from AND gate 157 and the output voltage signal $V_0$ from the current-to-voltage amplifier, and if these voltage signals synchronously match each other for a minimum of three (3) consecutive cycles of the primary oscillation circuit 101, then synchronous transmitter/receiver circuit 156 produces as output, a first control activation signal $A_1=1$, indicative that an object is present in the scan field of the bar code symbol reading device. Conversely, whenever first control activation signal $A_1=0$ is produced, then this condition indicates that an object is not present in the scan field.

Alternatively, the automatic bar code reading device of the present invention can be readily adapted to sense ultrasonic energy reflected off an object present within the scan field. In such an alternative embodiment, object sensing circuit 106 is realized as an ultrasonic energy transmitting/receiving mechanism In the housing of the bar code reading engine, ultrasonic energy is generated and transmitted forwardly into the scan field. Then, ultrasonic energy reflected off an object within the object detection field is detected adjacent to the transmission window using an ultrasonic energy detector that produces an analog electrical signal (i.e., UE REC) indicative of the detected intensity of received ultrasonic energy. Preferably, a focusing element is disposed in front of the energy detector in order to effectively maximize the collection of ultrasonic energy reflected off objects in the scan field. In such instances, the focusing element essentially determines the geometrical characteristics of the object detection field of the device. Consequently, the energy focusing (i.e., collecting) characteristics of the focusing element will be selected to provide an object detection field which spatially encompasses at least a portion of the scan field. The electrical signal produced from the ultrasonic-energy based object sensing circuit is provided to object detection circuit 107 for processing in the manner described above. In the illustrative embodiments, object detection circuit 107 is provided with two different modes of detection, namely, a long-range mode of object detection and a short-range mode of object detection. As shown in FIGS. 8 and 8D, these modes are set by range selection circuit 115 using mode enable signal $R_1$. When induced into the long-range mode of object detection, object detection circuit 107 will generate first control activation signal $A_1=1$ whenever an object has been detected within the operative range of the object detection field, independent of the particular distance at which the object resides from the transmissive window. When induced into the short-range mode of object detection, the object detection circuit will generate first activation control signal $A_1=1$ only when an object is detected at a distance within the short-range of the object detection field.

As schematically indicated in FIGS. 3 and 3A, the long-range specification for object detection is preferably preselected to be the full or entire range of sensitivity provided by current-to-voltage amplifier (e.g., 0 to about 10 inches). Preferably, the short-range specification for object detection is preselected to be the reduced range of sensitivity provided by the IR sensing circuit when mode enable signal $E_{IRT}=1$ is provided to the desensitization port of amplifier 155. In the illustrated embodiment, the short-range of object detection is about 0 to about 3 inches or so to provide CCD-like scanner emulation. As will become apparent hereinafter, the inherently limited depth and width of field associated with the short-range mode of object detection prevents laser scanning mechanism 108 from flooding the scan field with laser scanning light and thus inadvertently detecting undesired bar code symbols. Particular uses to which object detection range selection can be put, will be described in greater detail hereinafter with reference to FIGS. 27A to 29B in particular.

As shown in FIG. 8D, the sensitivity (i.e., gain) of current-to-voltage amplifier 155 is controlled by a sensitivity control signal $E_{IRT}$ produced from range control signal generating circuit 158. In the illustrative embodiment, the sensitivity control signal $E_{IRT}$ 160 is produced by a resistance network whose values are selected using an analog switch that is responsive to a range select signal $R_1$ produced by range selection circuit 115. As such, the sensitivity of the current-to-voltage amplifier is simply adjusted by selecting one of two resistance values within the resistance network used to realize range control signal generating circuit 158. The short range mode of object detection is enabled by selecting a resistance value that produces an amplifier gain that is lower than that produced during the long-range mode of object detection where detectable objects can reside further away from the light transmission window of the bar code symbol reading device.

Figure 8E:
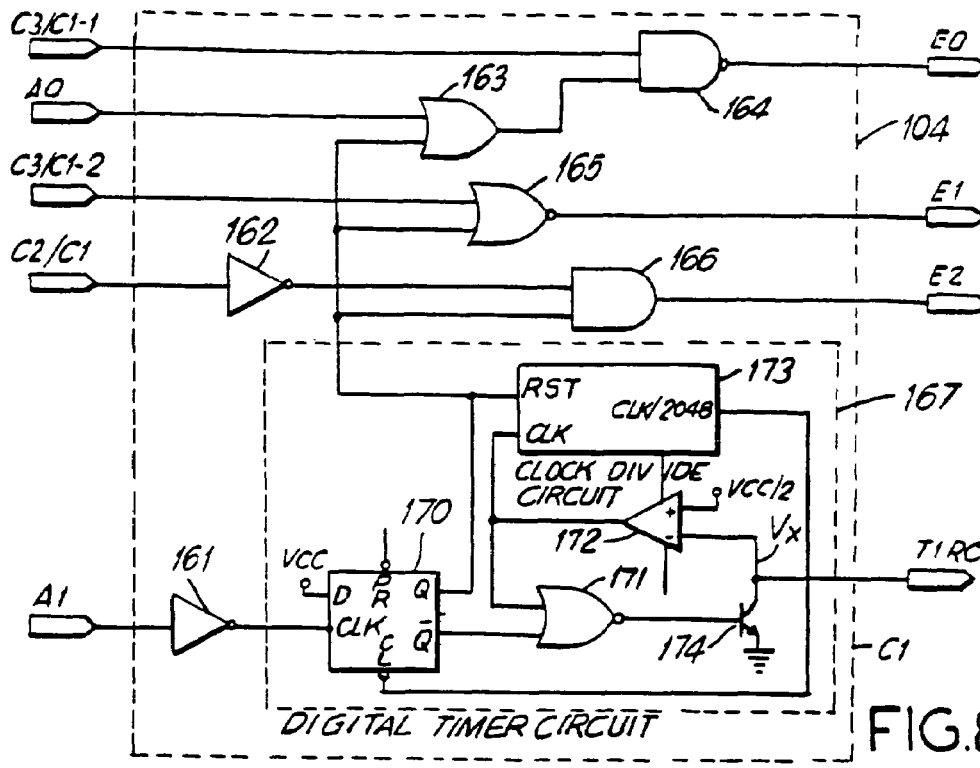
FIG. 8E is a functional logic diagram of the first control circuit (C.sub.1) of the control system of the present invention.

In general, first control logic block $C_1$ provides the first level of system control. This control circuit activates the object detection circuit 107 by generating enable signal $E_0=1$, it activates laser beam scanning circuit 108, photoreceiving circuit 109 and A/D conversion circuit 110 by generating enable signal $E_1=1$, and it activates bar code symbol detection circuit 111 by generating enable signal $E_2=1$. In addition, the first control circuit $C_1$ provides control lines and signals in order to control these functions, and provides a system override function for the low power standby mode of the bar code symbol reading engine. In the illustrative embodiment, the specific operation of first control circuit $C_1$ is dependent on the state of several sets of input signals (i.e., activation control signal $A_0$ and $A_1$, and override signals $C_2/C_1$, $C_3/C_1$-1 and $C_3/C_1$-2) and an internally generated digital timer signal B. A preferred logic implementation of the first control circuit $C_1$ is set forth in FIGS. 8E and 8F. The functional dependencies among the digital signals in this circuit are represented by the Boolean logic expressions set forth in the Table of FIG. 8G, and therefore are sufficient to uniquely characterize the operation of first control circuit $C_1$. As shown in FIG. 8E, first control circuit comprises a pair of logic invertors 161 and 162, an OR gate 163, a NAND gate 164, a NOR gate 165, an AND gate 166, and a digital timer circuit 167 which produces as output, a digital output signal B. As shown, digital timer circuit 167 comprises a flip-flop circuit 170, a NOR gate 171, a clock divide circuit 173, a comparator (i.e., differential) amplifier 172, and a NPN transistor 174. As illustrated, activation control signal $A_1$ is provided to the CLK input of flip-flop 170 by way of invertor 161. The QNOT output of the flip-flop is provided as one input to NOR gate 171, whereas the other input thereof is connected to the CLK input of clock divide circuit 173 and the output of comparator amplifier 172. The output of the NOR gate is connected to the base of transistor 174, while the emitter thereof is connected to electrical ground and the collector is connected to the negative input of comparator amplifier 172 as well as the second timing network 105, in a manner similar to the interconnection of first timing network 102 to primary oscillation circuit 101. Also, the divided clock output (i.e., CLK/2048) produced from clock divide circuit 173 is provided to the CL input of flip-flop 170. As shown, the Q output of flip-flop 170 is connected to the reset (RST) input of the clock divide circuit 173 as well as to one input of OR gate 163, one input of NOR gate 165, and one input of AND gate 166. Notably, the Q output of the flip-flop is the digital output signal B indicated in each of the Boolean expressions set forth in the Table of FIG. 8G.

As shown in FIG. 8E, enable signal $A_0$ from the system override signal detection circuit 100 is provided as the second input to OR gate 163, and the output thereof is provided as input to NAND gate 164. The override signal $C_2/C_1$ from second control circuit $C_2$ is provided as the input to invertor 162, whereas the output thereof is provided as the second input to AND gate 166. The override signal $C_3/C_1$-1 from third control module $C_3$ is provided as the second input to NAND gate 164, whereas the output thereof produces enable signal $E_0$ for activating the object detection circuit 107. The override signal $C_3/C_1$-2 is provided to the second input to NOR gate 165, whereas the output thereof produces enable signal $E_1$ for activating laser scanning and photoreceiving circuits 108 and 109 and A/D conversion circuit 110. The output of AND gate 166 produces enable signal $E_2$ for activating bar code symbol detection circuit 111.

Figure 8F:
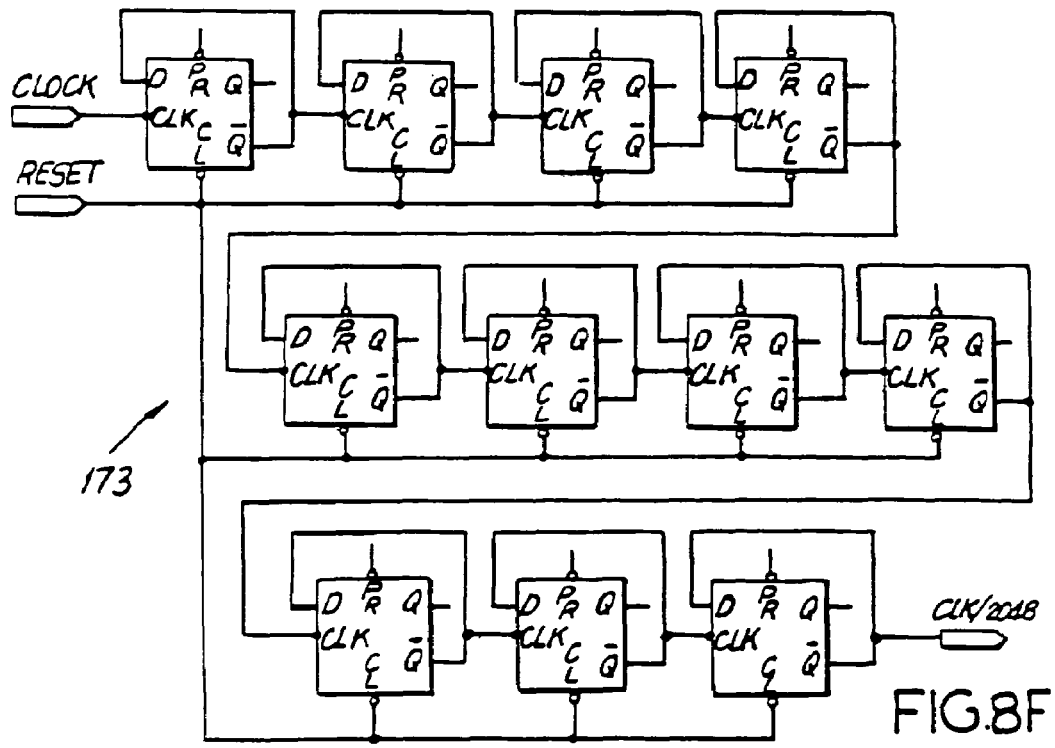
FIG. 8F is a functional logic diagram of the clock divide circuit in the first control circuit C.sub.1 of FIG. 8E.

Referring to FIG. 8E, the operation of digital timer circuit will be described. The output voltage of comparator amplifier 172 keeps transistor 174 in its non-conducting state (i.e., OFF), via NOR gate 171, thus allowing the external RC network 105 to charge to capacity. When comparator input voltage vx exceeds reference voltage VCC/2, the comparator output voltage biases (i.e., switches ON) transistor 174 so as to begin discharging the RC timing network 105, until input voltage vx falls below reference voltage VCC/2 upon which the process repeats, thus generating a digital clock oscillation at the comparator output. The timing cycle of digital output signal B is initiated by a transition on the activation control signal $A_1$ which toggles flip-flop 170. This toggling action sets the digital output signal B to its logical HIGH state, resetting clock divide circuit 173 and starting the digital clock oscillator described above by toggling the Q output of flip-flop 170. As shown in FIG. 8F, clock divide circuit 173 is constructed by cascading eleven flip-flop circuits together in a conventional manner. Each stage of the clock divider circuit divides the input clock signal frequency by the factor 2. Thus the clock divider circuit provides an overall division factor of 2048. When the clock output CLK/2048 toggles, the flip-flop circuit is cleared thus setting the digital signal B to logical LOW until the next pulse of the activation control signal $A_1$.

Figures 8G, 8H:
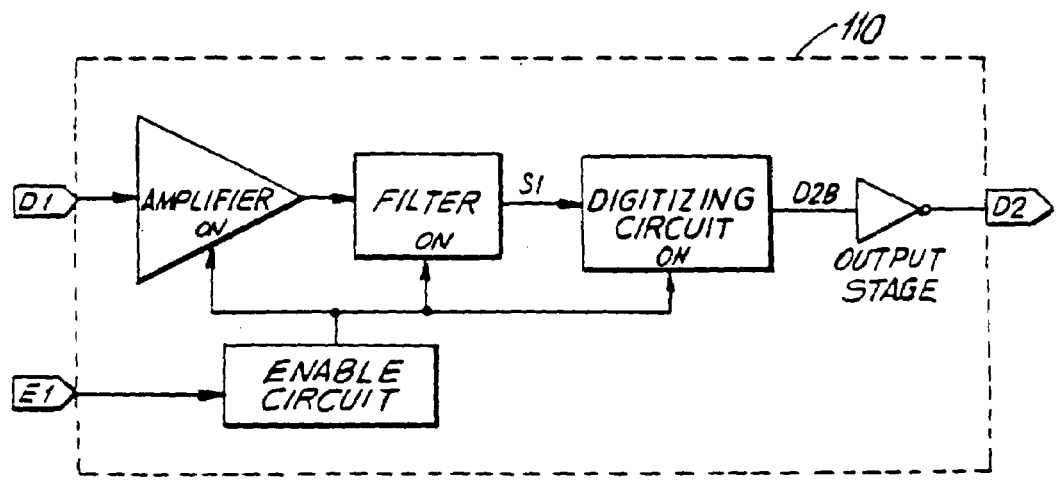
FIG. 8G is table setting forth Boolean logic expressions for the enabling signals produced by the first control circuit C.sub.1
FIG. 8H is a functional block diagram of the analog to digital (A/D) signal conversion circuit in the ASIC chip in the bar code symbol reading engine of the present invention.

As reflected in the Boolean expressions of FIG. 8G, the state of each of the enable signals $E_0$, $E_1$ and $E_2$ produced by the first control circuit $C_1$ is dependent on whether the bar code symbol reading system is in its override state of operation. To better understand the operation of control circuit $C_1$, it is helpful to consider a few control strategies preformed thereby.

In the override state of operation of the system, enable signal $E_0$ can be unconditionally set to $E_0=0$ by the third control circuit $C_3$ setting override signal $C_3/C_1=0$. Under such conditions, the object detection circuit is enabled. Also, when the system override signal detection circuit is activated (i.e., $A_0=1$) or the laser scanning and photoreceiving circuits activated (i.e., $B=1$) and override signal $C_3/C_1$-1=1, then enable signal $E_0=1$ and therefore the object detection circuit is automatically deactivated. The advantage of this control strategy is that it is generally not desirable to have both the laser scanning circuit 108 and photoreceiving circuit 109 and the object sensing circuit 105 active at the same time, as the wavelength of the infrared LED 148 typically falls within the optical input spectrum of the photoreceiving circuit 109. In addition, less power is consumed when the object detection circuit 107 is inactive (i.e., disabled).

As illustrated in FIG. 8, laser scanning circuit 108 comprises a light source 177 which, in general, may be any source of intense light suitably selected for maximizing the reflectivity from the object bearing a bar code symbol. In the preferred embodiment, light source 177 comprises a solid-state visible laser diode (VLD) which is driven by a conventional driver circuit 178. In the illustrative embodiment, the wavelength of visible laser light produced from the laser diode is preferably about 670 nanometers. In order to repeatedly scan the produced laser beam over the scan field (having a predetermined spatial extent in front the light transmission window), a planar scanning mirror 179 is rapidly oscillated back and forth by a flipper or stepper motor 180 driven by a conventional driver circuit 181, as shown. A. stationary mirror 182 is mounted on the underside of housing portion 85A along an optical path between laser diode 177 and planar mirror 179, in order to direct the laser beam from the laser diode to the oscillating planar mirror 179. To selectively activate both laser light source 177 and motor 180, laser diode and scanning motor enable signal $E_1$ is provided as input to driver circuits 178 and 181. When enable signal $E_1$ is a logical "high" level (i.e., $E_1=1$) a laser beam is generated and projected through the light transmissive window, when the projected laser beam is repeatedly scanned across the scan field, and an optical scan data signal is thereby produced off the object (and bar code) residing within the scan field. When laser diode and scanning motor enable signal $E_1$ is a logical "low" (i.e., $E_1=0$), there is no laser beam produced, projected, or scanned across the scan field.

When a bar code symbol is present on the detected object at the time of scanning, the user visually aligns the visible laser beam across the bar code symbol and incident laser light on the bar code will be scattered and reflected. This scattering/reflection process produces a laser light return signal of variable intensity which represents a spatial variation of light reflectivity characteristic of the pattern of bars and spaces comprising the bar code symbol. Photoreceiving circuit 109 detects at least a portion of the reflected laser light of variable intensity and produces an analog scan data signal $D_1$ indicative of the detected light intensity. In the illustrative embodiment, photoreceiving circuit 109 generally comprises a number of components, namely: laser light collection optics (i.e., planar mirror 179 and focusing lens 184) for focusing reflected laser light for subsequent detection; a photoreceiver 185 (e.g., a silicon photosensor) mounted onto PC board 87, as shown in FIG. 7F, for detecting laser light focused by the light collection optics; and a frequency selective filter 186A, mounted in front of photoreceiver 185, for transmitting thereto only optical radiation having wavelengths up to a small band above 670 nanometers.

In order to prevent optical radiation slightly below 670 nanometers from passing through light transmission aperture 110 and entering the housing, a light transmissive window realized as a plastic filter lens 186B is installed over the light transmission aperture of the housing. This plastic filter lens has optical characteristics which transmit only optical radiation from slightly below 670 nanometers. In this way, the combination of plastic filter lens 186B at the transmission aperture and frequency selective filter 186A before photoreceiver 185 cooperate to form a narrow bandpass optical filter having a center frequency $f_c=670$ nanometers. By permitting only optical radiation associated with the visible laser beam to enter the housing, this optical arrangement provides improved signal-to-noise ratio for detected scan data signals $D_1$.

In response to reflected laser light focused onto photoreceiver 185, photoreceiver 185 produces an analog electrical signal which is proportional to the intensity of the detected laser light. This analog signal is subsequently amplified by preamplifier 187 to produce analog scan data signal $D_1$. In short, laser scanning circuit 108 and photoreceiving circuit 109 cooperate to generate analog scan data signals $D_1$ from the scan field, over time intervals specified by first control circuit $C_1$ during normal modes of operation, and by third control module $C_3$ during "control override" modes of operation.

As illustrated in FIG. 8, analog scan data signal $D_1$ is provided as input to A/D conversion circuit 110, shown in FIG. 8H. In a manner well known in the art, A/D conversion circuit 110 processes analog scan data signal $D_1$ to provide a digital scan data signal $D_2$ which has a waveform that resembles a pulse width modulated signal, where logical "1" signal levels represent spaces of the scanned bar code and logical "0" signal levels represent bars of the scanned bar code. A/D conversion circuit 110 can be realized using any conventional A/D conversion techniques well known in the art. Digitized scan data signal $D_2$ is then provided as input to bar code presence detection circuit 111 and symbol decoding module 119 for use in performing particular functions required during the bar code symbol reading process of the present invention.

The primary purpose of bar code presence detection circuit 111 is to determine whether a bar code is present in or absent from the scan field, over time intervals specified by first control circuit $C_1$ during normal modes of operation and by third control module $C_3$ during control override modes of operation. In the illustrative embodiment, bar code presence detection circuit 111 indirectly detects the presence of a bar code in the scan field by detecting its bar code symbol "envelope". In the illustrative embodiment, a bar code symbol envelope is deemed present in the scan field upon detecting a corresponding digital pulse sequence in digital signal $D_2$ that A/D conversion circuit 110 produces when photoreceiving circuit 109 detects laser light reflected off a bar code symbol scanned by the laser beam produced by laser beam scanning circuit 108. This digital pulse sequence detection process is achieved by counting the number of digital pulse transitions (i.e., falling pulse edges) that occur in digital scan data signal $D_2$ within a predetermined time period $T_1$ clocked by the bar code symbol detection circuit. According to the laws of physics governing the laser scanning operation, the number of digital (pulse-width modulated) pulses detectable at photoreceiver 185 during time period $T_1$ is a function of the distance of the bar code from the light transmission window 111 at the time of scanning. Thus a bar code symbol scanned at 6" from the light transmission window will produce a larger number of digital pulses (i.e., digital count) at photoreceiver 185 during time period $T_1$ than will the same bar code symbol scanned at 3" from the light transmission window.

In the illustrative embodiment, the bar code symbol detection circuit 111 is provided with the capacity to detect the presence of a bar code symbol in either the long or short range portions of the scan field, as specified in FIGS. 3 and 3A. This is achieved by counting the digital pulse transitions present in digital scan signal $D_2$ within predetermined time period $T_1$ and producing second control activation signal $A_{2S}$ (i.e., $A_{2S}=1$) when the counted number of pulse transitions equals or exceeds a first prespecified digital pulse transition count corresponding to a bar code symbol scanned in the short range portion of the scan field., and producing second control activation signal $A_{2L}$ (i.e., $A_{2L}=1$) when the counted number of pulse transitions equals or exceeds a second prespecified digital pulse transition count corresponding to a bar code symbol scanned in the long range portion of the scan field. As shown in FIG. 8, both of these second control activation signals $A_2L$ and $A_2S$ are produced and provided as input to second control circuit $C_2$. However, second control circuit $C_2$ selectively provides (e.g., gates) the second control activation signal that corresponds to range-mode of operation selected by the user. When the long range mode of operation has been selected by range selection circuit 115, the device will automatically undergo a transition from bar code presence detection state to bar code symbol reading state upon receiving control activation signal $A_2L=1$. Similarly, when the short range mode of operation has been selected by the range selection circuit 115, the device will automatically undergo a transition from bar code presence detection state to bar code symbol reading state upon receiving control activation signal $A_2S=1$.

Figure 8I:
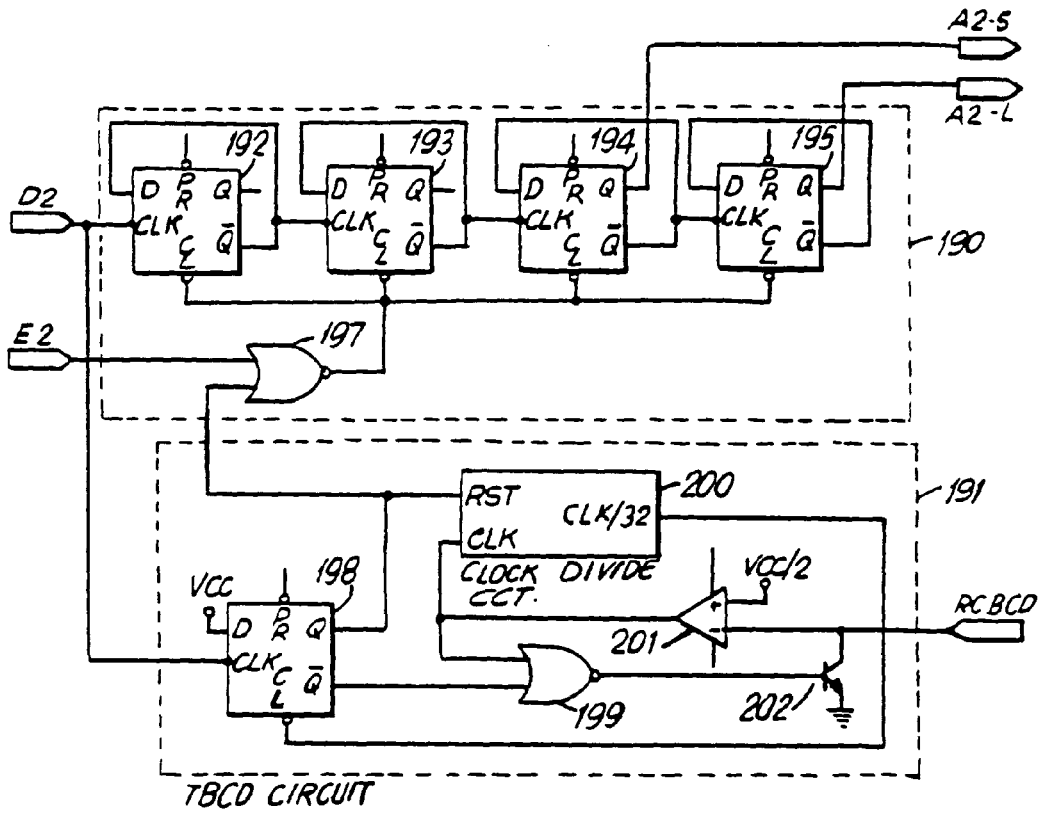
FIG. 8I is a functional logic diagram of the bar code symbol (Presence) detection circuit in the ASIC chip in the bar code symbol reading engine of the present invention.
Figure 8J:
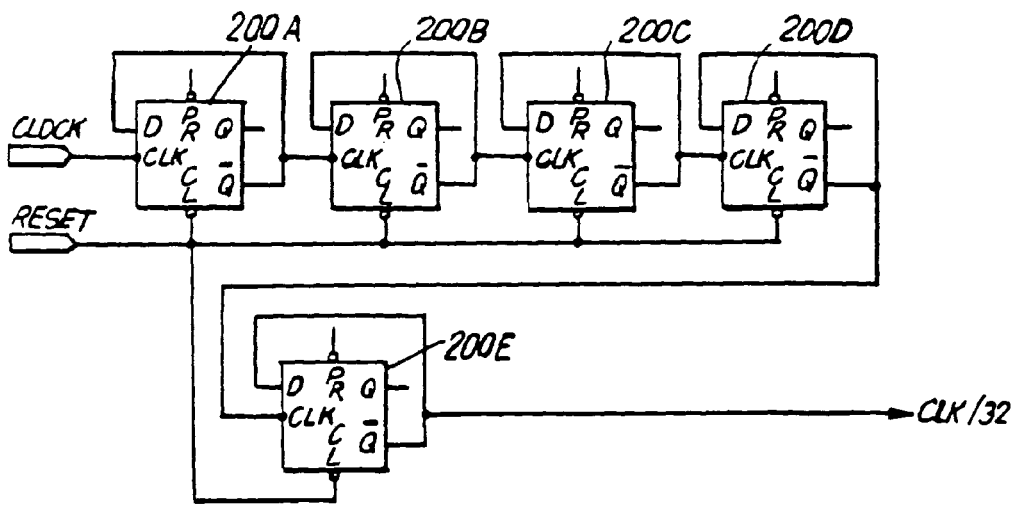
FIG. 8J is a functional logic diagram of the clock divide circuit in the bar code symbol detection circuit of FIG. 8I.
Figures 8K, 8M:
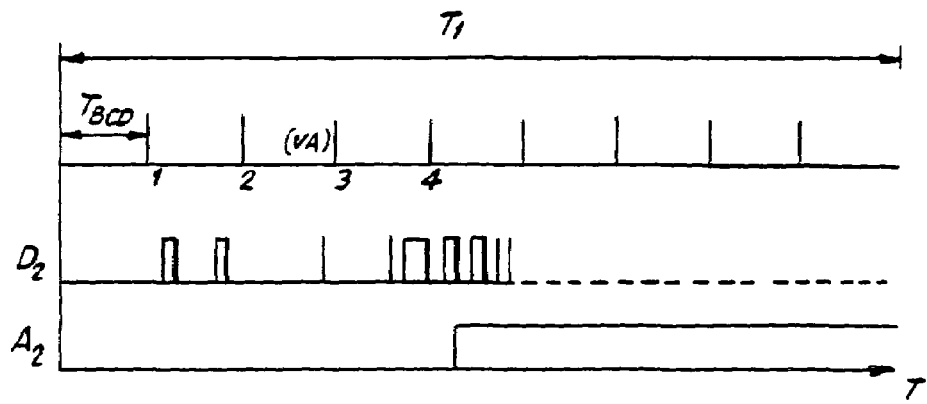
FIG. 8K is a schematic representation of the time window and subintervals maintained by the bar code symbol detection circuit during the bar code symbol detection process.
FIG. 8M is Boolean logic table defining the functional relationships among the input and output signals into and out from the second control circuit C.sub.2 of FIG. 8N.

In the illustrative embodiment, bar code symbol presence detection circuit 111 comprises a digital pulse transition counter 190 for counting digital pulse transitions during time period $T_1$, and a digital clock circuit (i.e., $T_{BCD}$ circuit) 191 for measuring (i.e., counting) time period $T_{BCD}$ and producing a count reset signal CNT RESET at the end of each such time period, as shown in FIG. 8K. As shown in FIG. 8K, the function of digital clock circuit 191 is to provide a time period $T_{BCD}$ (i.e., time window subdivision) within which the bar code symbol detection circuit attempts, repeatedly during time period $T_1$, to detect a bar code symbol in the scan field. In the preferred embodiment, $T_{BCD}$ is about 0.1 seconds, whereas $T_1$ is about 1.0 second. As shown in FIG. 8I, in order to establish such "bar code search" time subintervals within time period $T_1$, the digital clock circuit 191 generates the first count reset pulse signal CNT RESET upon the detection of the first pulse transition in digital scan data signal $D_2$. The effect of this reset signal is to clear or reset the digital pulse transition (falling edge) counter. Then at the end of each time subinterval $T_{BCD}$, digital clock signal 191 generates another count reset pulse CNT RESET to reset the digital pulse transition counter. If during time window $T_1$, a sufficient number of pulse transitions in signal $D_2$ are counted over a subinterval $T_{BCD}$, then either control activation signal $A_2L$ or $A_2S$ will be set to "1". In response to the detection of this condition, second control circuit $C_2$ automatically enables control activation $C_3$ in order to initiate a transition from the bar code symbol detection state of operation to the bar code symbol reading state of operation.

As shown in FIG. 8I, digital pulse transition counter 191 is formed by wiring together a series of four flip-flop circuits 192 to 195, such that each flip flop divides the clock signal frequency of the previous stage by a factor of 2. As indicated in the drawing of FIG. 8I, the Q output of flip flops 192 to 194 represent the binary digits 2, 4, 8, and 16 respectively, of a binary number (i.e., counting) system. As shown, enable signal $E_2$ from first control circuit $C_1$ is provided as input to NOR gate 197, while the second input thereto is the counter reset signal CNT RESET provided from the digital counter circuit 191. In order to reset or clear the pulse transition counter circuit 190 upon the generation of each CNT RESET pulse, the output of the NOR gate 197 is connected to the clear line (CL) of each flip flop 192 to 195, as shown.

As illustrated in FIG. 8I, digital clock circuit 191 comprises a flip-flop circuit 198, a NOR gate 199, a clock divide circuit 200, a comparator 201, and a NPN transistor 202. As illustrated, digital scan data signal $D_2$ is directly provided to the CLK input of flip-flop 198. The QNOT output of the flip-flop is provided as one input to NOR gate 199, whereas the Q output thereof is connected to the CLK input of clock divide circuit 200 and the second input of NOR gate 197. The other input of NOR gate 199 is connected to the input line CLK of clock divide circuit 200 and to the output of comparator 201, as shown. The output of the NOR gate is connected to the base of transistor 202, while the emitter thereof is connected to electrical ground and the collector is connected to the negative input of comparator 201 as well as to the third timing network 112, in a manner similar to the interconnection of the first timing network 102 to primary oscillation circuit 101. As shown in FIG. 8J, clock divide circuit 200 is realized as series of five flip-flops 200A to 200E wired together so as to divide digital clock input signal CLOCK by 32, and be resettable by pulsing reset line RESET in a conventional manner.

When an object is detected in the scan field, first control circuit $C_1$ produces enable signal $E_2=1$ so as to enable digital pulse transition counter 190 for a time duration of $T_1$. As shown, the digital scan data signal $D_2$ (representing the bars and spaces of the scanned bar code) drives the clock line of first flip flop 192, as well as the clock line of flip flop 198 in the $T_{BCD}$ timer circuit. The first pulse transition in digital scan data signal $D_2$ starts digital timer circuit 191. The production of each count reset pulse CNT RESET from digital timer circuit 191 automatically clears the digital pulse transition counter circuit 190, resetting it once again to count the number of pulse transitions present in the incoming digital scan data signal $D_2$ over a new time subinterval $T_{BCD}$. The Q output corresponding to eight pulse transitions counted during time period $T_{BCD}$, provides control activation signal $A_2S$ for use during the short range mode of operation. The Q output corresponding to sixteen pulse transitions counted during time period $T_{BCD}$, provides control activation signal $A_2L$ for use during the long range mode of operation. When the presence of a bar code in the scan field is detected, second activation control signal $A_2L$ or $A_2S$ is generated, third control circuit $C_3$ is activated and second control circuit $C_2$ is overridden by third control circuit $C_3$ through the transmission of control override signals (i.e., $C_3/C_2$ inhibit and $C_3/C_1$ enable signals) from the third control circuit $C_3$.

Figure 8L:
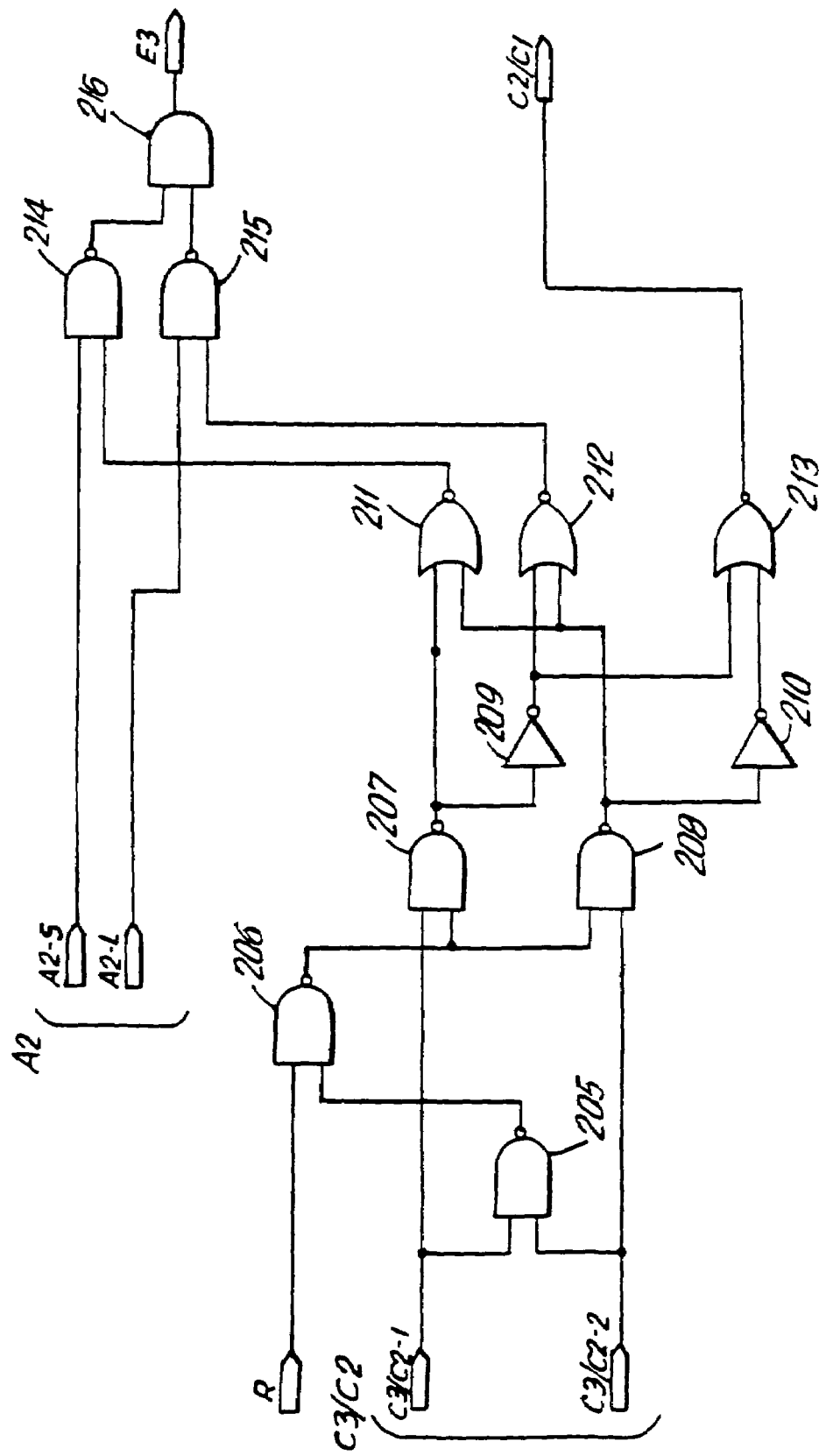
FIG. 8L is a functional logic diagram of the second control circuit (C.sub.2) in the ASIC chip in the automatic bar code symbol reading engine of the present invention.

As illustrated in FIG. 8L, second control circuit $C_2$ is realized using logic circuitry consisting of NAND gates 205 to 208, invertors 209 and 210, NOR gates 211 to 213, NAND gates 214 and 215, AND gate 216, configured together as shown. As shown, second control activation signals $A_2S$ and $A_2L$ are provided to the first inputs of NAND gates 214 and 215, respectively, whereas the outputs of NOR gates 211 and 212 are provided to the second inputs of NAND gates 214 and 215 respectively. The outputs of NAND gates 214 and 215 are provided to the inputs of AND gate 216 and the output thereof provides enable signal $E_3$ for enabling third control module $C_3$.

As shown in FIG. 8L, the third control module $C_3$ provides override signals $C_3/C_2$-1 and $C_3/C_2$-2 to the first and second inputs of NAND gate 205 and to the first input of NAND gate 207 and the first input of NAND gate 208, respectively. The range selection signal R produced from range selection circuit 115 is provided as input to NAND gate 206. As shown, output of NAND gate 205 is provided as the second input to NAND gate 206. The output of NAND gate 206 is provided as the second input to NAND gate 207 and the second input to NAND gate 208. As shown in FIG. 8L, the output of NAND gate 207 is provided as an input to NOR gate 211 and invertor 209, whereas the output of NAND gate 208 is provided as inputs to NOR gates 211 and 212 and invertor 210. The output of invertor 209 is provided as the other input to NOR gate 212 and one input to NOR gate 213. The output of invertor 210 is provided as another input to NOR gate 213, whereas the output thereof provides control override signal $C_2/C_1$. So configured, the combinational logic of the second control circuit $C_2$ maps its input signals to its output signals in accordance with the logic table of FIG. 8M. Upon entering the bar code symbol reading state, third control module $C_3$ provides override control signal $C_3/C_1$ to first control circuit $C_1$ and second control circuit $C_2$. In response to control signal $C_3/C_1$, the first control circuit $C_1$ produces enable signal $E_1=1$ which enables scanning circuit, 109 photoreceiving circuit 109 and A/D conversion circuit 110. In response to control signal $C_3/C_2$, the second control circuit $C_2$ produces enable signal $E_2=0$, which disables bar code symbol detector circuit 111. Thereafter, third control module $C_3$ produces enable signal $E_4$ to enable symbol decoding module 119. In response to the production of such signals, the symbol decoding module decode processes, scan line by scan line, the stream of digitized scan data contained in signal $D_2$ in an attempt to decode the detected bar code symbol within the second predetermined time period $T_2$ established and monitored by the third control module $C_3$. If the symbol decoding module 119 successfully decodes the detected bar code symbol within time period $T_2$, then symbol character data $D_3$ (representative of the decoded bar code symbol and typically in ASCII code format) is produced. Thereupon symbol decoding module 119 produces and provides the third control activation signal $A_3$ to the third control module $C_3$ in order to induce a transition from the bar code symbol reading state to the data packet transmission state. In response thereto, a two distinct events occur. First the third control module $C_3$ produces and provides enable signal $E_5$ to data packet synthesis module 120. Secondly, symbol decoding module 119 stores symbol character data $D_3$ in a memory buffer associated with data packet synthesis module 120.

Figure 13A:
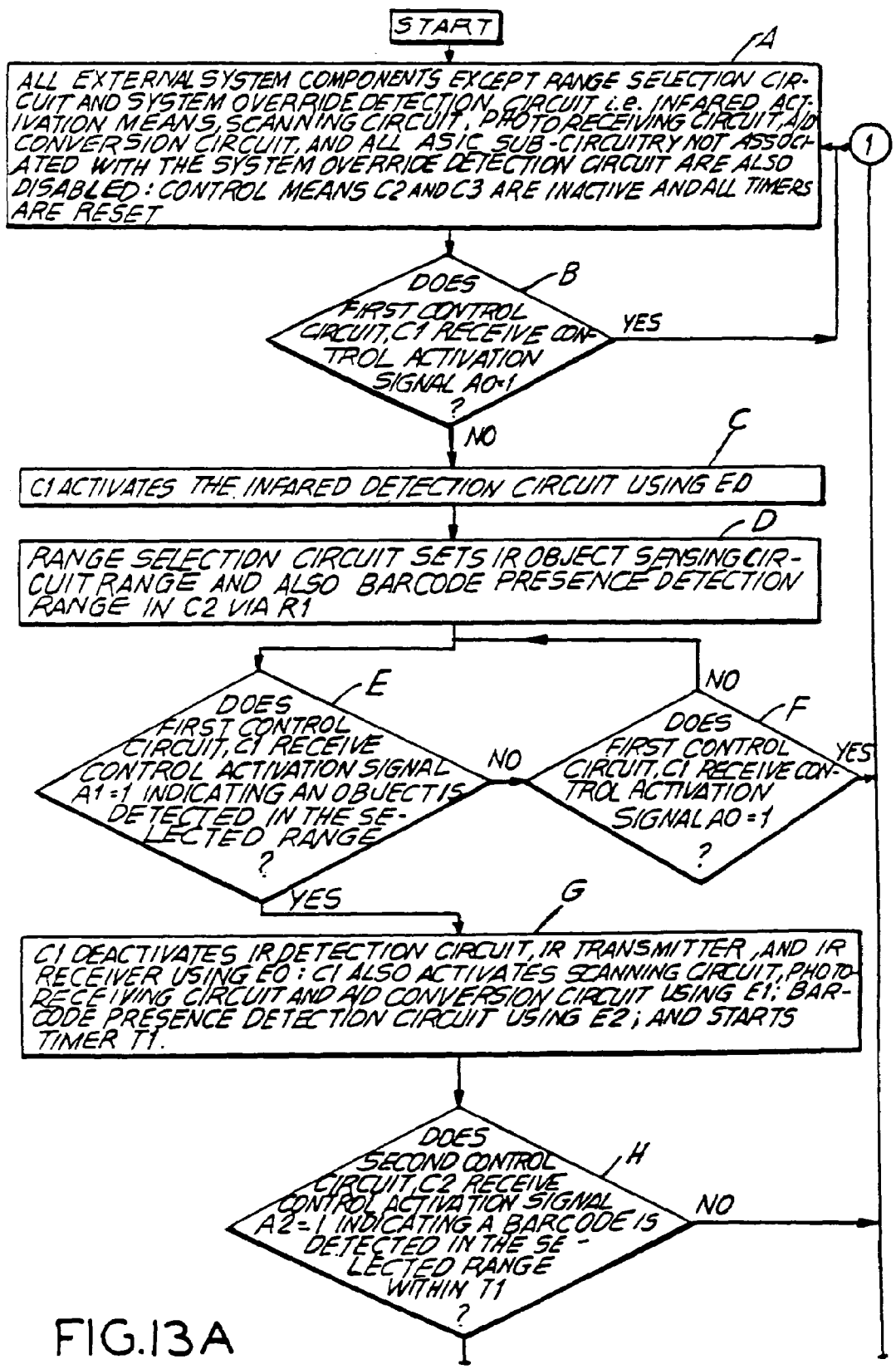
FIGS. 13A to 13C, taken together, show a high level flow chart of the control process performed by the control subsystem of the bar code symbol reading device, illustrating various modes of object detection, bar code presence detection and bar code symbol reading.
Figure 13A:
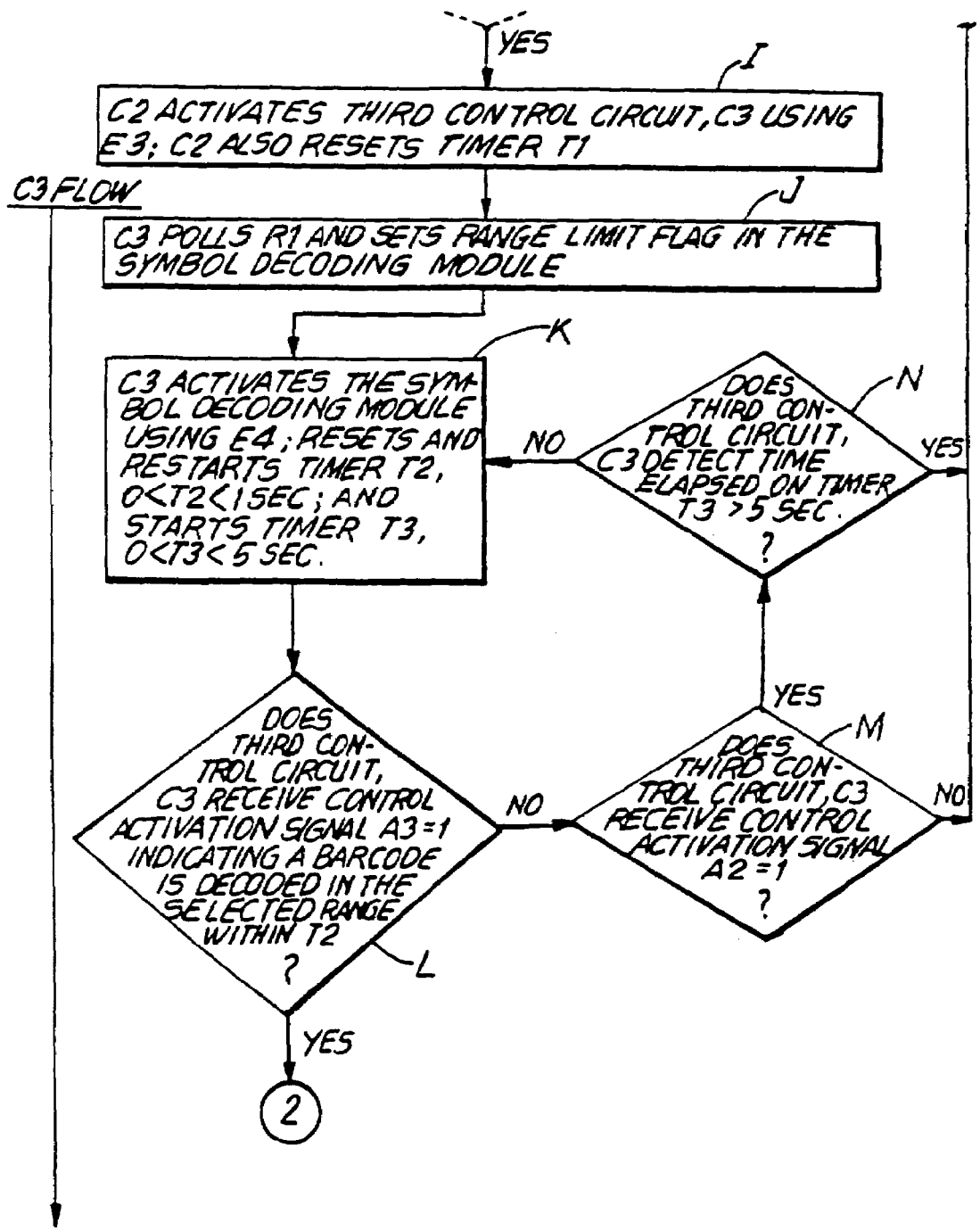

In the illustrated embodiment, symbol decoding module 119, data packet synthesis module 120, and timers $T_2$, $T_3$, $T_4$ and T5 are each realized using programmed microprocessor and accessible memory 134. Similarly, third control module $C_3$ and the control functions which it performs at Blocks I to GG in FIGS. 13A and 13C, are realized as a programming implementation using techniques well known in the art.

The function of data packet synthesis module 120 is to use the produced symbol character data to synthesize a group of data packets for subsequent transmission to its mated base unit by way of data packet transmission circuit 121.

Figure 8N:
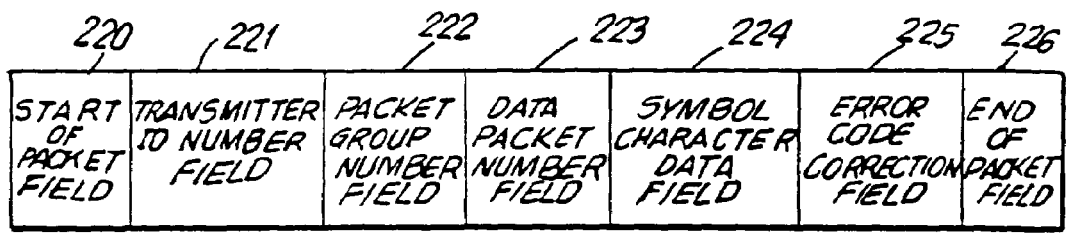
FIG. 8N is a schematic representation of the format of each data packet transmitted from the data packet transmission circuit of FIG. 9.

In the illustrative embodiment, each synthesized data packet is formatted as shown in FIG. 8N. In particular, each data packet in each data packet group comprises a number of data fields, namely: Start of Packet Field 220 for containing a digital code indicating the beginning of the transmitted data packet; Transmitter Identification Number Field 221 for containing a digital code representative of the Transmitting Bar Code Symbol Reader; Data Packet Group Number Field 222 for containing a digital code (i.e., a first module number) assigned to each particular data packet group being transmitted; Data Packet Transmission No. Field 223 for containing a digital code (i.e., a second module number) assigned to each data packet in each data packet group being transmitted; Symbol Character Data Field 224 for containing digital code representative of the symbol character data being transmitted to the base unit; Error Correction Code Field 225 for containing a digital error correction code for use by the receiving base unit to determine if error in data packet transmission has occurred; and End of Packet Field for 226 for containing a digital code indicating the end of the transmitted data packet.

Figure 9:
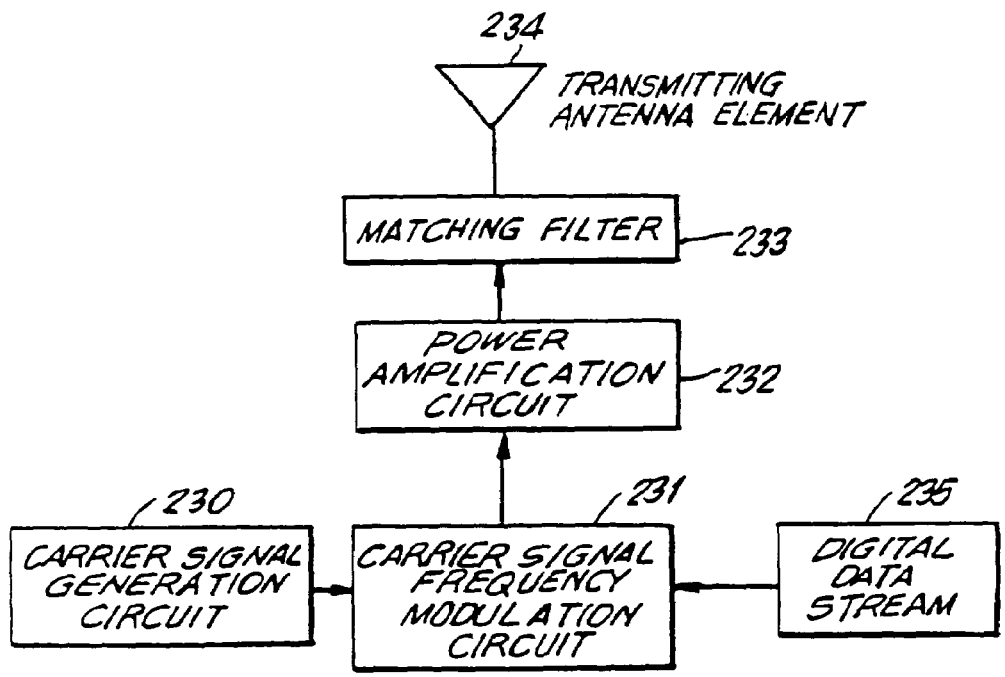
FIG. 9 is a functional block diagram of the data packet transmission circuit of the bar code symbol reading system of the present invention.

After the data packet synthesis module synthesizes a group of data packets as described above, the third control module $C_3$ provides enable signal $E_7$ to data packet transmission circuit 121. As illustrated in FIG. 9, the data packet transmission circuit comprises a carrier signal generation circuit 230, a carrier signal frequency modulation circuit 231, a power amplifier 232, a matching filter 233, and a quarterwave ($\lambda/4$) transmitting antenna element 234. The function of the carrier signal generation circuit 230 is to generate a carrier signal having a frequency in the RF region of the electromagnetic spectrum. In the illustrative embodiment, the carrier frequency is about 912 Mhz, although it is understood that this frequency may vary from one embodiment of the present invention, to another embodiment thereof. As the carrier signal is being transmitted from transmitting antenna 234, frequency modulation circuitry 231 modulates the instantaneous frequency of the carrier signal using the digital data sequence (i.e., digital data stream) 235 constituting the group of data packets synthesized by the data packet synthesis module 120. The function of the power amplifier is to amplify the power of the transmitted modulated carrier signal so that it may be received by a base unit of the present invention located within a predetermined data transmission range (e.g., from about 0 to about 30 feet), illustrated in FIGS. 2, 4, 5A, and 6D, in particular.

In general, each base unit of the present invention performs a number of functions. First, the base unit receives the modulated carrier signal transmitted from a hand-supportable bar code symbol reading device within the data reception range of the base unit. Secondly, the base unit demodulates the received carrier signal to recover the data packet modulated thereunto during signal transmission. Thirdly, the base unit analyzes each of the recovered data packets to determine whether the received carrier signal was transmitted from a hand-supportable bar code symbol reading device preassigned to the receiving base unit. Fourthly, the base unit recovers the symbol character data from at least one data packet in a transmitted group of data packets, and ascertaining the reliability of the recovered symbol character data. Fifthly, the base unit generates an acoustical acknowledgement signal $S_{ACK}$ that can be audibly perceived by the operator of the transmitting bar code symbol reading device while located in the data reception range of the base unit. Finally, the base unit transmits the received symbol character data to a host computer system or like device. Each of these functions will be described in greater detail during the detailed description of the Main System Control Routine set forth in FIGS. 13A to 13C.

In order to better understand the functions performed by the bar code symbol reading device and base unit of the present invention, it will be helpful to first describe the principles underlying the data communication method of the present invention, and thereafter discuss the role that the base unit plays in carrying out this communication method.

In a typical application of the present invention, a (resultant) system of bar code symbol reading subsystems are installed in physical proximity with each other. Typically each system is a point of sale (POS) station including a host computer system interfaced with a base unit of the present invention and an automatic hand-supportable bar code symbol reading device preassigned to one of the base units. To register (i.e., associate) each bar code symbol reading device with a preassigned base unit, each bar code symbol reading device is preassigned a unique "Transmitter Identification Code" which is stored in a memory in the assigned base unit during a set-up procedure. In the illustrative embodiment, the carrier frequency of the data packet transmitter in each bar code symbol reading device is substantially the same for all bar code symbol reading devices in the resultant system. Also, the data packet transmission range of each bar code symbol reading device will be substantially greater than the distance between each bar code symbol reading device and a neighboring base unit to which the bar code symbol reading unit is not assigned. Consequently, under such operating conditions, at any instance in time, any base station in the resultant system may simultaneously receive two or more packet modulated carrier signals which have been transmitted from two or more bar code symbol reading devices being used in the resultant system. These bar code symbol reading devices may include the bar code symbol reading device preassigned to the particular base unit as well as neighboring bar code symbol reading devices. Thus due to the principles of data packet transmission of present invention, there exists the possibility that any particular base unit may simultaneously receive two or more different data packets at any instant in time, thereby creating a "packet interferences" situation.

Figure 10:
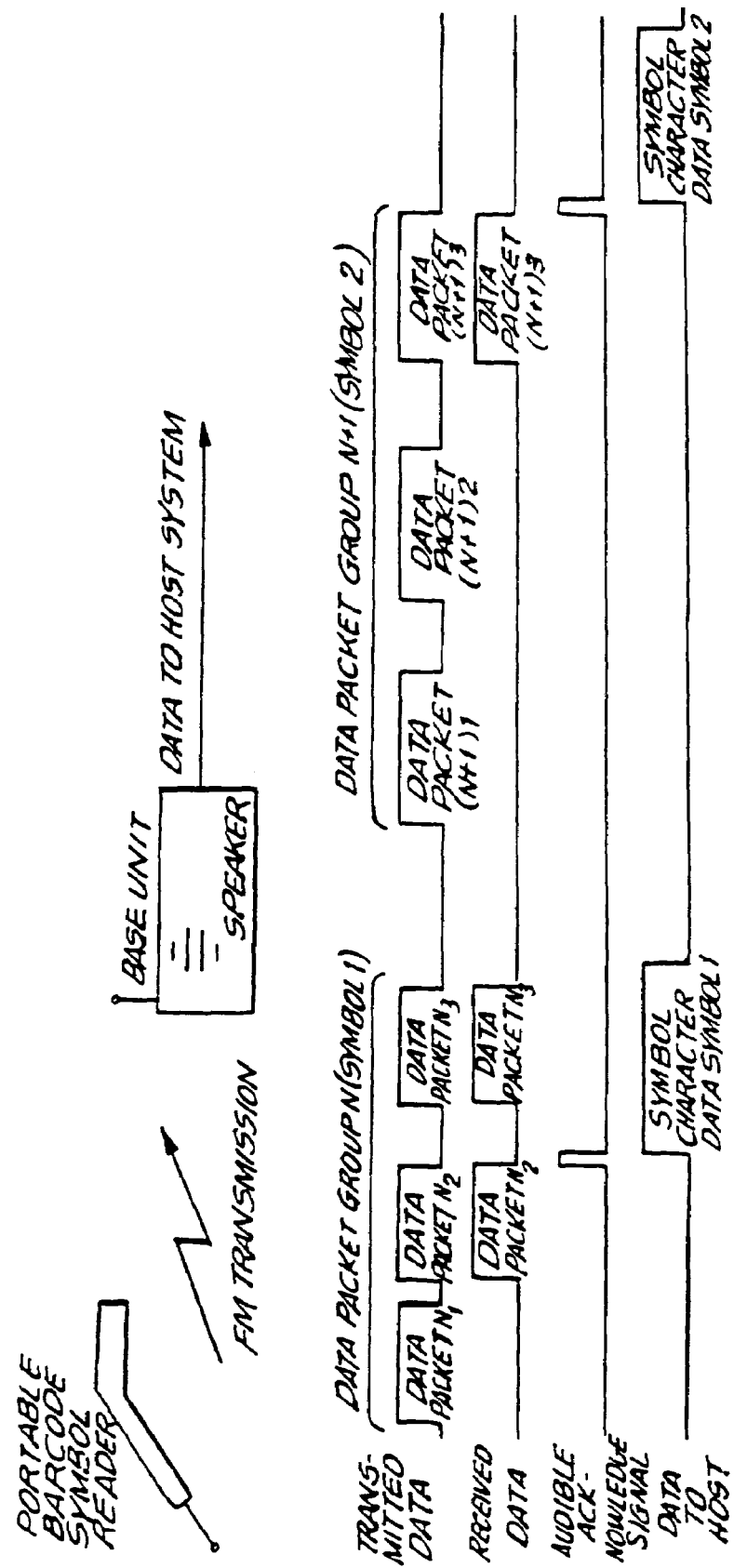
FIG. 10 is a schematic representation illustrating several groups of data packets transmitted from the bar code symbol reading device hereof in accordance with the principles of data packet transmission and reception scheme of the present invention.

In order to ensure that each base unit in the resultant system is capable of receiving at least one data packet from a data packet group transmitted by its preassigned bar code symbol reading device (i.e., without risk of interference from neighboring bar code symbol reading device transmitters), the unique "data packet group" transmission scheme shown in FIG. 10 is employed. As shown, upon the successful reading of a first bar code symbol and the production of its symbol character data $D_3$, data packet synthesis module 120 aboard the bar code symbol reading device automatically produces a first (i.e., N=1) group of (three) data packets, each having the packet format shown in FIG. 9. Thereafter, the data packet transmission circuit 121 uses the digital data bit stream, representative of the synthesized data packet group, to modulate a carrier signal transmitted from the hand-supportable bar code symbol reading device.

In the illustrative example shown FIG. 10, only the second and third data packets of the group sent over the modulated carrier signal are shown as being received by the preassigned base unit. As shown in this drawing, the base unit transmits the recovered symbol character data $D_3$ to its host computer system, upon receiving the second data packet in the transmitted group of data packets. Thereafter, the base unit produces an acoustical acknowledgement signal $S_{ACK}$ of sufficient intensity that it can be easily heard by the operator of the bar code symbol reading device that transmitted the received data packet. The function of the acoustical acknowledgment signal is to provide the operator with an audible acknowledgement that the symbol character data $D_3$ (associated with the recently read bar code symbol) has been received by the base unit and transmitted to its host computer system for processing and or subsequent storage. Notably, while the third data packet $N_3$ is also received by the base unit, the available acknowledgement signal $S_{ACK}$ and symbol character data transmission is not produced as packet $N_3$ contains redundant information already received by the second packet $N_2$ of the same group.

In the preferred embodiment, the pitch of the transmitted acoustical acknowledgement signal $S_{ACK}$ is uniquely specified and assigned to a particular bar code symbol reading unit. This way the operator of each bar code symbol reading (sub)system can easily recognize (i.e., discern) the audible acoustical acknowledgement signal produced from the base unit preassigned to his or her bar code symbol reading device. At the same time, this pitch assignment scheme allows each operator to ignore audible acoustical acknowledgment signals produced from neighboring base units not mated with his or her portable bar code symbol reading device. If after reading a bar code symbol, the operator does not see the visual "good read" indication light on its device "flash" or "blink" and immediately thereafter hear its preassigned acoustical acknowledgement signal emanate from its base unit, then the operator is implicitly informed that the symbol character data of the read bar code symbol was not successfully received by the base unit. In response to such an event, the operator simply rereads the bar code symbol and awaits to hear the acoustical acknowledgment signal emanating from the base unit.

Notably, it may even be desirable in some operating environments to produce acoustical acknowledgement signals in the form of a unique series of notes preassigned to a bar code symbol reading device and its "mated" base unit. The pitch or note sequence assigned to each mated base unit and bar code symbol reading device can be stored in a memory (e.g., EPROM) realized in the base unit, and can be programmed at the time of system set-up and modified as required. Preferably, each pitch and each note sequence is selected so that it can be readily distinguished and recognized by the operator to which it is uniquely directed.

Also shown in FIG. 10 is the case where the bar code symbol reading device reads a second bar code symbol and then transmits a second (N=2) group of data packets. However, due to interference only the third data packet in the second transmitted group of data packets is received at the respective base unit. Despite such group transmission errors (e.g., due to channel corruption or non-radio transmissive obstructions), the base unit as shown is nevertheless able to recover the transmitted symbol character data. Upon receiving the third data packet, recovering the packaged symbol character data and transmitting the same to the host computer system, the bar code symbol reading device generates an acoustical acknowledgement signal having a pitch or note sequence that the operator can hear and recognize as an indication that the data packet reception was successful.

Figure 11:
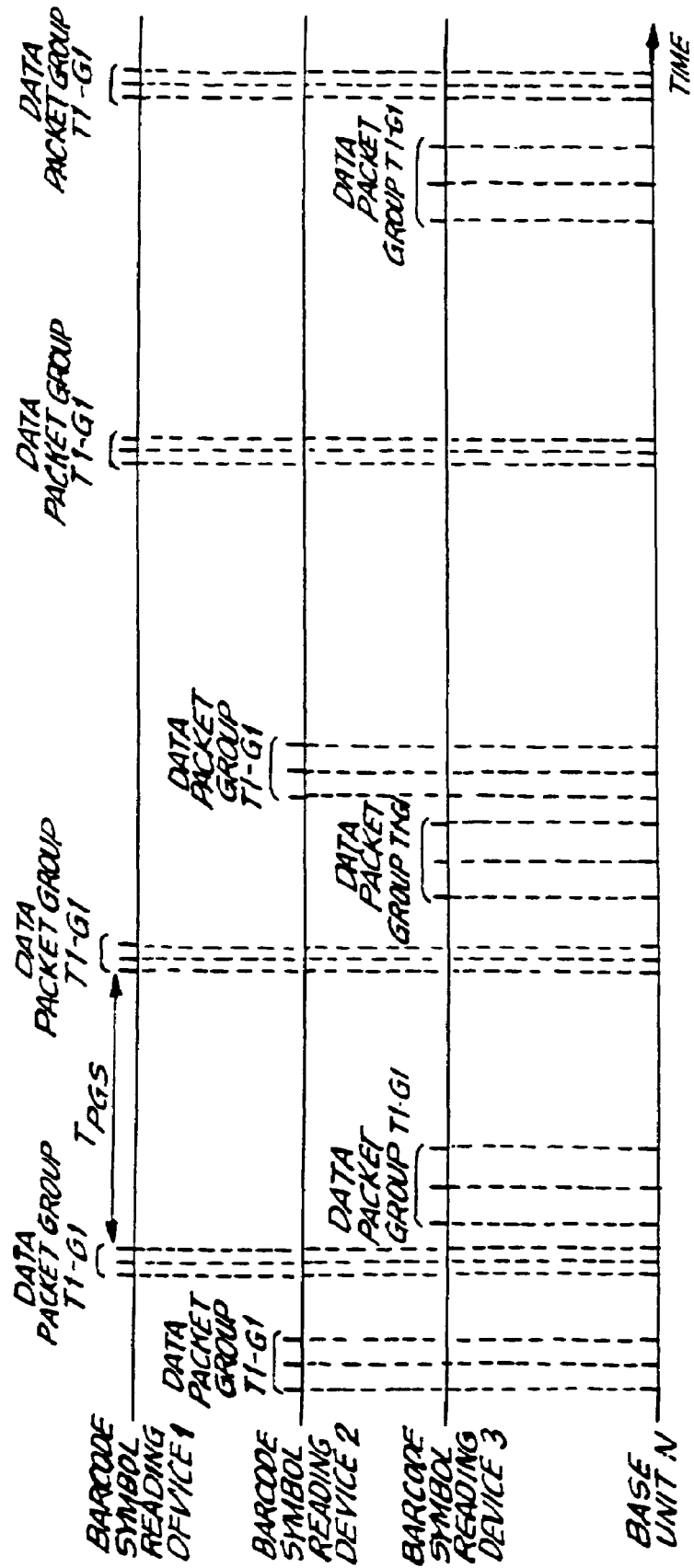
FIG. 11 is a schematic representation of an exemplary set of groups of data packet pseudo randomly transmitted from neighboring bar code symbol reading devices, and received at one base unit in physical proximity therewith.
Figure 12:
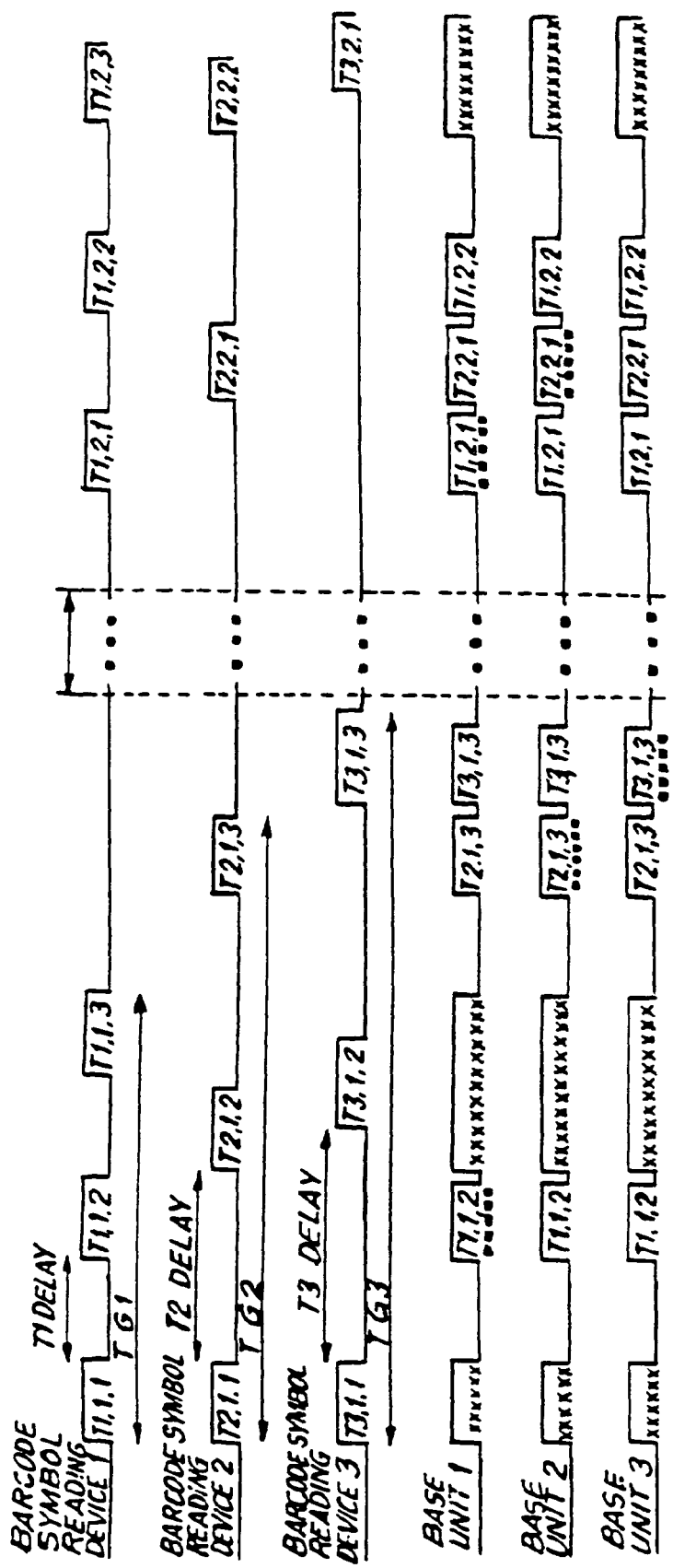
FIG. 12 is a schematic representation of an exemplary set of data packets simultaneously transmitted from three neighboring bar code symbol reading devices of the present invention, and received at the associated base units assigned thereto.

In FIGS. 11 and 12, the data packet transmission and reception scheme of the present invention is shown for the case of three station system. In the best case scenario shown in FIG. 11, the group of data packets transmitted from each bar code symbol reading device is transmitted at a time when there are no neighboring bar code symbol reading devices transmitting data packets. This case will occur most frequently, as the total transmission times for each group of data packets is selected to be substantially smaller than the random time durations lapsing naturally between adjacent data packet transmissions from neighboring bar code symbol reading devices. This fact is illustrated in FIG. 11, in which (i) a group of data packets from bar code reading device No. 1 are transmitted between adjacent groups of data packet transmitted from bar code symbol reading devices Nos. 2, 3 and 4 without the occurrence of data packet interference (i.e., collision). In most instances, the time delay between consecutive groups of data packets transmitted from any particular bar code symbol reading device, will be sufficient to permit a neighboring bar code symbol reading device to transmit at least one data packet to its base unit without the occurrence of data packet interference.

In accordance with the data transmission scheme of the present invention, data packet interference is minimized by the random presence of interference-free time slots, during which a transmitted data packet can be received at its respective base unit without neighboring packet interference. However, the present invention employs additional measures to further reduce the likelihood of data packet interference. Such measures are best appreciated when considering a high-density data packet transmission environment, in which a number of closely situated neighboring bar code symbol readers are each attempting to transmit a group of data packets to its preassigned base unit. In general, such operating conditions would present a worst case scenario for the data packet transmission scheme of the present invention.

In the worst case scenario shown in FIG. 12, each of the four neighboring bar code symbol reading devices is assumed to consecutively read two bar code symbols and simultaneously begin the transmission of the first data packet in the first group of data packets corresponding to the first read bar code symbol. As mentioned above, each data packet is formatted essentially the same way, has substantially the same packet width, and is transmitted on a carrier signal having a frequency which is substantially the same as all other carrier signals transmitted throughout the system. In accordance with the principles of the present invention, the data packet transmission circuit 121 in each bar code symbol reading device is preprogrammed to transmit adjacent data packets with a different "time delay", as shown in FIG. 12. This condition is achieved throughout the resulting system by assigning a different Packet Time Delay to each having a different Transmitter Identification Number, and then programming the bar code symbol reading device with the preassigned Packet Time Delay parameter. As illustrated in FIG. 12, the value of the Packet Time Delay parameter programmed in each bar code symbol reading device is selected so that, when the neighboring bar code symbol reading devices simultaneously transmit groups of data packets, each base unit in the resulting system is capable of receiving at least one data packet (in a group thereof) that has been transmitted from its preassigned bar code symbol reading device. In general, the data packet delay scheme of the present invention involves selecting and programming the Packet Time Delay parameter in each bar code symbol reading device so that each base unit is periodically provided a vacant time slot, during which one transmitted data packet in each group thereof can be received free of "data packet interference", as shown in FIG. 12. The advantage of providing a packet time delay among the data packets of each transmitted group thereof is that rereading and retransmission of bar code symbols is effectively minimized under the data packet transmission scheme of the present invention.

Having described the detailed structure and internal functions of automatic bar code symbol reading device of the present invention, the operation of the control system thereof will now be described while referring to the system block diagram shown in FIG. 8 and control Blocks A to GG in FIGS. 13A to 13C.

Beginning at the START block of Main System Control Routine and proceeding to Block A of FIG. 13A, the bar code symbol reading system is "initialized". This initialization step involves activating system override circuit 100, first control circuit $C_1$ and oscillator circuit 101. It also involves deactivating (i.e., disabling): (i) all external system components except the range selection circuit 115 and system override signal producing means 103 (i.e., infrared sensing circuit 105, laser scanning circuit 108, and photo-receiving circuit 109); (ii) all subcircuits aboard ASIC chip 133 not associated with the system override circuit 100, such as object detection circuit 107, A/D conversion circuitry 110, second control circuit $C_2$ and bar code presence detection circuit 111; and (iii) third control module 114, symbol decoding module 119 and data packet synthesis module 120. In addition, all timers $T_1$, $T_2$, $T_3$, $T_4$, and $T_5$ are reset to t=0.

Proceeding to Block B in FIG. 13A, the first control circuit $C_1$ checks to determine whether it has received control activation signal $A_0=1$ from system override detection circuit 100. If this signal is received, then the first control circuit $C_1$ returns to Block A. If control activation signal $A_0=1$ is not received, then at Block C the first control circuit $C_1$ activates (i.e., enables) the object detection circuit by producing $E_0$. At Block D, the object detection circuit receives either the long range mode selection signal or the short range mode selection signal produced by the range selection circuit 115 and sets the appropriate sensitivity level of the circuit. At Block E, the first control circuit $C_1$ determines whether it has received control activation signal $A_1=1$, indicating that an object has been detected within the selected range of the scan field. If this control activation signal is not received, then at Block F the first control circuit $C_1$ determines whether its has received control activation signal $A_0=1$. If the first control circuit $C_1$ has received control activation signal $A_0=1$, then the control system returns to Block A in FIG. 13A, as shown. If the first control circuit $C_1$ has not received control activation signal $A_0=1$, then the control system returns to Block E, as shown.

If at Block E the first control circuit $C_1$ has received first control activation signal $A_1=1$, then at Block G the first control circuit $C_1$ (i) deactivates (i.e., disables) the object sensing circuit and the object detection circuit using disabling signal $E_0=0$, (ii) activates (i.e., enables) laser scanning circuit 108, photoreceiving circuit 109 and A/D signal conversion circuit 110 using enable signal $E_1=1$, (iii) activates bar code detection circuit 111 and second control circuit $C_2$ using enable signal $E_2=1$, and (iv) starts timer $T_1$ maintained in the first control circuit $C_1$. This permits the bar code symbol reading device to collect and analyze scan data signals for the purpose of determining whether or not a bar code is within the scan field. If at Block H the second control circuit $C_2$ does not receive control activation signal $A_{2S}=1$ or $A_{2L}=1$ from the bar code detection circuit within time period $T_1$, indicating that a bar code symbol is detected in the selected range of the scan field, then the control system returns to Block A thereby returning system control to the first control unit $C_1$, as shown in FIG. 13A. If at Block H the bar code symbol detection circuit 111 provides the second control circuit $C_2$ with control activation signal $A_{2S}=1$ or $A_{2L}=1$, as the case may be, then second control circuit $C_2$ activates (i.e., enables) third control module $C_3$ (i.e., microprocessor 134) using enable signal $E_3=1$.

At Block J, the third control module $C_3$ polls (i.e., reads) the parameter R set by range selection circuit 115 and sets a range limit flag in the symbol decoding module 119. At Block K third control module $C_3$ activates the symbol decoding module 119 using enable signal $E_4$, resets and restarts timer $T_2$ permitting it to run for a second predetermined time period (e.g., $0<T_2<1$ second), and resets and restarts timer $T_3$ permitting it to run for a third predetermined time period (e.g., $0<T_3<5$ seconds). At Block L, the third control module checks to determine whether control activation signal $A_3=1$ is received from the symbol decoding module 119 within $T_2=1$ second, indicative that a bar code symbol has been successfully read (i.e., scanned and decoded) within the allotted time period. If control activation signal $A_3=1$ is not received within the time period $T_2=1$ second, then at Block M third control module $C_3$ checks to determine whether control activating signal $A_2=1$ is received. If a bar code symbol is not detected, then the control system returns to Block A, causing a state transition from bar code reading to object detection. However, if at Block M the third control module $C_3$ receives control activation signal $A_2=1$, indicative that a bar code once again is within the scan field, then at Block N the third control module $C_3$ checks to determine whether time period $T_3$ has elapsed. If it has, then the control system returns to Block A. If, however, time period 0.1 to req. $T_3$ 0.1 to req. 5 seconds has not elapsed, then at Block K the third control module $C_3$ resets and restarts timer $T_2$ to run once again for a time period 0.1 to req. $T_2$ 0.1 to req. 1 second, while $T_3$ continues to run. In essence, this provides the device at least another opportunity to read a bar code present within the scan field when the control system is at control Block L. During typical bar code reading applications, the control system may progress through the control loop defined by Blocks K-L-M-N-K several times before a bar code symbol in the scan field is read within the time period allotted by timer $T_3$.

Figure 13B:
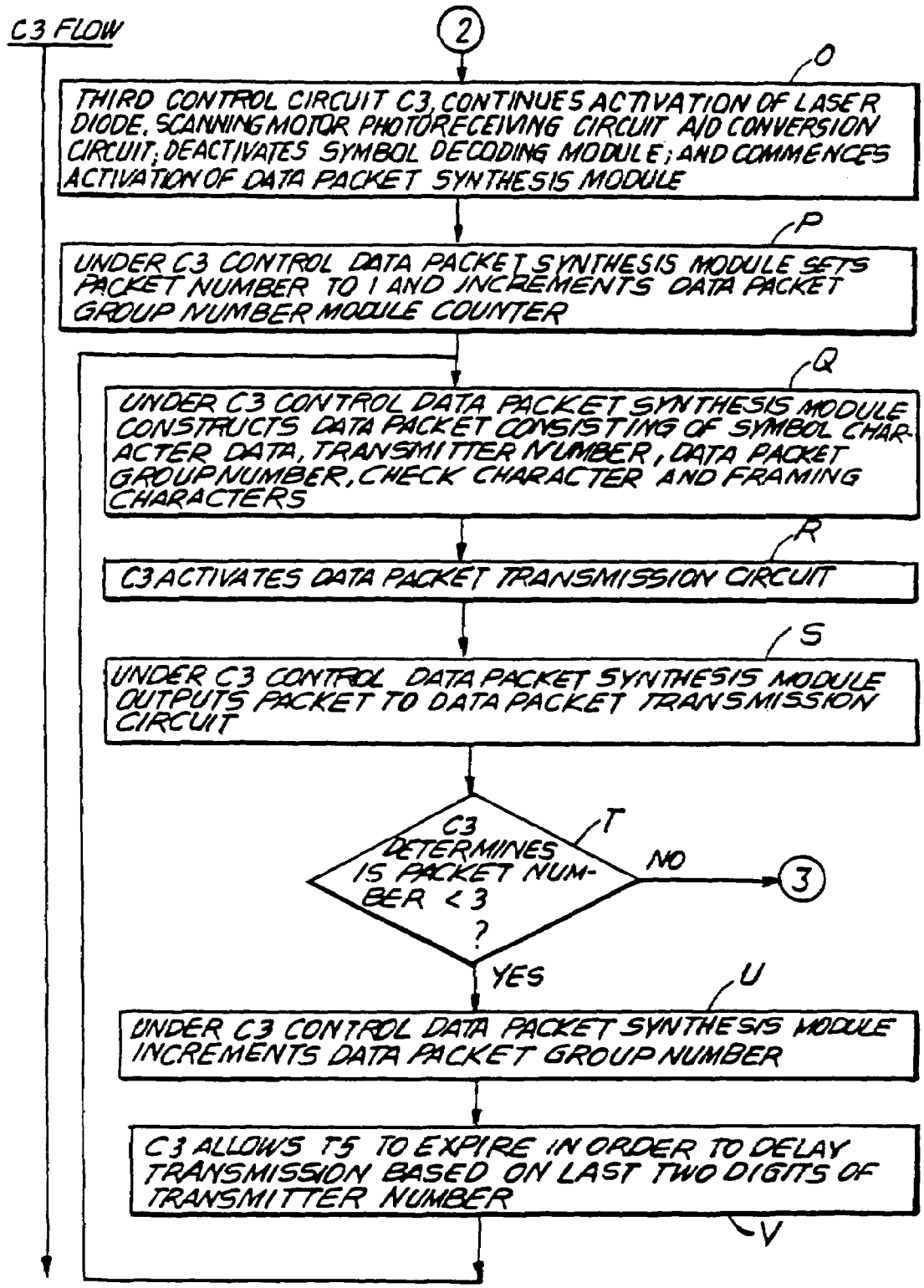
Figure 13C:
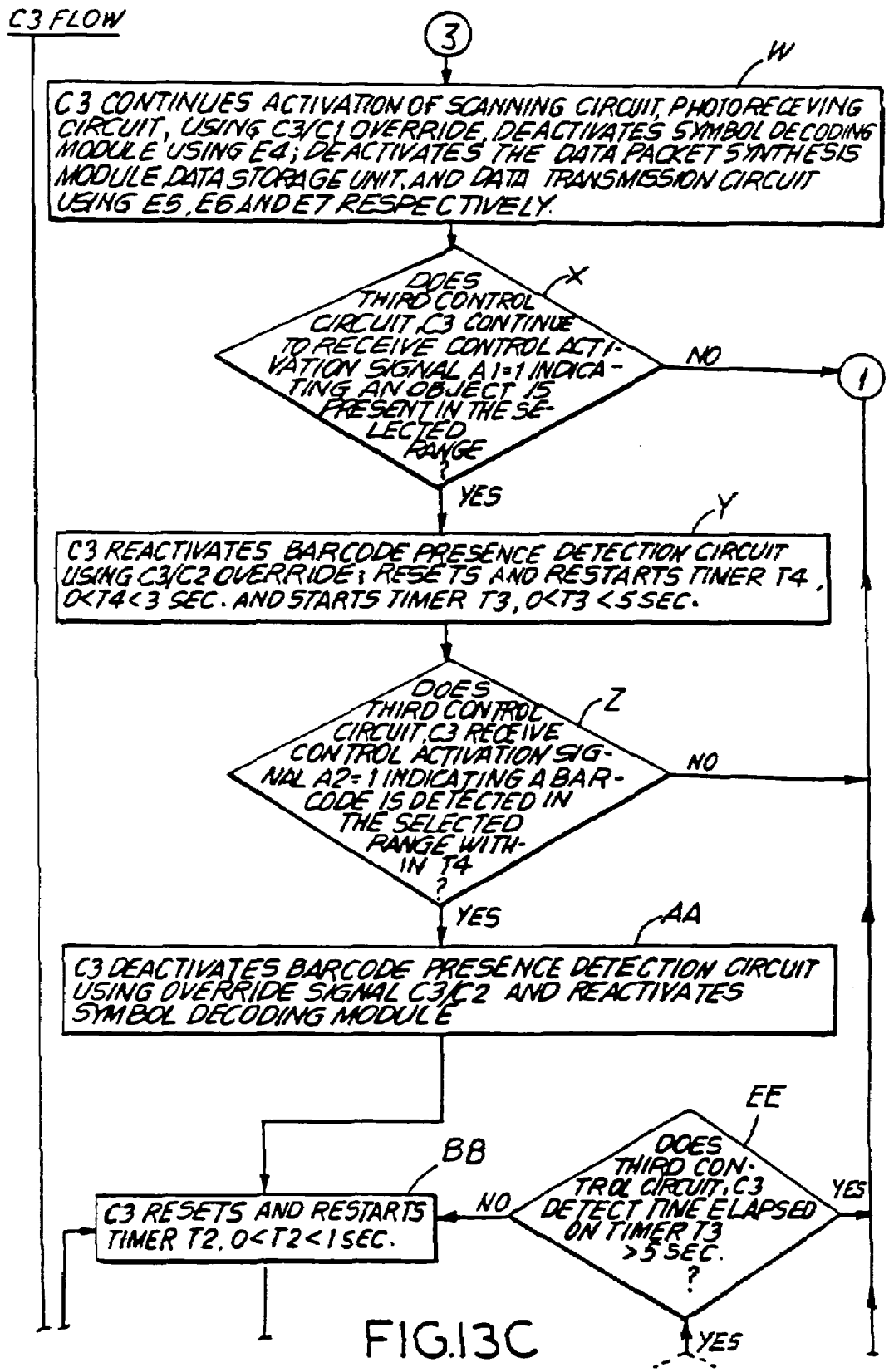
Figure 13C:
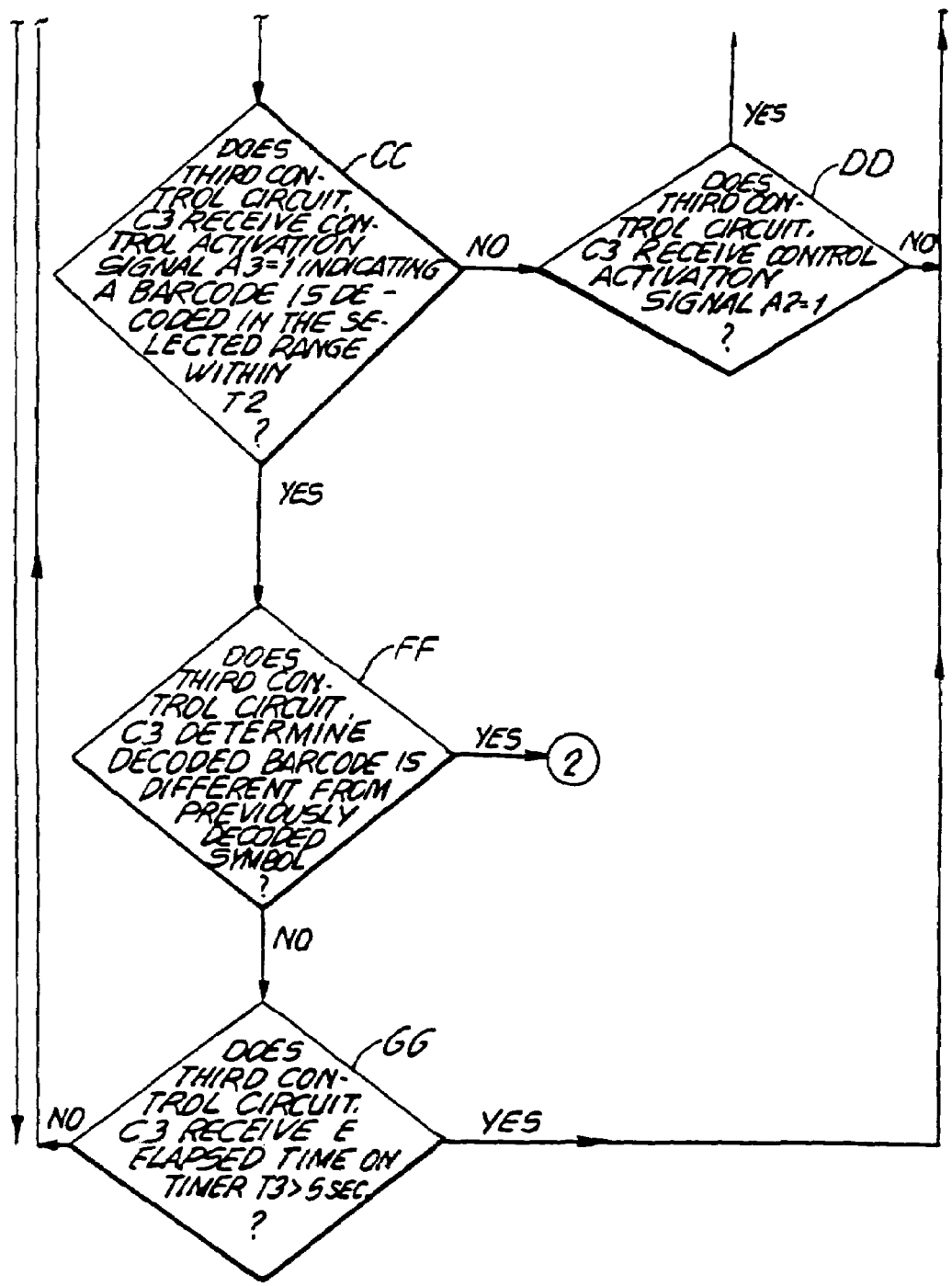

Upon receiving control activation signal $A_3=1$ from symbol decoding module 119., indicative that a bar code symbol has been successfully read, the control system proceeds to Block O in FIG. 13B. At this stage of the system control process, the third control module $C_3$ continues activation of laser scanning circuit 108, photoreceiving circuit 109, and A/D conversion circuit 110, while deactivating symbol decoding module 119 and commencing activation of data packet synthesis module 120. While the laser beam is continuously scanned across the scan field, the operations at Blocks P to V described below, are carried out in a high speed manner under the orchestration of control module $C_3$.

As indicated at Block P, data packet synthesis module 120 first sets the Packet Number to "1", and increments the Packet Group Number from the previous number. Preferably, the data packet synthesis module keeps track of (i.e., manages) the "Packet Number" using a first modulo-N counter realized by programmable microprocessor 134, while it manages the "Packet Group Number" using a second modulo-M counter also realized by programmed microprocessor 134. In the illustrative embodiment, the first modulo counter has a cyclical count range of N=2 (i.e., 0, 1, 2, 0, 1, 2, ...), whereas the second modulo counter has a cyclical count range of M=10 (i.e., 0, 1, 2, 3, 4, 5, 6, 7, 8, 9, 0, 1, 2, ...). At Block Q, the data packet synthesis module synthesizes or constructs a data packet having a packet format as shown in FIG. 9, i.e., consisting of symbol character data, a Transmitter Identification Number, a Packet Number, a Packet Group Number, check character, and Packet Start and End (i.e., framing) Characters. After the data packet has been formed and the digital data sequence constituting the same is buffered, the third control module $C_3$ activates at Block R the data packet transmission circuit. Thereafter at Block S, the data packet synthesis module outputs the buffered digital data sequence (of the first synthesized data packet of the group) to the data packet transmission circuit, which uses the digital data sequence to modulate the frequency of the carrier signal as it is being transmitted from the bar code symbol reading device, to its mated base unit, as described hereinabove, and then automatically deactivates itself to conserve power.

At Block T, the third control module $C_3$ determines whether the Packet Number counted by the first module counter is less than "3". If the Packet Number of the recently transmitted data packet is less than "3", indicative that at most only two data packets in a specific group have been transmitted, then at Block U the data packet synthesis module 120 increments the Packet Number by +1. At Block V, the third control module then waits for a time delay $T_5$ to lapse prior to the control system returning to Block Q, as shown in FIG. 13B. Notably, the occurrence of time delay $T_5$ causes a delay in transmission of the next data packet in the data packet group. As illustrated in FIG. 12, the duration of time delay $T_5$ is a function of the (last two digits of the) Transmitter Number of the current data packet group, and thus is a function of the bar code symbol reading device transmitting symbol character data to its mated base unit. For the case of three data packet groups, time delay T5 will occur between the transmission of the first and second data packets in a packet group and between the transmission of the second and third data packets in the same packet group.

Returning to Block Q, the data packet synthesis module synthesizes or constructs the second data packet in the same data packet group. After the second data packet has been formed and the digital data sequence constituting the same is buffered, the third control module $C_3$ reactivates at Block R the data packet transmission circuit. Thereafter at Block S, the data packet synthesis module outputs the buffered digital data sequence (of the second synthesized data packet) to the data packet transmission circuit, which uses the digital data sequence to modulate the frequency of the carrier signal as it is being transmitted from the bar code symbol reading device, to its mated base unit, and thereafter automatically deactivates itself. When at Block T third control module $C_3$ determines that the Packet Number is equal to "3", the control system advances to Block W in FIG. 13C.

At Block W in FIG. 13C, the third control module $C_3$ continues activation of laser scanning circuit 108 photoreceiving circuit 109, and A/D conversion circuit 110 using control override signals $C_3/C_1$, and deactivates symbol decoding module 119, data packet synthesis module 120 and the data packet transmission circuit 121 using disable signals $E_4=0$, $E_5=0$ and $E_6=0$, respectively. Then at Block X the third control module $C_3$ determines whether control activation signal $A_1=1$, indicating that an object is present in the selected range of the scan field. If this control activation signal is not provided to the third control module $C_3$, then the control system returns to Block A, as shown. If control activation signal $A_1=1$ is received, then at Block Y the third control module $C_3$ reactivates the bar code symbol detection circuit using override signal $C_3/C_2$, and resets and restarts timer $T_3$ to start running over its predetermined time period, i.e., $0<T_3<5$ seconds, and resets and restart timer $T_4$ for a predetermined time period $0<T_4<3$ seconds.

At Block Z in FIG. 13C, the third control module $C_3$ then determines whether control activation signal $A_2=1$ is produced from the bar code symbol detection circuit 111 within time period $T_4$, indicating that a bar code symbol is present in the selected range of the scan field during this time period. If this signal is not produced within time period $T_4$, then at Block AA the third control module $C_3$ deactivates the bar code symbol detection circuit using override signal $C_3/C_2$, and reactivates the bar code symbol decoding module 119 using enable signal $E_4=1$. At Block BB, the third control module $C_3$ resets and restarts timer $T_2$ to run over its predetermined time period, i.e., $0<T_2<1$ second. At Block CC the third control module $C_3$ determines whether control activation signal $A_3=1$ is produced by the symbol decoding module within time period $T_2$, indicating that the detected bar code symbol has been successfully decoded within this time period. If this control activation signal is not produced within time period $T_2$, then at Block DD the third control module $C_3$ determines whether control activation signal $A_2=1$ is being produced from the bar code symbol detection circuit, indicating that either the same or another bar code symbol resides within the selected range of the scan field If control activation signal $A_2=1$ is not being produced, then the control system returns to Block A, as shown. However, if this control signal is being produced, then at Block EE the third control module $C_3$ determines whether or not timer $T_3$ has lapsed, indicating that time window to read a bar code symbol without redetecting the object on which it is disposed, is closed. When this condition exists, the control system returns to Block A in FIG. 13A. However, it time remains on timer $T_3$, then at Block BB the third control module $C_3$ resets and restarts timer $T_2$ and returns to Block CC. As mentioned above, the control system may flow through the control loop defined by Blocks BB-CC-DD-EE-BB a number of times prior to reading a bar code within time period $T_3$. When the symbol decoding module produces control activation signal $A_3=1$ within time period $T_2$, the third control module $C_3$ determines at Block FF whether the decoded bar code symbol is different from the previously decoded bar code symbol. If the decoded bar code symbol is different than the previously decoded bar code symbol, then the control system returns to Block O in FIG. 13B. If the currently decoded bar code symbol is not different than the previously decoded bar code symbol, then the third control module $C_3$ determines whether timer $T_3$ has lapsed. If the timer $T_3$ has not lapsed, then the control system returns to Block BB and reenters the control flow defined at Blocks BB through GG, attempting once again to detect and read a bar code symbol on the detected object. However, if at Block GG timer $T_3$ has lapsed, then the control system returns to Block A in FIG. 13A.

Having described the operation of the illustrative embodiment of the automatic hand-supportable bar code reading device of the present invention, it will be helpful to describe at this juncture the various conditions which cause state transitions to occur during its operation. In this regard, reference is made to FIG. 14 which provides a state transition diagram for the illustrative embodiment.

Figure 14:
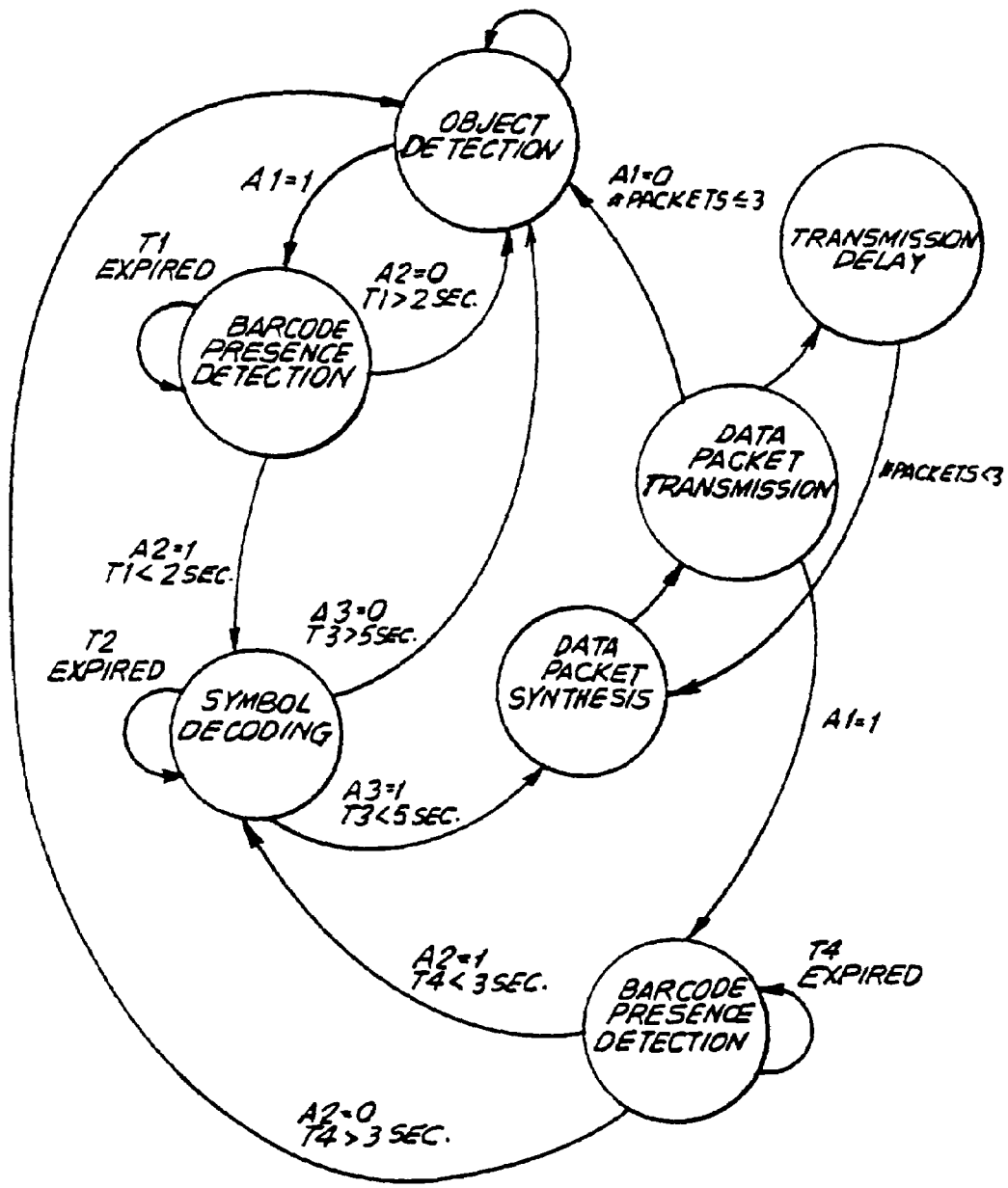
FIG. 14 is a state diagram illustrating the various states that the automatic hand-supportable bar code symbol reading device of the illustrative embodiment may undergo during the course of its programmed operation.

As illustrated in FIG. 14, the automatic hand-supportable bar code reading device of the present invention has four basic states of operation namely: object detection, bar code symbol presence detection, bar code symbol reading, and symbol character data transmission/storage. The nature of each of these states has been described above in great detail.

Transitions between the various states are indicated by directional arrows. Besides each set of directional arrows are transition conditions expressed in terms of control activation signals (e.g., $A_1$, $A_{2S}$ or $A_{2L}$ and $A_3$, and where appropriate, state time intervals (e.g., $T_1$, $T_2$, $T_3$, $T_4$, and $T_5$). Conveniently, the state diagram of FIG. 14 expresses most simply the four basic operations occurring during the control flow within the system control program of FIGS. 13A to 13C. Significantly, the control activation signals $A_1$, $A_{2S}$ $A_{2L}$ and $A_3$ in FIG. 14 indicate which events within the object detection and/or scan fields can operate to effect a state transition within the allotted time frame(s), where prescribed.

Figure 15A:
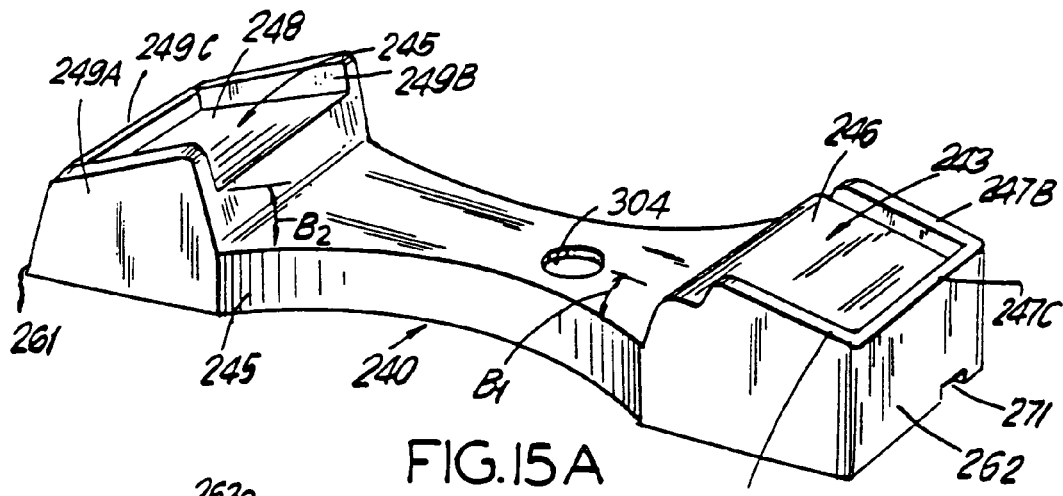
FIG. 15A is a perspective view of the scanner support stand housing of the countertop base unit of the present invention.
Figure 15B:
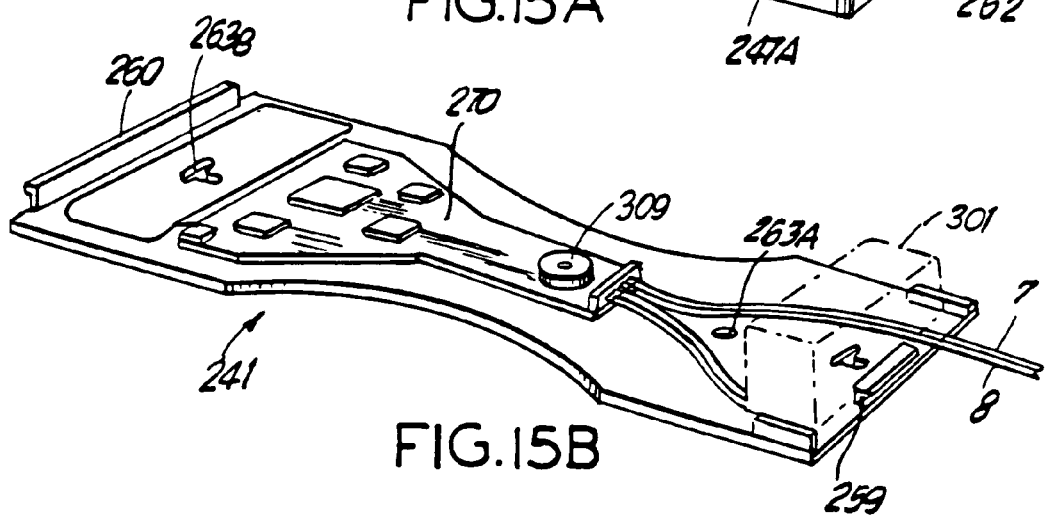
FIG. 15B is a perspective view of the base plate portion of the countertop base unit of the present invention.
Figure 15C:
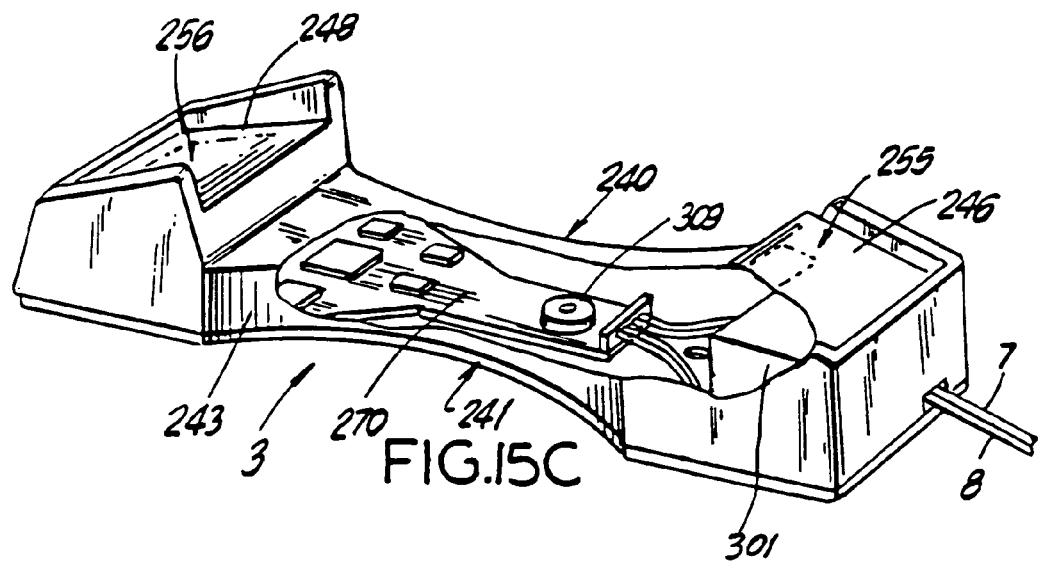
FIG. 15C is a perspective, partially broken away view of the assembled countertop base unit of the present invention.

Referring now to FIGS. 15 to 15C, the base unit of the first illustrative embodiment of the present invention will be described. As shown, base unit 3 is realized in the form of a scanner stand comprising support frame 240 releasibly connected to a base support/mounting plate 241 by way of a snap fit fastening mechanism illustrated in FIGS. 15B and 15C. In the illustrative embodiment, support frame 240 is formed as an injection molded shell, in which a handle portion support structure is realized by a first support recess 243; whereas a head portion support structure is realized by a second support recess 245. As shown in FIG. 15, first support recess 243 is disposed above base portion 245 and inclined at a first acute angle $B_1$ with respect thereto, while second support recess 245 is disposed above base portion 245 and inclined at a second acute angle $B_2$ with respect thereto.

As best shown in FIG. 15, first support recess 243 is formed by a first substantially planar support surface 246 surrounded by the projection of opposing side walls 247A and 247B and rear wall 247C, extending above planar support surface 246 in a perpendicular fashion. The function of first support recess 243 is to receive and support the handle portion of handsupportable bar code reading device. Similarly, second support recess 245 is formed by a second substantially planar support surface 248 surrounded by the projection of opposing side walls 249A and 249B and front wall surface 249C extending above planar support surface 248 in a perpendicular fashion.

The function of support recess 245 is to receive and support the head portion of handsupportable bar code reading device 2. Front wall projection 249C is slightly lower than side wall projections 249A and 249B to ensure that the transmitted IR signal from IR LED 148 is freely transmitted through an aperture stop 250 formed in the head portion of the housing, whereas the reflected IR signal passes through an aperture stop 251 and is detected by IR photodiode 150 in the head portion of the hand-supportable housing. At the same time, this structural feature of the scanner support stand ensures that visible laser light is projected and collected through light transmissive window 11 without obstruction, i.e., when the automatic bar code reading device is operated in its automatic hands-free mode, shown in FIG. 28, in particular.

In order to ensure that bar code reading device 2 is securely, yet releasably supported within support recesses 243 and 245 and not easily knocked out of the scanner support stand during the hands-free mode of operation, first and second magnetic elements 255 and 256 are permanently mounted to the underside of planar support surfaces 246 and 248, respectively, as illustrated in FIG. 15C. With this arrangement, magnetic flux of constant intensity continuously emanates from support recesses 243 and 245. As a result, when the handle and head portions of the bar code reading device are placed within support recesses 243 and 245, a ferrous element 257 in handle portion 9B is magnetically attracted to magnetic element 255, while ferrous element 258 on head portion 9A is magnetically attracted to magnetic element 256. The magnetic force of attraction between these elements is selected so that a desired degree of force is required to lift the automatic bar code reading device out of scanner support stand, while preventing accidental displacement of the device from the scanner support stand during use in the hands-free mode of operation.

As illustrated in FIGS. 15B and 15C, base mounting plate 241 is formed as a thin planar structure having perimetrical dimensions substantially equal to the perimetrical dimensions of the base portion of support frame 240. At the front and rear end portions of base plate 241, a pair of projections 259 and 260 extend perpendicularly, as shown. These projections have horizontal flanges which are adapted to snap fit into horizontal grooves formed on the interior surfaces of front and rear walls 261 and 262, as shown in FIGS. 15A to 15C.

Figure 28A:
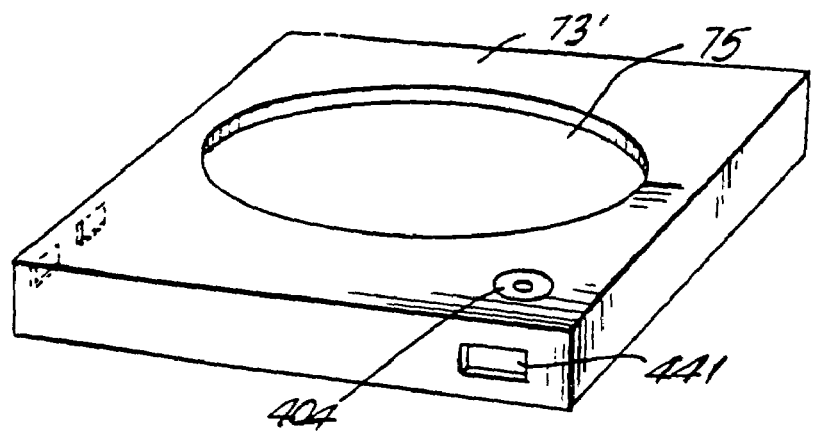
FIG. 28A is a perspective view of the housing for the keyboard-interface base unit of the present invention.
Figure 28B:
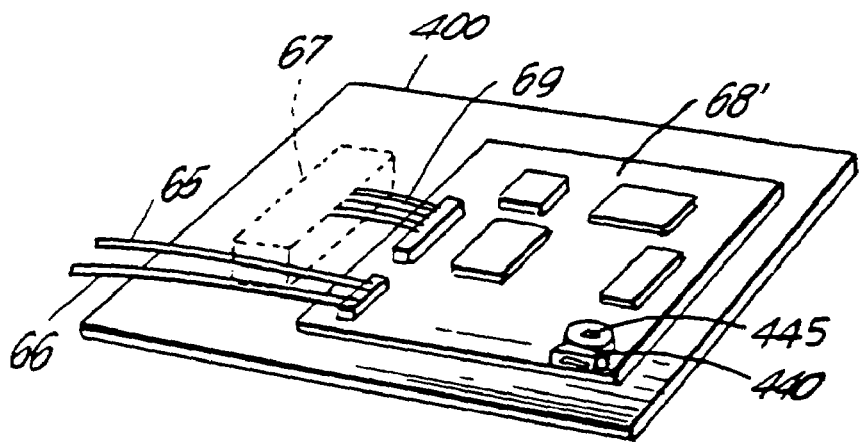
FIG. 28B is a perspective view of the base plate portion of the keyboard-interface base unit of the present invention.
Figure 28C:
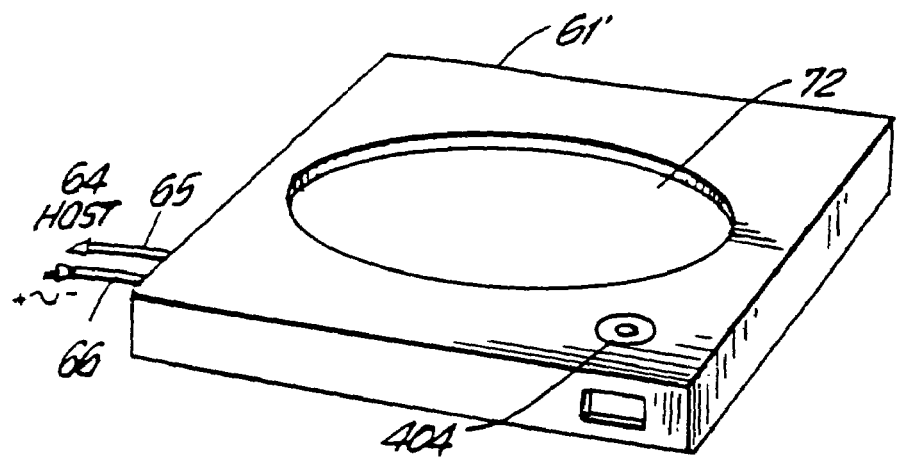
FIG. 28C is a perspective view of the assembled keyboard-interface base unit of the present invention, shown electrically interfaced with the keyboard and serial communications port of a host computer system.
Figure 29:
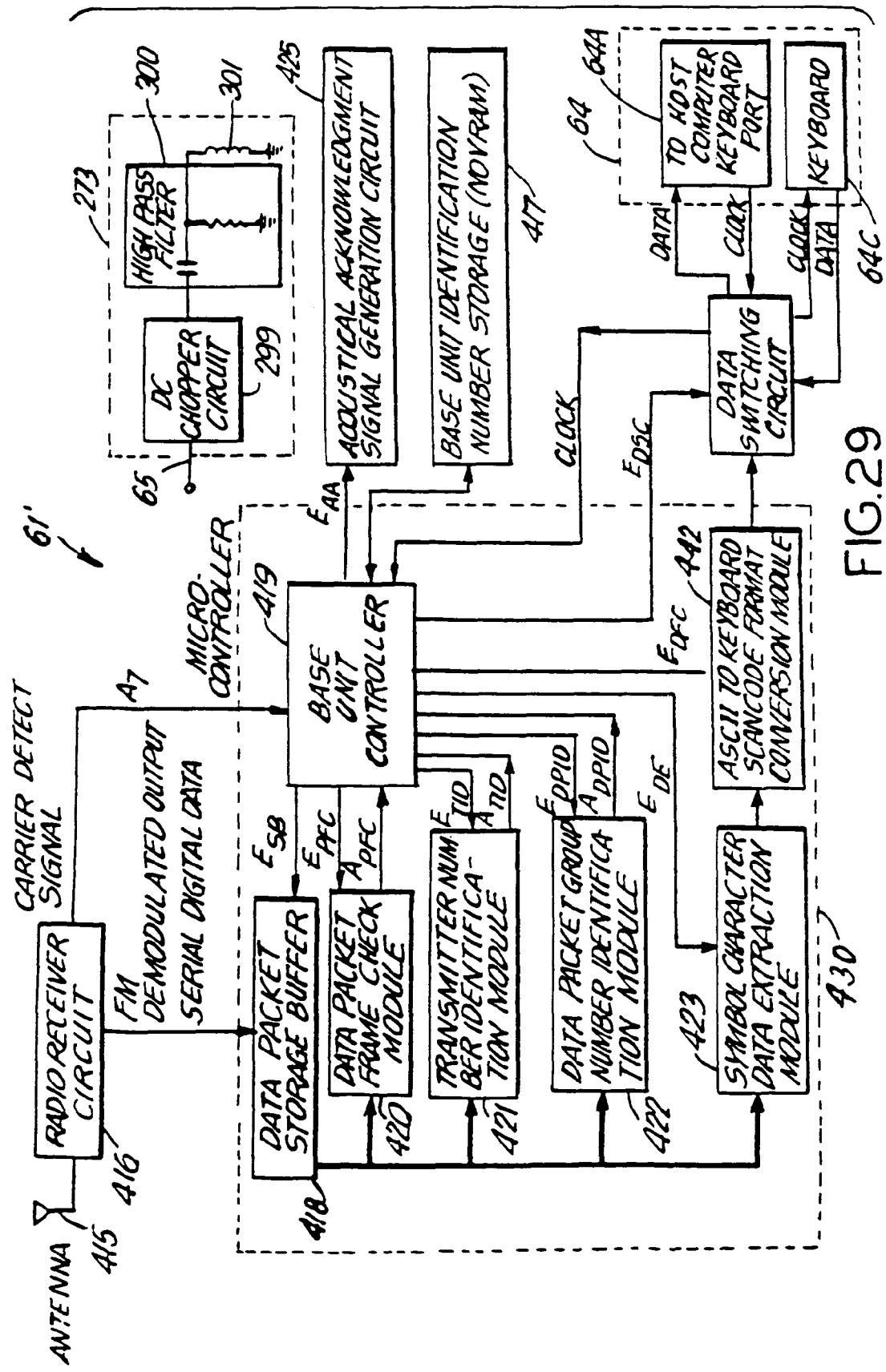
FIG. 29 is a block functional diagram of the data packet receiving and processing circuit, the acknowledgment signal generating circuit and the keyboard/bar-code reader interface circuit realized on the printed circuit board aboard the keyboard-interface base unit shown in FIG. 28C.

To facilitate mounting of base plate 241 on a vertical planar mounting surface, a pair of spaced apart mounting holes 263A and 263B are provided. To facilitate attachment of base plate 241 to a pivotal joint assembly 265 associated with pedestal base 266, as illustrated in FIGS. 28 to 29B, a set of mounting holes (not shown) are formed in the base plate itself. To facilitate support of base plate 241 upon a horizontal support surface, as illustrated in FIGS. 27A TO 27D, a set of four rubber feet (not shown) may be adhesively applied to the underside corners of the base plate.

In order to perform the data packet reception, processing, retransmission, and acknowledgement functions of base unit 3 described above, a circuit board 270 populated with electronic circuitry is concealed within the interior volume contained between the interior surface of support stand portion 245 and the upper surface of base plate 241. In the illustrated embodiment, PC board 270 contains electronic circuitry for realizing each of the functions represented by the block shown in the system diagram of FIG. 16. As shown in FIG. 15A, flexible communication and power supply cables 7 and 8 are routed through aperture 271 formed in the lower portion of rear wall of the support frame, as shown in FIG. 15C, and connect to the electronic circuitry on PC board 270.

Figure 16:
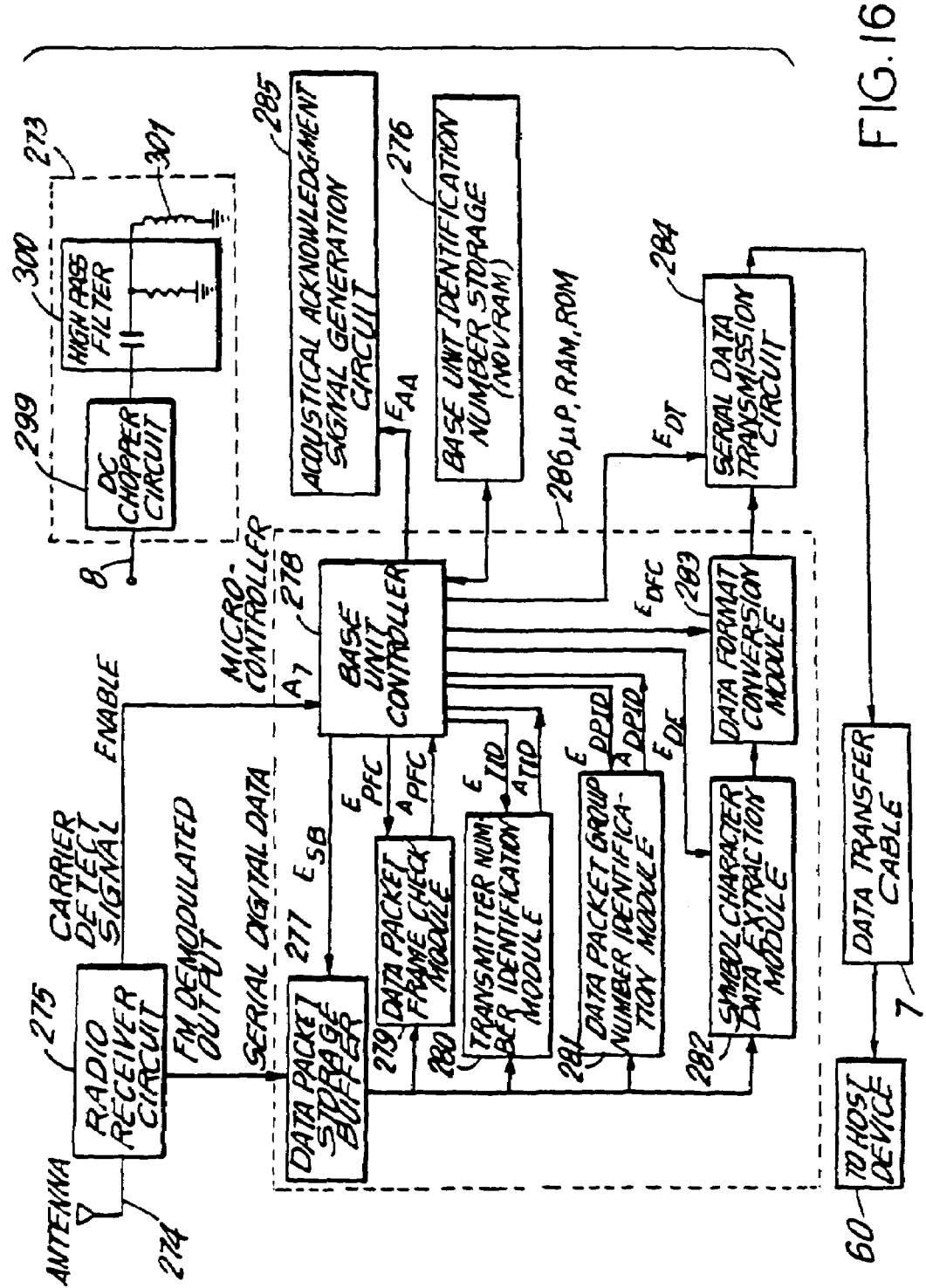
FIG. 16 is a functional block diagram of the data packet receiving and processing circuitry and the acknowledgment signal generating circuitry of the present invention realized on the printed circuit board in the base unit shown in FIGS. 15A to 15C.

In FIG. 16, the system architecture of base unit 3 is schematically represented. As shown, base unit 3 comprises a number hardware and software components, namely: a power supply circuit 273; a receiving antenna element 274; an RF carrier signal receiver circuit 275 base unit identification number storage unit 276; a data packet storage buffer 277; a base unit system controller 278; a data packet frame check module 279; a transmitter number identification module 280; a data packet number identification module 281; a symbol character data extraction module 282; a data format conversion module 283; a serial data transmission circuit 284; and an acoustical acknowledgement signal generation circuit 285. In the illustrative embodiment, a programmed microprocessor and associated memory (i.e., ROM and RAM), indicated by reference numeral 286, are used to realize the base unit system controller 278 and each of the above-described data processing modules 277 to 283. The details of such a programming implementation are known by those with ordinary skill in the art to which the present invention pertains.

As shown in FIG. 16, receiving antenna element 274 is electrically coupled to an input signal port of radio receiver circuit 275 in a conventional manner. In general, the function of radio receiver circuit 275 is to receive and process the data-packet modulated carrier signal transmitted from a remote bar code symbol reader to its mated base unit. The radio receiver circuit of the illustrative embodiment can be realized by configuring several commercially available IC chips together, although it is understood that there are certainly other ways in which to realize the basic functions of this circuit. As shown in FIG. 16A, receiving antenna 274 is connected to a matching filter circuit 287 realized using miniature inductive and capacitive components. The matching filter circuit is tuned to pass a 912 MHz RF carrier signal transmitted from the data packet transmission circuit 121 of the bar code symbol reading device. The output of matching filter circuit 287 is connected to the input of a first IC chip 288 which converts (i.e., translates) the frequency spectrum of the received modulated carrier signal down to an intermediate frequency band, for subsequent signal processing. In the illustrative embodiment, the first IC chip 288 is realized using the MAF2001 IC chip from Motorola, Inc., and provides a low noise amplifier 289, an double balanced mixer 290. A local oscillator 292 is needed to provide a local oscillator signal of about 922.7 MHZ for use in frequency down-conversion in the double balanced mixer 290. Typically, a matching filter 291 is commonly required between local oscillator 292 and mixer 290. As shown in FIG. 16A, the output of the first IC chip is provided to a band-pass filter 293 tuned to about 10.7 MHZ, the intermediate frequency band of each base unit. The intermediate signal is then provided as input to a second IC chip 294. In the illustrative embodiment, the second IC chip 294 is realized using the MC13156 IC chip commercially available from Motorola, and provides inter alia an amplification circuit, a quadrature demodulation circuit 295, a binary thresholding circuit 296, and carrier signal detection circuit 297. The function of the second IC chip is four-fold. The first function of the second IC chip is to filter and amplify the intermediate signal to produce in-phase and quadrature phase signal components for use in digital data recovery. The second function of the second IC chip is to recover an analog data signal at the base band portion of the spectrum, by providing the in-phase and quadrature-phase signal components to the quadrature demodulation circuit 295. Suitable quadrature demodulation circuitry for use in practicing the present invention is disclosed in U.S. Pat. No. 4,979,230 to Marz, which is incorporated herein by reference in its entirety. As illustrated in FIG. 16A, the third function of the second IC chip is to convert the analog data signal produced from quadrature demodulation circuit 295 into a digital data signal using a binary-level thresholding circuit 296. The fourth function of the second IC chip is to analyze the incoming signal from the output of band-pass filter 293 in order to detect the incoming carrier signal and produce a carrier detect signal $A_7$ to the base unit system controller 278. In order to produce a CMOS compatible signal, the recovered digital data signal produced from second IC chip 294 is amplified by a current amplification circuit 298 that is operative whenever a carrier signal is detected (i.e., $A_7=1$). As shown in FIG. 16, the output of current amplification circuit 298 is a serial data stream that is clocked into data packet storage buffer 277 under the control of base unit system controller 278. In general, the data packet storage buffer 277 can be realized using a commercially available Universal Asynchronous Receiver/Transmitter (UART) device. The primary function of data packet buffer memory 277 is to buffer bytes of digital data in the produced digital data stream.

In the illustrative embodiment, it necessary to provide a means within the base unit housing, to recharge the batteries contained within the hand-supportable housing of the portable bar code symbol reading device. Typically, DC electrical power will be available from the host computer system 6, to which the base unit is operably connected by way of flexible cables 7 and 8. An electrical arrangement for achieving this function is set forth in FIG. 16. As shown, power supply circuit 273 aboard the base unit of the present invention comprises a conventional current chopper circuit 299, a high-pass electrical filter 300 in parallel therewith, and a primary inductive coil 301 in parallel with the high-pass electrical filter. Low voltage DC electrical power provided from the host computer system by way of power cable 8 is provided to direct current (DC) chopper circuit 299, which is realized on PC board 270 using high-speed current switching circuits. The function of current chopper circuit 299 is to convert the input DC voltage to the circuit into a high-frequency triangular-type (time-varying) waveform, consisting of various harmonic signal components. The function of the high-pass electrical filter is to filter out the lower frequency signal components and only pass the higher frequency signal components to the inductive coil 301. As such, the high frequency electrical currents permitted to flow through inductive coil 301 induce a high voltage thereacross and produce time-varying magnetic flux (i.e., lines of force). In accordance with well known principles of electrical energy transfer, the produced magnetic flux transfers electrical power from the base unit to the rechargeable battery aboard the bar code symbol reading device, whenever the primary and secondary inductive coils aboard the base unit and the mated device are electromagnetically coupled by the magnetic flux. In order to maximize energy transfer between the base unit and its mated device during battery recharging operations, high permeability materials and well known principles of magnetic circuit design can be used to increase the amount of magnetic flux coupling the primary and secondary inductive coils of the battery recharging circuit.

Referring to FIG. 16, the function of each of the data processing modules of base unit 3 will now be described in detail.

Upon reception of an incoming carrier signal and the recovery of the digital data stream therefrom, base unit system controller 278 orchestrates the processing of the recovered digital data stream. As shown in FIG. 16, the operation of data processing modules 279, 280, 281, 282 and 283 are enabled by the production of enable signals E.sub..PFC, E.sub.TID, E.sub.DPID, E.sub.DE, and E.sub.DFC, respectively, from the base unit system controller.

The primary function of data packet frame check module 279 is to analyze all of the data bytes in the received data packet, including the Start and End of Packet Fields, and determine whether a complete frame (i.e., packet) of digital data bytes has been recovered from the incoming modulated carrier signal. If so, then data packet frame check module 279 produces activation control signal A.sub.PFC=1, which is provided to the base unit system controller, as shown in FIG. 16.

The primary function of the transmitter number identification module 280 is to analyze the data bytes in the Transmitter ID Field of the received data packet and determine the Transmitter ID Number preassigned to the bar code reading device that transmitted the data packet received by the base unit. If the Transmitter ID Number of the received data packet matches the preassigned Base Unit Identification No. stored in non-volatile memory (i.e., EPROM) 302 aboard the base unit, then the transmitter number identification module generates control activation signal A.sub.TID=1 which is provided to the base unit system controller.

The primary function of the packet number identification module 281 is to analyze the data bytes in the Packet Number Field of the received data packet and determine the Packet Number of the data packet received by the base unit. This module then advises the base unit system controller that a different packet number was received, representing a new group (e.g., now seen) by producing an encoded signal A.sub.DPID during the system control process.

The primary function of the symbol character data extraction module 282 is to analyze the data bytes in the Symbol Character Data Field of the received data packet, determine the code represented by the symbol character data, and provided this symbol character data to the data format conversion module 283 under the control of the base unit system controller during the system control process.

The primary function of the data format conversion module 283 is to convert the format of the recovered symbol character data, into a data format that can be used by the host computer symbol 6 that is to ultimately receive and use the symbol character data. In the bar code symbol reading system of first illustrative embodiment, the data format conversion is from ASCII format to RS232 format, although it is understood that other conversions may occur in alternative embodiment of the present invention. Typically, the data format conversion process is carried out using a data format conversion table which contains the appropriate data structure conversions.

The primary function of the serial data transmission circuit 284 is to accept the format-converted symbol character data from the data format conversion module 283, and transmit the same as a serial data stream over data communication cable 7, to the data input port of the host computer system 6 (e.g., cash register, data collection device, inventory computer). Preferably, an RS-232 data communication protocol is used to facilitate the data transfer process. Thus the construction of serial data transmission circuit 284 is conventional and the details thereof are well within the knowledge of those with ordinary skill in the art.

The primary function of acoustical acknowledgement signal generation circuit 285 is to produce an acoustical acknowledgement signal SA in response to the successful recovery of symbol character data from a transmitted data packet. The purpose of the acoustical acknowledgement signal is to notify the user that the transmitted data packet has been successfully received by its mated base unit. In the illustrative embodiment, the intensity of the acoustical acknowledgement signal is such that the remotely situated user of the portable bar code symbol reader can easily hear the acoustical acknowledgement signal in an expected work environment having an average noise floor of at least about 50 decibels. Preferably, the pitch of the acoustical acknowledgement signal is within the range of about 1 to about 10 kilohertz, in order to exploit the sensitivity characteristics of the human auditory apparatus of the user. In the exemplary embodiment, the pitch is about 2.5 kilohertz. Under such conditions, the intensity of such an acoustical acknowledgement signal at its point of generation will typically need to have an output signal power of about 70 decibels in order to be heard by the user in a working environment having an average noise floor of about 50 decibels and an average noise ceiling of about 100 decibels. Acoustical acknowledgement signals of such character can be produced from acoustical acknowledgement signal generation circuit 285, shown in FIG. 16B.

As shown in FIG. 16B, acoustical acknowledgement signal generation circuit 285 comprises a number of subcomponents, namely: a decoder circuit 305; a voltage controlled oscillator (VCO) driver circuit 306; a VCO circuit 307; an output amplifier circuit 308; and a piezo-electric type electro-acoustic transducer 303 having an output signal bandwidth in the audible range. The operation (i.e., duration) of the acoustical acknowledgment signal generation circuit 285 is controlled by base unit system controller 278 using enable signal $E_{AA}$. In the illustrative embodiment, enable signal $E_{AA}$ is a digital word encoded to represent one of a number of possible audible pitches or tones that are to be generated upon each successful reception of a transmitted data packet at a mated base station. The function of decoder circuit 305 is to decode the enable signal EAA produced by the base unit system controller and produce a set of voltage signals $\{V_1 1, V2, \ldots, Vn\}$ which correspond to a specified pitch sequence to be produced by electro-acoustic transducer 309. The function of VCO driver circuit 306 is to sequentially drive VCO circuit 307 with the produced set of voltages $\{V_1 1, V2, \ldots, Vn\}$ so that VCO circuit produces over a short time period (e.g., 0.5–1.5 seconds), a set of electrical signals having frequencies that correspond to the specified pitch sequence to be produced from the electro-acoustic transducer 309. The function of amplifier circuit 308 is to amplify these electrical signals, whereas the function of electro-acoustical transducer 309 is to convert the amplified electrical signal set into the specified pitch sequence for the user to clearly hear in the expected operating environment. As shown in FIGS. 1 and 1 SA, the base housing is preferably provided with an aperture or sound port 304 so as to permit the energy of the acoustical signal from transducer 309 to freely emanate to the ambient environment of the user. In particular application, it may be desired or necessary to produce acoustical acknowledgement signal of yet greater intensity levels that those specified above. In such instances, electro-acoustical transducer 309 may be used to excite one or more tuned resonant chamber(s) mounted within or formed as part of the base unit housing.

Figure 17:
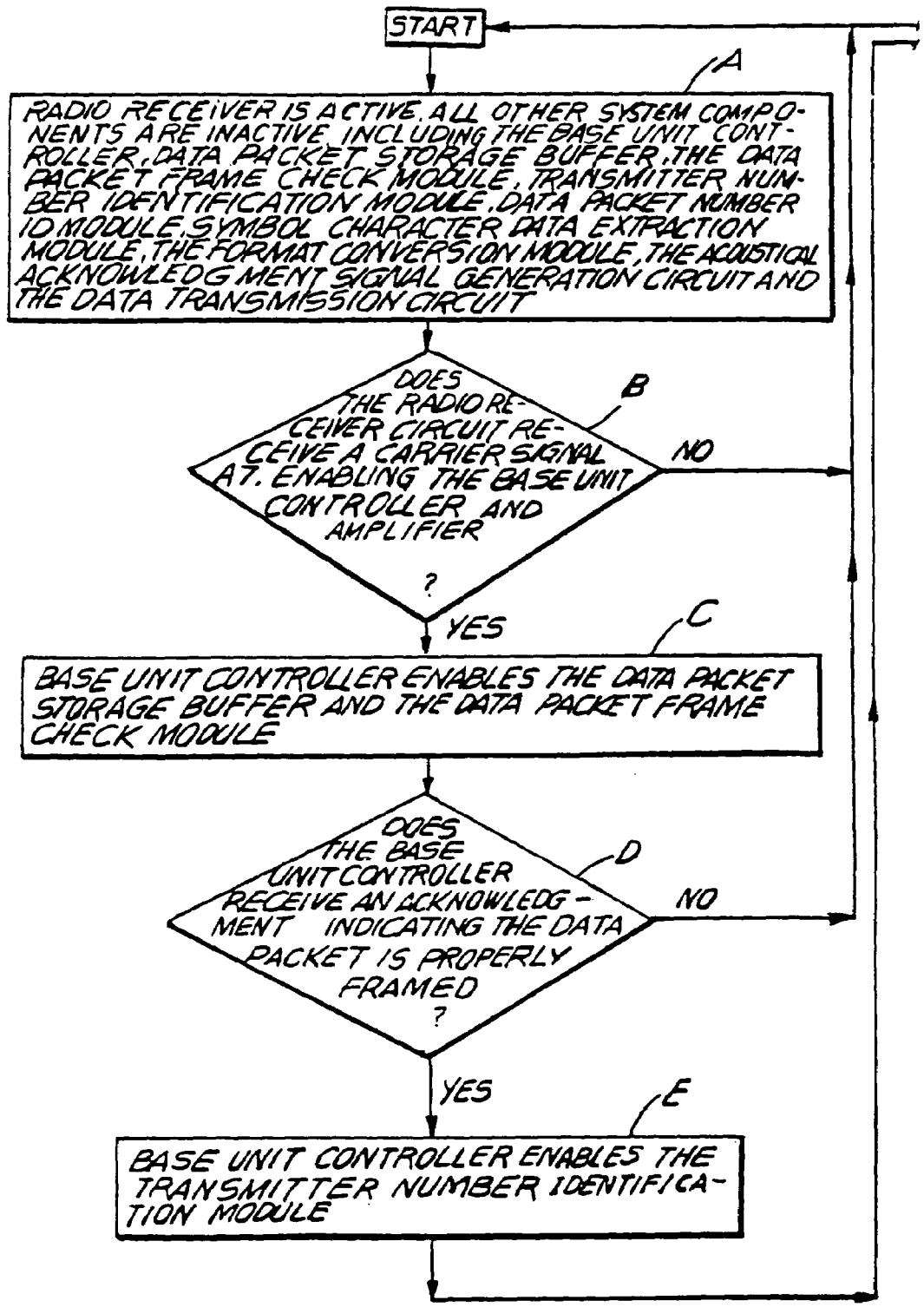
FIG. 17 is a flow chart illustrating the steps undertaken during the control process carried out in the base unit of FIG. 15C.
Figure 17A:
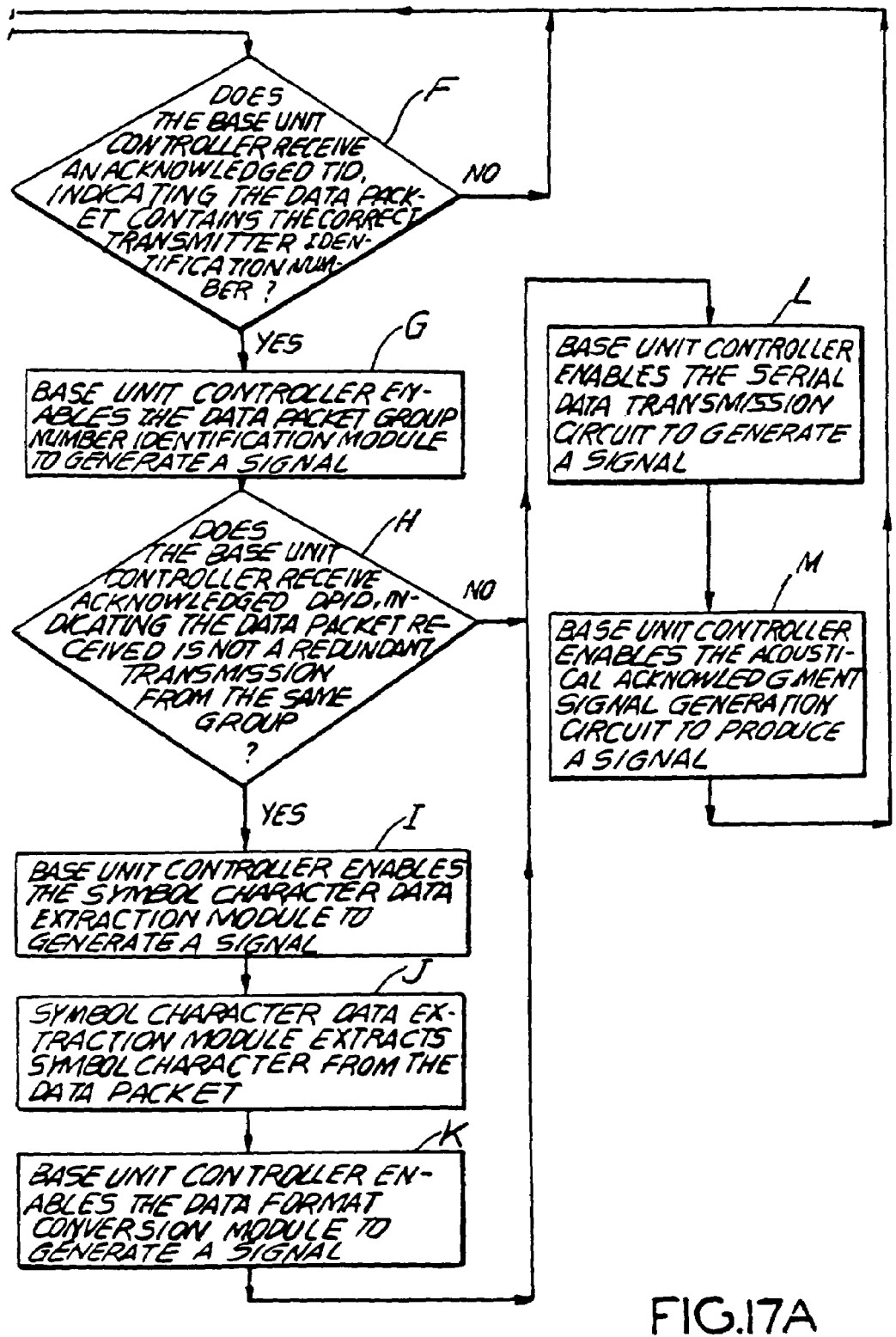

Having described the structure and general functional components of base unit 3, it is appropriate at this juncture to now describe the overall operation thereof with reference to the control process shown in FIG. 17.

As illustrated at Block A in FIG. 17, radio receiving circuit 275 is the only system component that is normally active at this stage of the base unit system control process. All other system components are inactive (i.e., disabled), including base unit system controller 278; data packet storage buffer 277, data packet frame check module 279, transmitter number identification module 280, data packet number Identification module 281, symbol character data extraction module 282, data format conversion module 283, serial data transmission circuit 284, and acoustical acknowledgement signal generation circuit 285. With the radio receiving circuit activated, the base unit is capable of receiving any modulated carrier signal transmitted from any of the bar code symbol reading devices within the data transmission range of the base unit.

At Block B in FIG. 17, radio receiving circuit 275 determines whether it has received a transmitted carrier signal on its receiving antenna element 274. If it has, then the radio receiving circuit generates a system controller activation signal $A_7$, which activates base unit system controller 278 and signal amplifier 276 shown in FIGS. 16 and 16a, respectively. Then at Block C, the base unit system controller activates (i.e., enables) data packet storage buffer 277 and data packet frame check module 279 by producing activation control signals ESB=1 and $E_{PFC}=1$, respectively. At Block D, the base unit system controller determines whether it has received an acknowledgement (i.e., control activation signal $A_{PFC}=1$) from the data packet frame check module, indicating that the received data packet is properly framed. If the received data packet is not properly framed, then the base unit returns to Block A in order to redetect an incoming carrier signal. However, if the received data packet is properly framed, then at Block E the base unit system controller enables the transmitter number identification module by generating enable signal $E_{TID}=1$.

At Block F, the base unit system controller determines whether it has received an acknowledgment (i.e., control activation signal $A_{TID}=1$) from the transmitter number identification module that the received data packet contains the correct transmitter identification number (i.e., the same number assigned to the base unit and stored in storage unit 276). If the Transmitter Identification Number contained within the received data packet does not match the base unit identification number stored in storage unit 276, then the base unit system controller returns to Block A whereupon it resumes carrier signal detection. If, however, the transmitter packet number contained within the received data packet matches the base unit identification number, then at Block G the base unit system controller enables the data packet number identification module 289 by generating enable signal $E_{DPID}=1$.

At Block H, the base unit system controller determines whether it has received an acknowledgment (i.e., control activation signal $A_{DPID}=1$) from the data packet identification module indicating that the received data packet is not a redundant data packet (i.e., from the same transmitted data packet group). If the received data packet is a redundant data packet, then the base unit system controller returns to Block A, whereupon carrier signal detection is resumed. If, however, the received data packet is not redundant, then at Block I the base unit system controller enables the symbol character data extraction module by generating enable signal $E_{DE}=1$. In response to the generation of this enable signal, the symbol data extraction module reads at Block J the symbol character data contained in the received data packet, checks the data for statistical reliability, and the writes the extracted symbol character data bytes into a storage buffer (not explicitly shown).

As indicated at Block K in FIG. 17, the base unit system controller then enables the data format conversion module by generating enable signal $E_{DFC}=1$. In response to this enable signal, the data format conversion module converts the data format of the recovered symbol character data and then buffers the format-converted symbol character data bytes in a data buffer (not explicitly shown). At Block L the base unit system controller enables the serial data transmission circuit 284 by generating enable signal $E_{DT}=1$. In response to this enable signal, the serial data transmission circuit transmits the format-converted symbol character data bytes over communication cable 7 using serial data transmission techniques well known in the art, as discussed above. When the serial data transmission process is successfully completed, the base unit system controller enables at Block M the acoustical acknowledgement signal generation circuit 285 by producing enable signal $E_{AA}=1$. In response to the production of this enable signal, acoustical acknowledgment signal generation circuit 285 generates a high intensity acoustical signal having characteristics of the type described above, thereby informing the user that a transmitted data packet has been received and that the symbol character data packaged therein has been successfully recovered and transmitted to the host computer system. Thereafter, the base unit system controller returns to the Block A, as shown.

The second illustrative embodiment of the base unit shown in FIGS. 4 to 4B will now be described in greater detail with reference to FIGS. 18A to 20D. In general, the base unit of the second illustrative embodiment is similar to the base unit of the first illustrative embodiment described above, except for the following differences described below which reflect additional functionalities provided by the data collection aspect of the portable base unit.

Figure 18A:
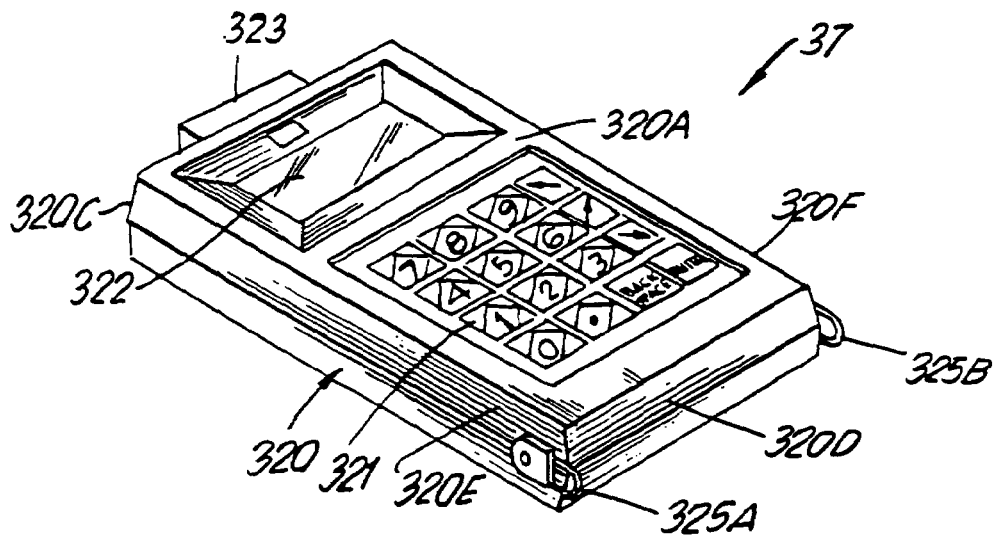
FIG. 18A is a perspective view of the portable data collection base unit of the present invention, interfaceable with a host computer system for transferring symbol character data collected from the bar code symbol reading device of the present invention.
Figure 18B:
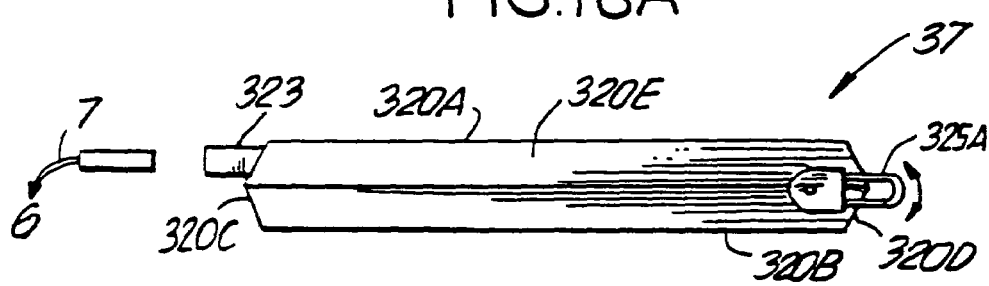
FIG. 18B is an elevated side view of the portable data collection base unit of the present invention.
Figure 18C:
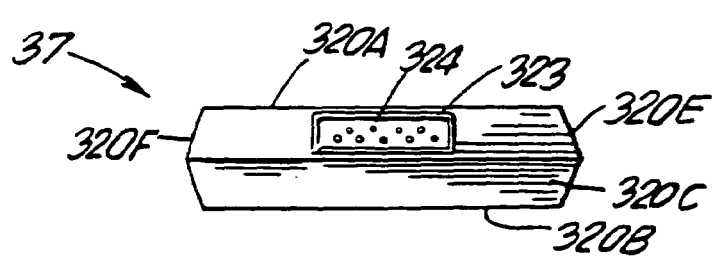
FIG. 18C is an elevated end view of the portable data collection base unit the present invention.

As illustrated in FIGS. 18A to 18C, data collection base unit 37 comprises a hand-holdable housing 320 which houses the operative elements of the device to be described below. Housing 320 has a top panel 320A, bottom panel 320B, front and rear panels 320C and 320D, and two opposing side panels 320E and 320F, as shown. A 4.times.4 membrane keypad 321 is mounted through the lower portions of top panel 320E for manual entry of alphanumeric type data including, for example, data related to bar code symbols. Notably, a separate switch is provided for turning the device ON and OFF. Above the keypad, there is mounted an LCD type 1.times.16 character display 322 for visually displaying data including (i) data being manually entered through keypad 321, (ii) operator messages and (iii) data entry verification messages which will be described in greater detail hereinafter.

Through front panel 320C adjacent character display 322, a data-output communication port 323 is provided. In the illustrative embodiment, data-output communication port 323 includes a 9-pin male connector 324, to which one end of communication cable 7 is connected, while the other end thereof is connected to the data-input port of a host computer system, such as point of sale (POS) cash register/computer 6. As will be described in greater detail hereinafter, data-output communication port 323 is particularly adapted for transmitting collected symbol character data stored in base unit 37, over communication cable 7 and through the data-input communication port of host computer system.

As shown in FIG. 18A, a pair of D-rings 325A and 325B are rotatably mounted to the rear end of the housing for conveniently supporting the data collection base unit on the operator's body while, for example, taking inventory. In this way, a cord, shoulder strap or belt strap can be attached to the D-rings. With this housing support arrangement, the user can simply pickup the hand-holdable data collection base unit in one hand and manually enter data through the keypad using one's thumb, while viewing the character display screen.

While not visually shown in FIGS. 18A, 18B or 18C, data collection base unit 37 includes a battery-power storage unit 326 realized, in the illustrative embodiment, as four AA type 1.5 volt batteries. These batteries are contained within a battery carrier attached to a hinged panel formed on the bottom panel 320B of the housing. Access to the battery carrier is achieved by simply opening the hinged panel, which after replacement of batteries, can be snapped shut.

Figure 19:
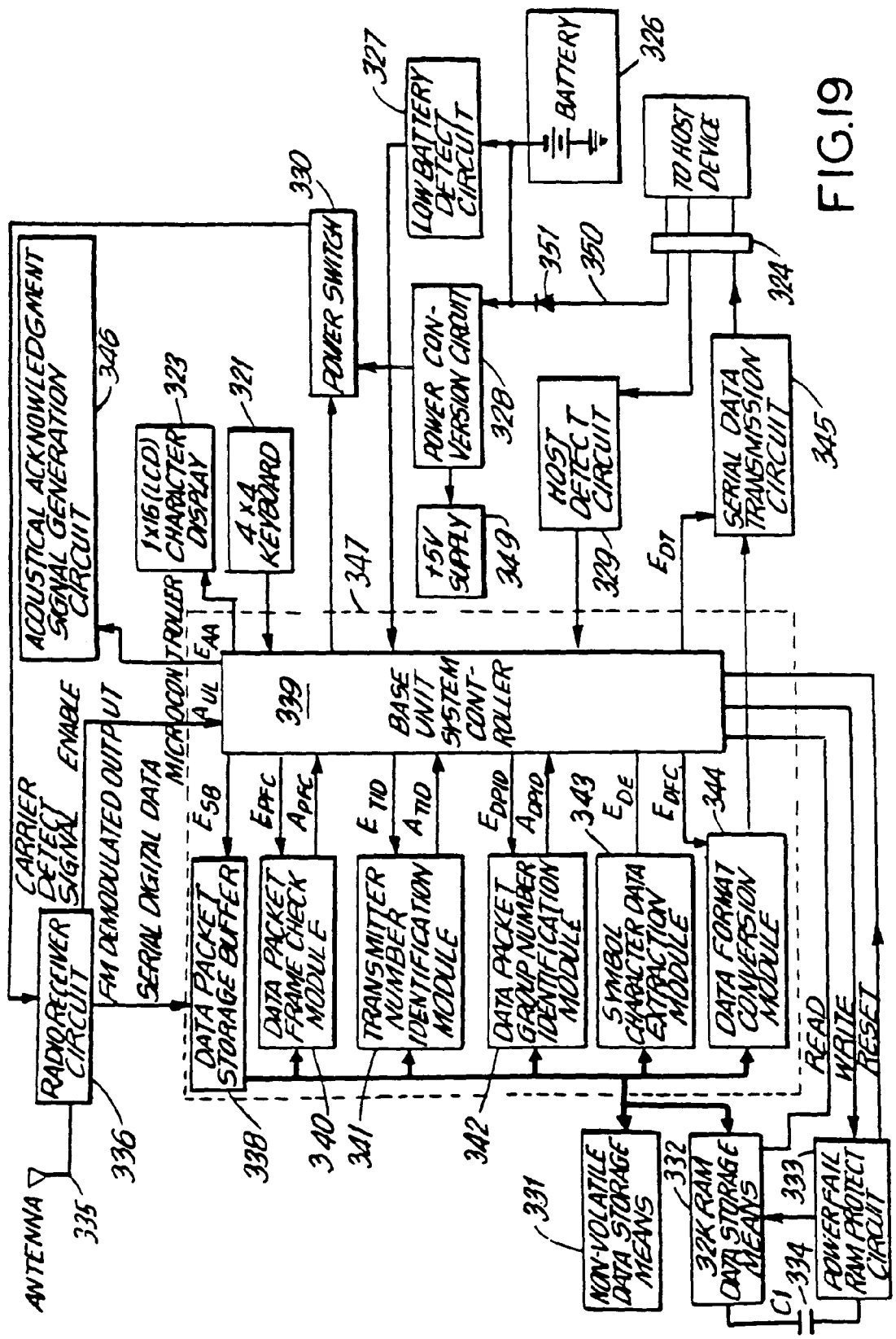
FIG. 19 is a functional block diagram of the data packet receiving and processing circuit, the acknowledgment signal generating circuit and the host computer interface circuit of the present invention, realized aboard the printed circuit board in the portable data collection base unit of the present invention.

In FIG. 19, the system architecture of data collection base unit 37 is schematically represented. As shown, data collection base unit 37 comprises a number hardware and software components, namely: a power supply circuit 326; low battery detection circuit 327; power conversion circuit 328; a data entry means in the form of 4.times.4 keyboard 321; LCD display 323; host detection circuit 329; power switch 330; 9 pin connector 324; a non-volatile data storage means (e.g., EPROM) 331; data storage memory (e.g., 32 Kilobyte RAM) 332; power fail RAM protection circuit 333; storage capacitor 334; receiving antenna element 335; an RF carrier receiving circuit 336; a data packet storage buffer 338; a base unit system controller 339; a data packet frame check module 340; a transmitter number identification module 341; a packet group number identification module 342; a symbol character data extraction module 343; a data format conversion module 344; a serial data transmission circuit 345; and an acoustical acknowledgement signal generation circuit 346. In the illustrative embodiment, a programmed microprocessor and associated memory (i.e., ROM and RAM), indicated by reference numeral 347, are used to realize the base unit system controller 340 and each of the above-described data processing and storage modules 339 to 344. Notably, a base unit ID register for storing the unique ID Number preassigned to the base unit, is realized using available memory in EPROM 331. The details of such a programming implementation are known by those with ordinary skill in the art to which the present invention pertains. System elements 335 to 346 in base unit 37 are structurally and functionally the same as system elements 274 to 285 in base unit 3, and thus do not require further description or explanation.

As shown in FIG. 19, data entry keypad 321 and character display 322 are each operably connected to base unit system controller 340, for entering and displaying data, respectively, as hereinbefore described. Data-output communication port 324 is connected to data transmission circuit 346, as shown.

The function of power conversion circuit 328 is to up-convert the battery voltage to +5 V supply, 349, whereas the function of power switching circuitry 330 is to disable the receiver by removing its power, during the downloading of data to a host device. When battery detect circuit 327 detects low battery power levels, it sends the base unit system controller a low-battery-level detect signal to initiate an alarm to the user.

The function of the host detect circuit 329 is to determine whether the data-output communication port of the base unit is physically (and electrically) connected to data-input communication port of host computer system. Thus, when host device detect circuit 329 detects a host device plugged into data-output communication port 323, it will provide a host device detect signal A.sub.DL to the system controller which automatically activates the system controller to begin initializing for "downloading" of collected bar code symbol character data, from the data collection device into the host device. To permit the host device to supply power to the data collection device during data downloading operations, and thus conserve battery power, a power supply line 350 is provided between a pin of data-output communication connector 224 and the positive side of battery supply 326. To restrict power flow from the data collection device to the host device, a diode 351 is inserted in series along this power supply line 350, as shown.

Symbol character data recovered by symbol character data extraction module 343, is stored within RAM 332. To facilitate transfer of such data from module 342 to RAM storage unit 332, a data bus 352 is provided, as shown. Also associated with data bus 352 is EEPROM 331. The base unit system controller will typically store particular data items, such as set-up parameters and the like, in non-volatile RAM 331 as such data can be retained therein for the lifetime of the data collection base unit.

RAM storage unit 332 is protected by power-fail/RAM-protect circuit 333 which, as shown in FIG. 19, is operably associated with storage capacitor 334 and the write line of RAM storage unit 353. RAM storage unit 332 is protected in two ways. Firstly, during power transitions, circuit 333 inhibits write signals to RAM storage unit 332, and consequently stored symbol character data is protected from corruption. Secondly, during periods of battery power failure, circuit 333 enables storage capacitor 334 to provide power to RAM storage unit 332 for minimally one hour in order to maintain the integrity of stored symbol character data.

Having described the structure and function of data collection base unit 37, its versatile operation will now be described with reference to the system control program illustrated in FIGS. 20A to 20D.

Figure 20A:
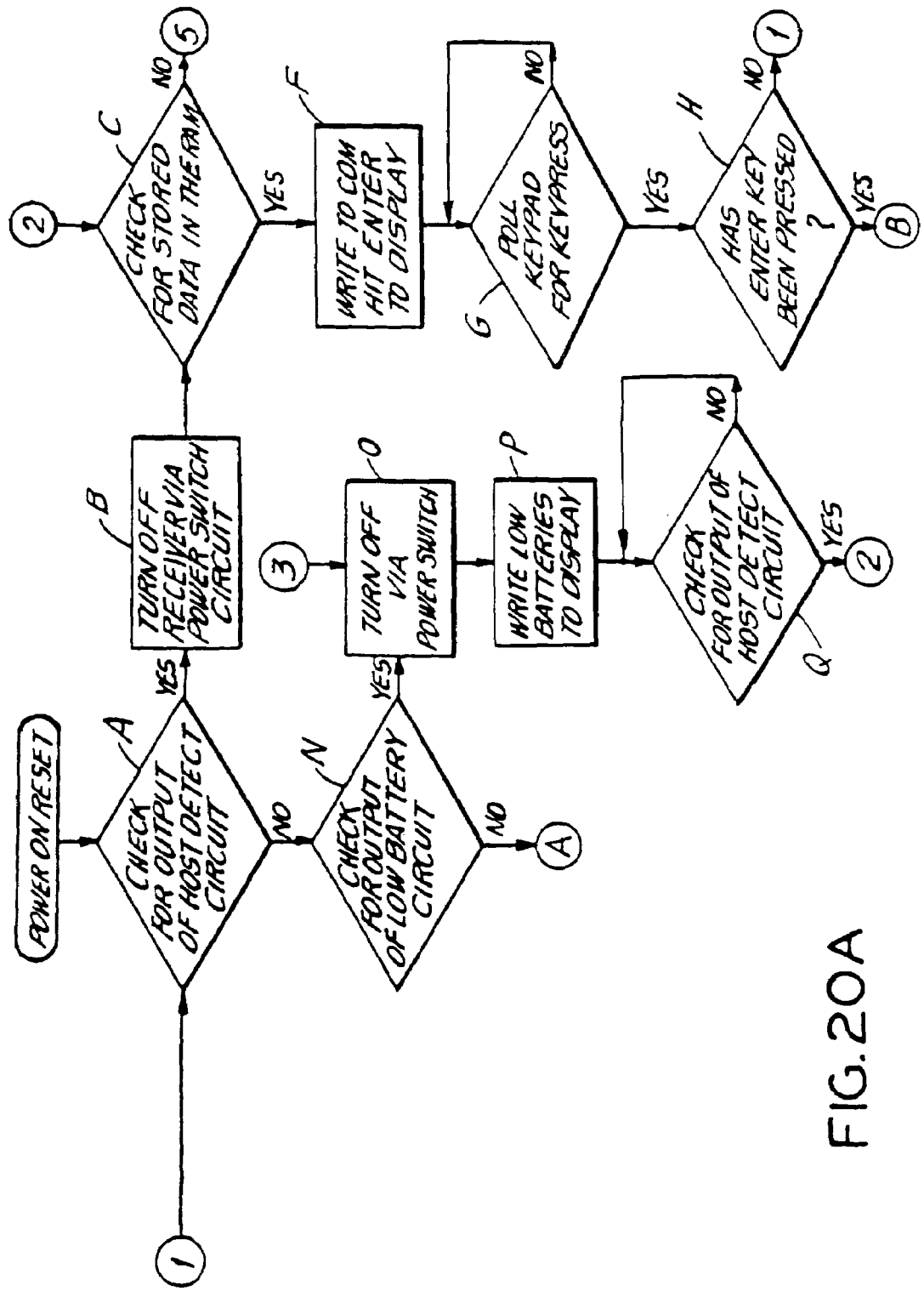
FIGS. 20A to 20D together consist of a flow chart illustrating the steps performed during the control process carried out within the portable data collection base unit of the present invention.

As indicated in FIG. 20A, upon enabling the POWER-ON switch, the (base unit) system controller advances to Block A. At Block A, the system controller checks to determine whether the output of host detect circuit 329 indicates that a host device is plugged into data-output communication port 324. If it detect this condition, then at Block B the system controller enables power switching circuit 330 and uses the same to disconnect the power supply from the RF signal receiving circuit. Then at Block C, the system controller checks to determine whether there is any data stored in RAM storage unit 332 for downloading to the connected host device. If there is no data stored in RAM storage unit 332, then the system controller proceeds to Block D, and writes "MEMORY EMPTY" to character display 322. Thereafter, the system controller remains at Block E until it receives host detect signal A.sub.DL=0 indicative that the host device is no longer plugged into data-output communications port 324. Upon the occurrence of this event, the system controller returns to Block A, as shown.

If, at Block C, the system controller determines that there is data stored in RAM storage unit 332 for downloading into the host device, then at Block F the system controller writes "TO COM HIT ENTER" to character display 322. At Block G, the system controller polls the keypad for the occurrence of a key press operation, and at Block H determines whether the ENTER key has been pressed. If any key other than the ENTER is pressed, then the system controller returns to control Block A. If the ENTER key is pressed, the system controller proceeds to Block I and writes the message "TRANSMITTING" to character display 322. Then at Blocks J through M, data in RAM storage unit 332 is downloaded to the host device connected to data-output communication port 324.

Figure 20B:
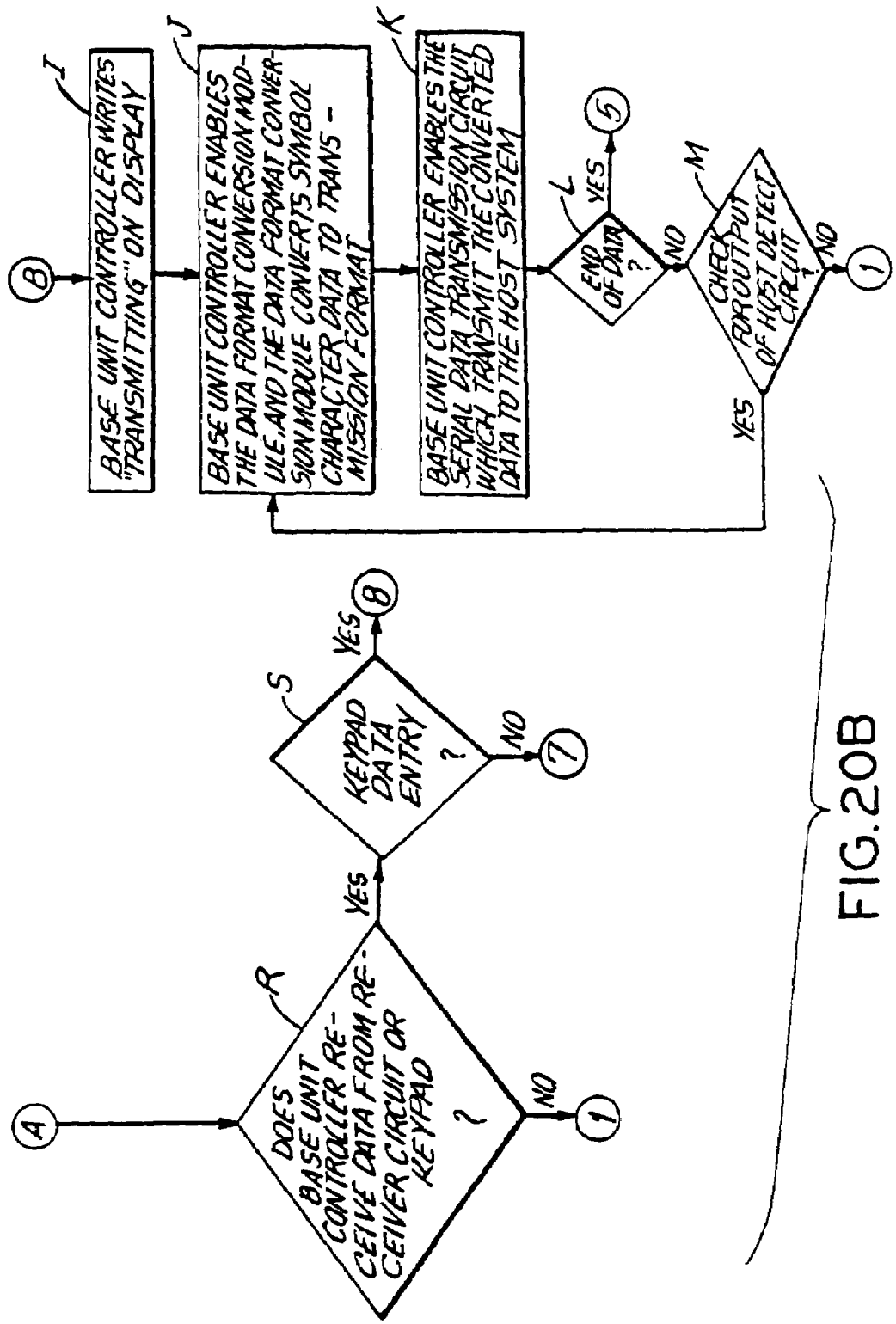
Figure 20C:
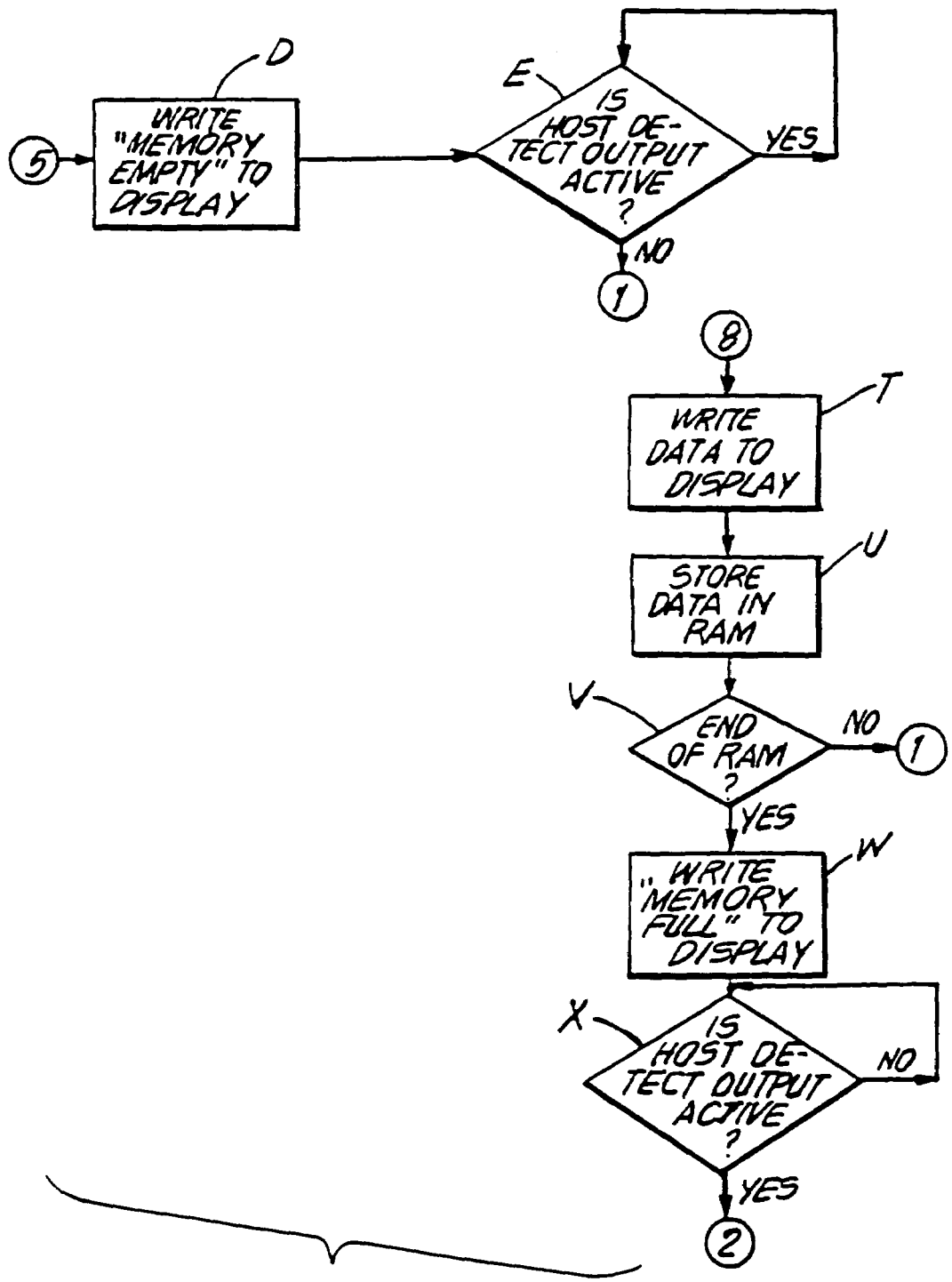

Specifically, at Block J in FIG. 20B, the base unit system controller enables data format conversion module 344 by generating enable signal E.sub.DFC=1. In response to this enable signal, the data format conversion module converts the data format of the recovered symbol character data and then buffers the format-converted symbol character data bytes in data buffer 332. Then at Block K the base unit system controller enables the serial data transmission circuit 345 by generating enable signal E.sub.DT=1. In response to this enable signal, the serial data transmission circuit transmits the format-converted symbol character data bytes over communication cable 7 using serial data transmission techniques well known in the art, as discussed above. At Block L, the system checks to determine if all data in RAM storage unit 332 has been transmitted, and if so, writes the message "MEMORY EMPTY" or "DOWNLOAD COMPLETE" to character display 322, as indicated at Block D in FIG. 20C. Thereafter, the system controller remains at Block E until the host device is disconnected from data-output communication port 324, and thereupon returns to Block A.

Figure 20D:
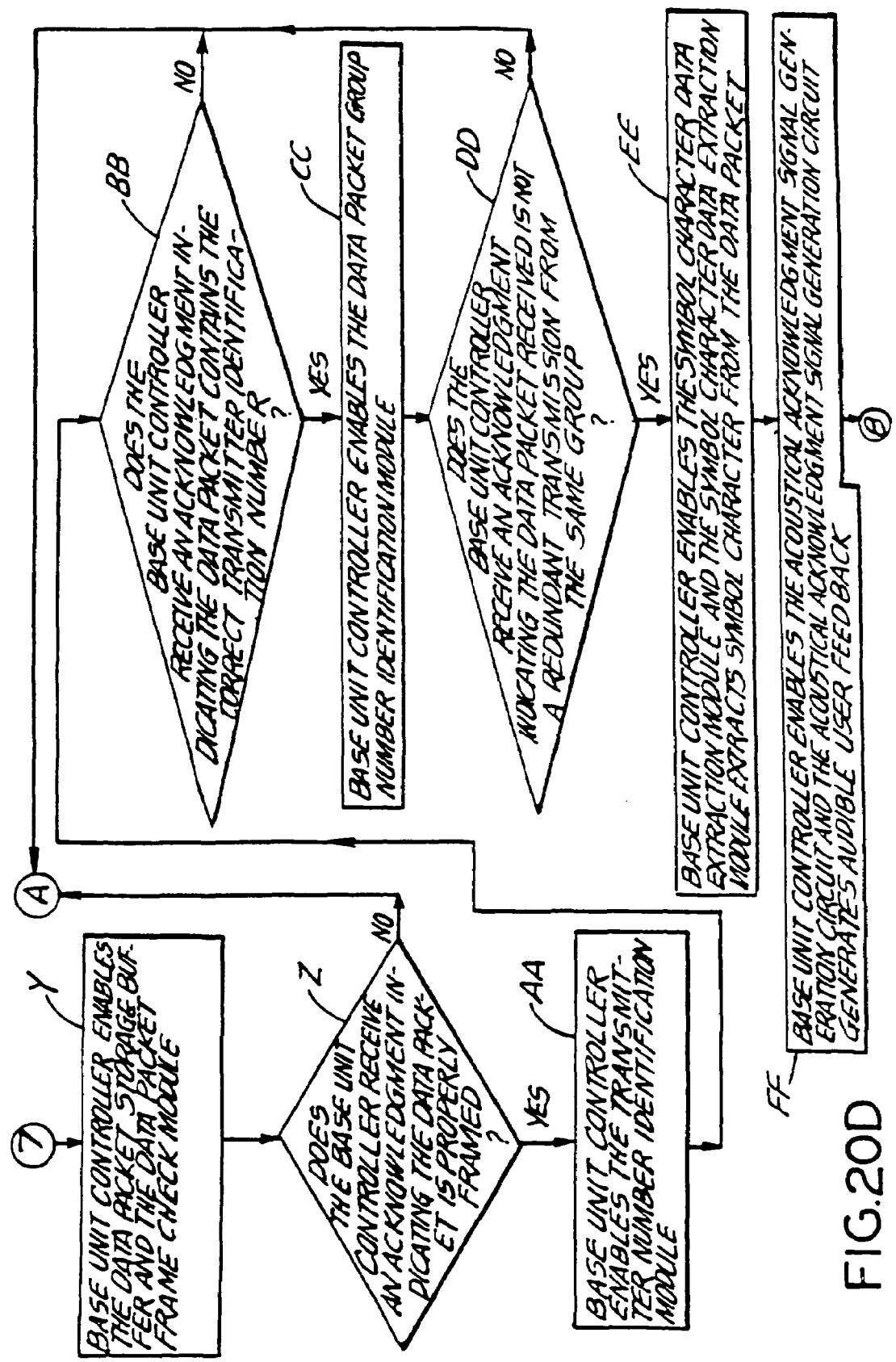

However, if it is determined at Block L in FIG. 20D that data transfer from RAM storage unit 332 is not complete, then as indicated at Block M the system controller checks to determine whether the host device is still connected to data-output communication port 324 (i.e., A.sub.DL=1). If host device has been disconnected (i.e., A.sub.DL=0), then the system controller returns to Block A, as shown. If, on the other hand, the host device remains connected to data-output communications port 324, the system controller returns to Block J to form a control loop within which the system controller will remain so long as there remains data in RAM storage unit 332 and the host device remains connected to data-output communication port 324.

As indicated at Block A in FIG. 20A, if the system controller does not receive host detect signal A.sub.DL=1 from host detect circuit 329, indicative that a host device is not plugged into the data-output communication port, then the system controller proceeds to Block N. At Block N, the system controller first checks the output of low battery circuit 327 to determine that sufficient power is available. If insufficient battery strength is indicated, then at Block O the system controller disconnects battery power supply 326 from data-output communication port 324 by way of power switching circuit 320. Thereafter at Block P in FIG. 20A, the system controller writes "LOW BATTERIES" to character display 322. The system controller remains at Block Q until it receives host detect signal A.sub.DL=1, indicative that the host device is plugged into data-output communication port 324. If so, the system controller advances to Block C, as hereinbefore described. Notably, this choice of control flow is based on the fact that, during data downloading operations, power is supplied to the data collection base unit by the host device, and the battery level of the data collection device is of no consequence during such operations.

If a LOW battery level is not detected at Block N, then the system controller proceeds to Block R and polls both the receiver circuit and the keypad for entry of data. If the system controller determines that no data is being presented for collection, then the system controller returns to Block A, as shown. However, if one of these components has data fox collection, then at Block S in FIG. 20B the system controller determines which one has data for entry. If the keypad has data for entry and collection, then the system controller proceeds to Block T in FIG. 20C.

At Block T, the system controller uploads such data by first writing the data to character display 323, and then at Block U storing the data in RAM storage unit 33-2. Then, at Block V, the system controller determines whether RAM storage unit 332 is filled to capacity. If it is, then at Block W the system controller writes "MEMORY FULL" to character display 332. Thereafter, the system controller remains at Block X until it receives host detect signal A.sub.DL=1, indicative that a host device is connected to data-output communications port 324 for downloading collected data thereto. When a host device is detected at the data-output communications port 324, the system controller proceeds to Block C for participating in downloading of a collection data, in a manner described above. If, at Block V, the system controller determines that RAM storage unit 332 is not full, then the system controller returns to Block A, as shown.

If at Block S the RF receiver circuit has data for entry, then the system controller proceeds to Block Y in FIG. 20D. At this Block, the system controller enables data packet storage buffer 338 and data packet frame check module 340 by producing activation control signals E.sub.SB=1 and E.sub.PFC=1, respectively. At Block Z, the base unit system controller determines whether it has received an acknowledgement (i.e., control activation signal A.sub.PFC=1) from the data packet frame check module, indicating that the received data packet is properly framed. If the received data packet is not properly framed, then the base unit returns to Block R in order to redetect the incoming carrier signal. However, if the received data packet is properly framed, then at Block AA the base unit system controller enables the transmitter number identification module by generating enable signal E.sub.TID=1.

At Block BB in FIG. 20D, the base unit system controller determines whether it has received an acknowledgment (i.e., control activation signal A.sub.TID=1) from the transmitter number identification module 341 that the received data packet contains the correct transmitter identification number (i.e., the same number assigned to the base unit). If the Transmitter Identification Number contained within the received data packet does not match the Base Unit Identification Number preassigned to the base unit, then the base unit system controller returns to Block R whereupon it resumes carrier signal detection. If, however, the Transmitter Identification Number contained in the received data packet matches the Base Unit Identification Number stored in EPROM 331, then at Block CC the base unit system controller enables the data packet group number identification module 342 by generating enable signal E.sub.DPID=1.

At Block DD in FIG. 20D, the base unit system controller determines whether it has received an acknowledgment (i.e., control activation signal A.sub.DPID=1) from the data packet group identification module 342 indicating that the received data packet is not a redundant data packet (i.e., from the same transmitted data packet group). This is achieved by analyzing the Packet Group Number of the previous and currently received data packets. If the received data packet is a redundant data packet, then the base unit system controller returns to Block R, whereupon carrier signal detection is resumed. If, however, the received data packet is determined not redundant at Block DD, then at Block EE the base unit system controller enables the symbol character data extraction module 343 by generating enable signal E.sub.DE=1. In response to the generation of this enable signal, symbol data extraction module 343 reads the bytes of symbol character data contained in the received data packet, checks the data for statistical reliability, and the writes the extracted symbol character data bytes into storage buffer 338.

At Block FF in FIG. 20D, the base unit system controller enables at Block FF the acoustical acknowledgement signal generation circuit 346 by producing enable signal E.sub.AA=1. In response to the production of this enable signal, acoustical acknowledgment signal generation circuit 346 generates a high intensity acoustical signal having characteristics of the type described above, thereby informing the user that a transmitted data packet has been received and that the symbol character data packaged therein has been successfully recovered and transmitted to the host computer system. Thereafter, the base unit system controller proceeds to Block T in FIG. 20C, as shown.

In the event that the operator desires to clear RAM storage unit 332 of collected data, the operator must enter a preset code word or alphanumeric code by way of keypad 321. This feature prevents accidental erasure of collected data. Also, the data collection device of the present invention automatically down-loads the stored data to the host computer system upon detection of the data-receive port. Rather than programming the data collection device for such data "downloading" transfers, data downloading routines are programmed into the host computer system. Preferably, these downloading routines are designed to accept downloaded symbols and create an ASCII file.

The third illustrative embodiment of the base unit shown in FIGS. 5A to 5D will now be described in greater detail with reference to FIGS. 21 to 23.

Figure 21:
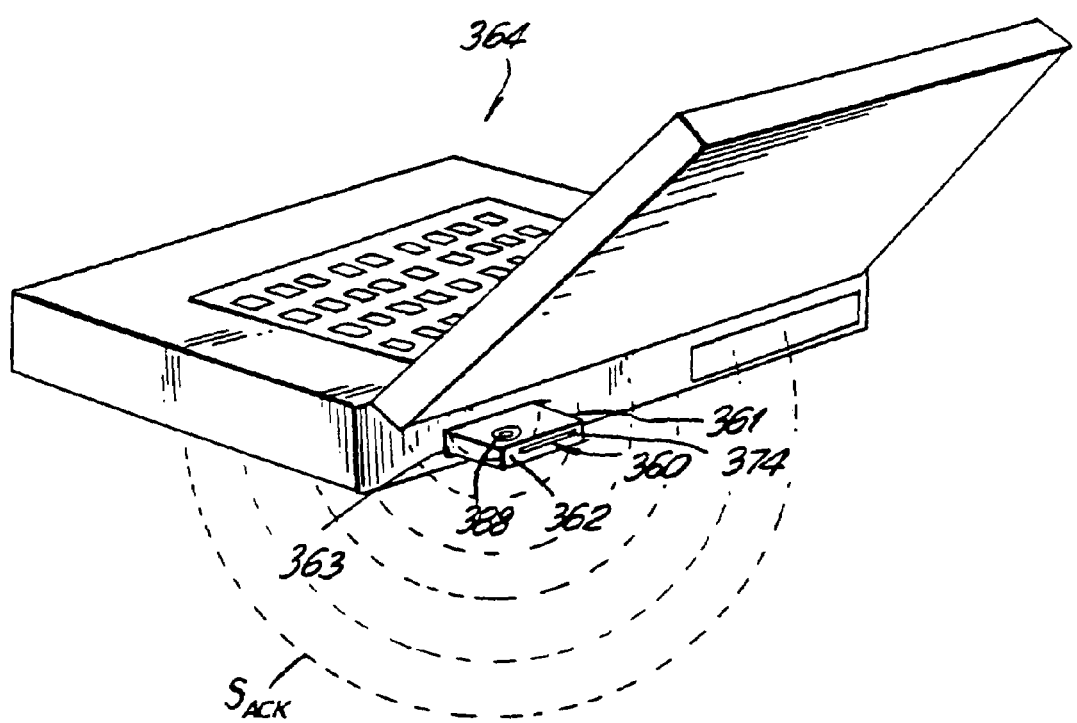
FIG. 21 is a perspective view of the PCMCIA card base unit of the present invention shown installed within the PCMCIA slot of a portable lap-top computer system.

As shown in FIG. 21, base unit 360 is realized as a PCMCIA card 361, including a PC board 362, which as a single device inserts into the PCMCIA (TYPE II or III) port 363 of a portable or desk-top computer system 364. In general, the system architecture of base unit 360 is similar to base unit 3 of the first illustrative embodiment described above. As shown in FIG. 22, base unit 360 comprises a number hardware and software components, namely: a power supply circuit 373; a receiving antenna element 374; an RF carrier signal receiver circuit 375; a data packet storage buffer 377; a base unit system controller 378; a data packet frame check module 379; a transmitter number identification module 380; a data packet number identification module 381; a symbol character data extraction module 382; a serial-data-to-PCMCIA-bus conversion module 383; a PCMCIA bus interface circuit 384; and an acoustical acknowledgement signal generation circuit 385. In the illustrative embodiment, a programmed microprocessor and associated memory (i.e., ROM and RAM) mounted on PC board 362, indicated by reference numeral 386, are used to realize base unit system controller 378 and each of the above-described data processing modules 377 to 383 in a similar manner hereinbefore described. The details of such a programming implementation are known by those with ordinary skill in the art to which the present invention pertains.

Figure 22:
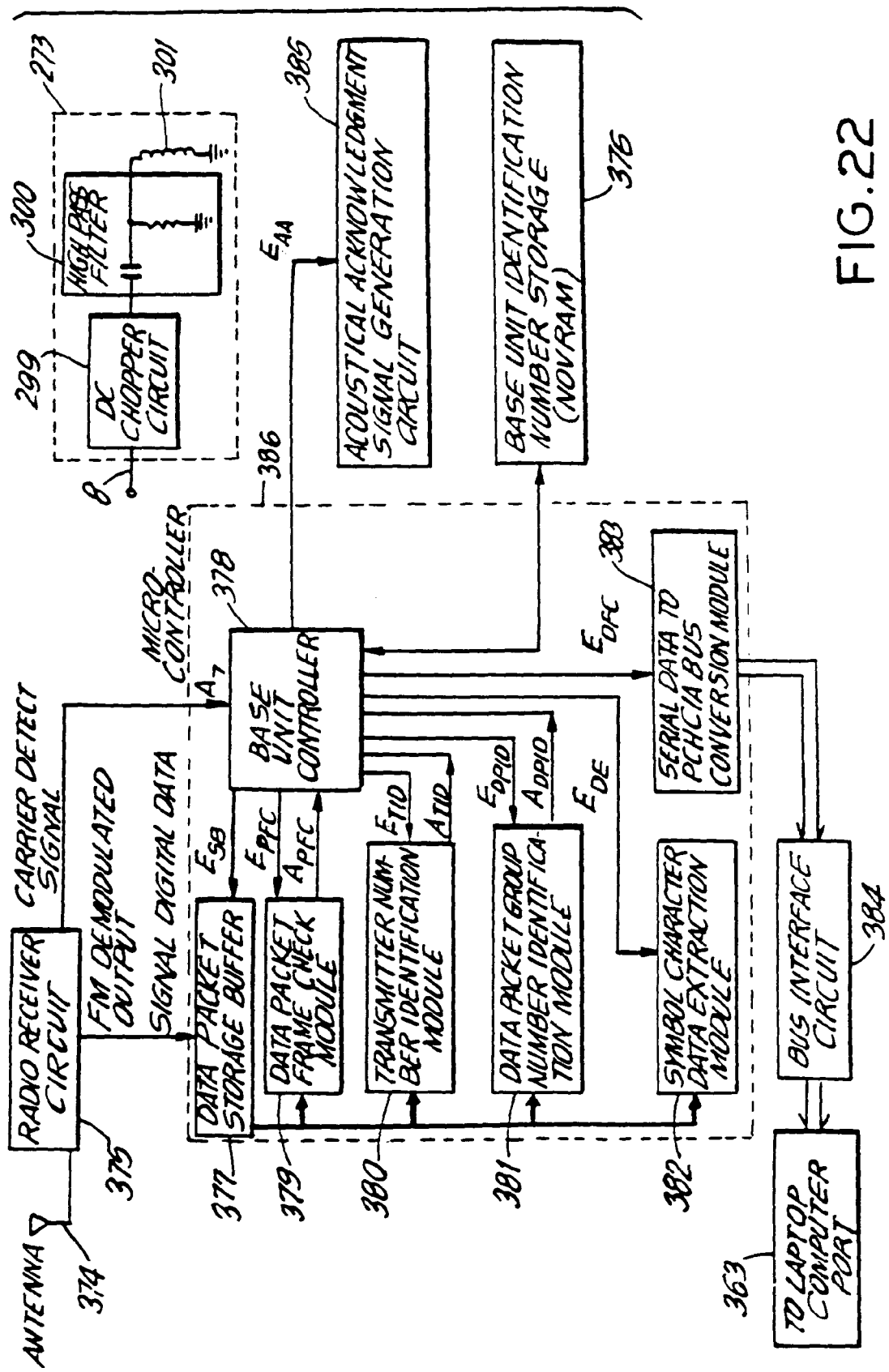
FIG. 22 is a functional block diagram of the data packet receiving and processing circuit, the acknowledgment signal generating circuit, and host interface circuit realized on the printed PCMCIA circuit board of the card-type base unit shown in FIG. 20.

As shown in FIG. 22, the output of the symbol character data extraction module 382 is provided to the input of the serial-data-to-PCMCIA-bus-conversion module 383. The function of this conversion module is to convert the format of the recovered symbol character data so that it may be placed on the PCMCIA bus of host computer 364, via PCMCIA bus interface circuit 384. The function of PCMCIA bus interface circuit 384 is to realize the interface between the PCMCIA bus aboard host computer 364 and the circuitry on PC board 362 which realizes the structures and functions of the base unit. Electro-acoustical transducer 388, which forms part of the acoustical acknowledgment signal generation circuit 385, and RF receiving antenna 374, are both mounted on a selected portion of PC board 362 that extends from the PCMCIA port 363, as shown. In this way, the receiving antenna element is free to detect RF carrier signals, while the electro-acoustical transducer is free to transmit acoustical acknowledgment signals to the ambient environment for the user to hear. In all other respects, the base unit 360 is structurally and functionally similar to base unit 3 described above.

The overall operation of the base unit of the third illustrative embodiment will be described below with reference to the control process shown in FIG. 23.

Figure 23:
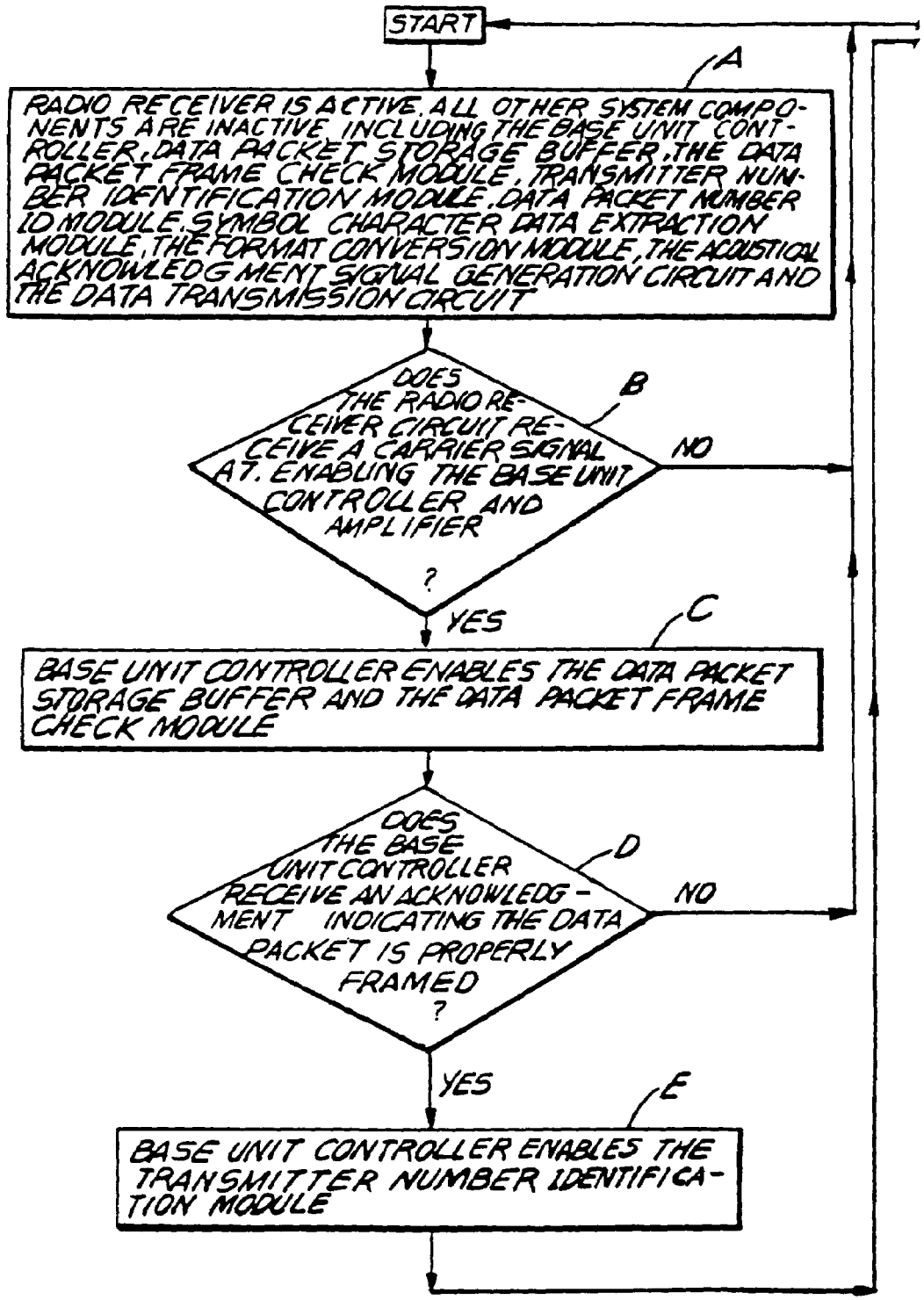
FIG. 23 is a flow chart illustrating the steps performed during the control process conducted within the PCMCIA-card type base unit shown in FIG. 20.
Figure 23A:
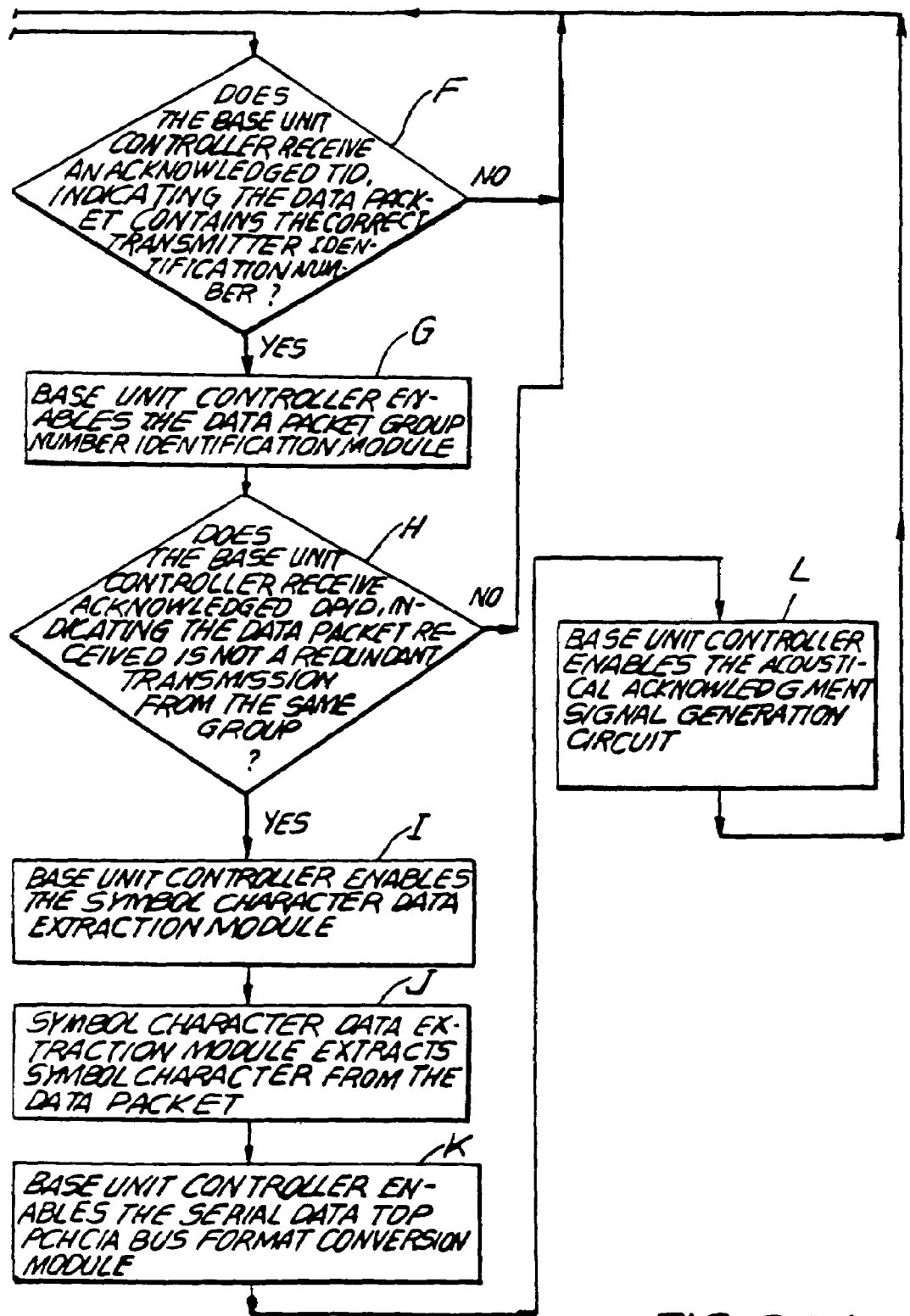

As illustrated at Block A in FIG. 23, radio receiving circuit 375 is the only system component that is normally active at this stage of the base unit system control process; all other system components are inactive (i.e., disabled) including base unit system controller 378; data packet storage buffer 377, data packet frame check module 379, transmitter number identification module 380, data packet number Identification module 381, symbol character data extraction module 382, serial-data-to-PCMCIA-bus-conversion module 383, PCMCIA bus interface circuit 384, and acoustical acknowledgement signal generation circuit 385. With the radio receiving circuit activated, base unit 360 is capable of receiving any modulated carrier signal transmitted from any of the bar code symbol reading devices within the data transmission range of the base unit.

At Block B in FIG. 23, radio receiving circuit 375 determines whether it has received a transmitted carrier signal on its receiving antenna element 374. If it has, then the radio receiving circuit generates a system controller activation signal $A_7$, which activates base unit system controller 378 shown in FIG. 21. Then at Block C, the base unit system controller activates (i.e., enables) data packet storage buffer 377 and data packet frame check module 379 by producing activation control signals $E_{SB}=1$ and $E_{PFC}=1$, respectively. At Block D, the base unit system controller determines whether it has received an acknowledgement (i.e., control activation signal $A_{PFC}=1$) from the data packet frame check module, indicating that the received data packet is properly framed. If the received data packet is not properly framed, then the base unit returns to Block A in order to redetect an incoming carrier signal. However, if the received data packet is properly framed, then at Block E the base unit system controller enables the transmitter number identification module by generating enable signal $E_{TID}=1$.

At Block F in FIG. 23, the base unit system controller determines whether it has received an acknowledgment (i.e., control activation signal $A_{TID}=1$) from the transmitter number identification module that the received data packet contains the correct transmitter identification number (i.e., the same number assigned to the base unit and stored in storage unit 376). If the Transmitter Identification Number contained within the received data packet does not match the Base Unit Identification Number stored in storage unit 376, then the base unit system controller returns to Block A whereupon it resumes carrier signal detection. If, however, the Transmitter Identification Number contained in the received data packet matches the Base Unit Identification Number, then at Block G the base unit system controller enables the data packet number identification module 389 by generating enable signal $E_{DPID}=1$.

At Block H in FIG. 23, the base unit system controller determines whether it has received an acknowledgment (i.e., control activation signal $A_{DPID}=I$) from the data packet identification module indicating that the received data packet is not a redundant data packet (i.e., from the same transmitted data packet group). If the received data packet is a redundant data packet, then the base unit system controller returns to Block A, whereupon carrier signal detection is resumed. If, however, the received data packet is not redundant, then at Block I the base unit system controller enables the symbol character data extraction module by generating enable signal $E_{DE}=1$. In response to the generation of this enable signal, the symbol data extraction module reads at Block J the symbol character data contained in the received data packet, checks the data for statistical reliability, and the writes the extracted symbol character data bytes into a storage buffer (not explicitly shown). Thereafter, as indicated at Block K, the base unit system controller enables serial-data-to-PCMCIA-bus conversion module 383 by generating enable signal $E_{DFC}=1$. In response to this enable signal, the serial-data-to-PCMCIA-bus conversion module 383 converts the data format of the recovered symbol character data and then transfers the format-converted data to the PCMCIA bus of the host computer 364 by way of bus interface circuitry 384. When the serial data transmission process is successfully completed, the base unit system controller enables at Block L the acoustical acknowledgement signal generation circuit 385 by producing enable signal $E_{AA}=1$. In response to the production of this enable signal, acoustical acknowledgment signal generation circuit 235 generates a high intensity acoustical signal having characteristics of the type described above, thereby informing the user that a transmitted data packet has been received and that the symbol character data packaged therein has been successfully recovered and transmitted to the host computer system. Thereafter, the base unit system controller returns to the Block A, as shown. The fourth illustrative embodiment of the base unit of FIGS. 6A to 6D will now be described in greater detail with reference to FIGS. 24A to 26.

Figure 24A:
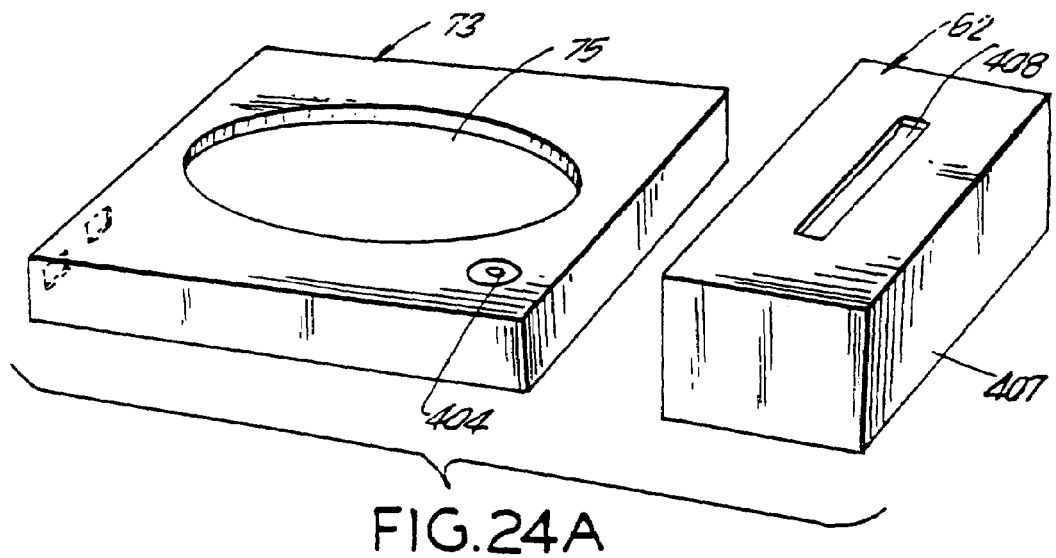
FIG. 24A is a perspective view of the housing for the desktop base unit of the present invention.
Figure 24B:
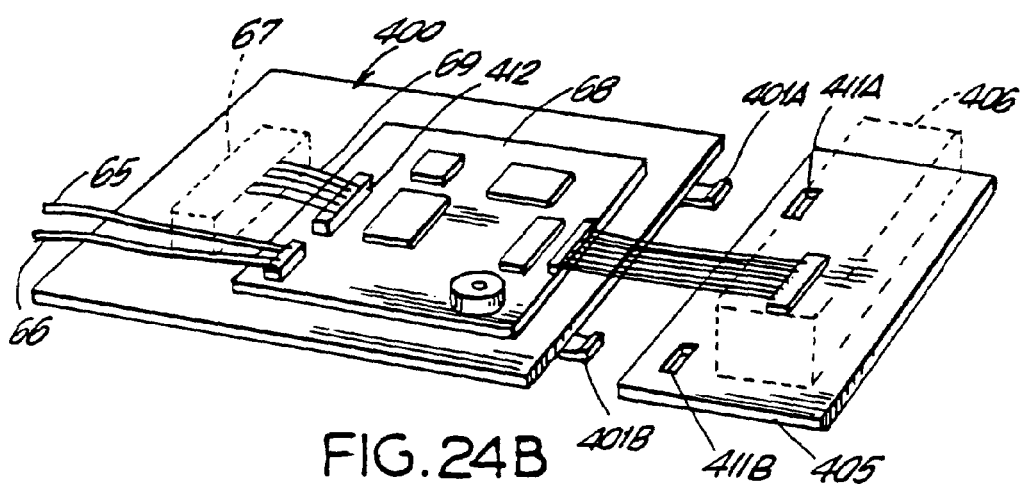
FIG. 24B is a perspective view of the base plate portion of the desktop base unit of the present invention.
Figure 24C:
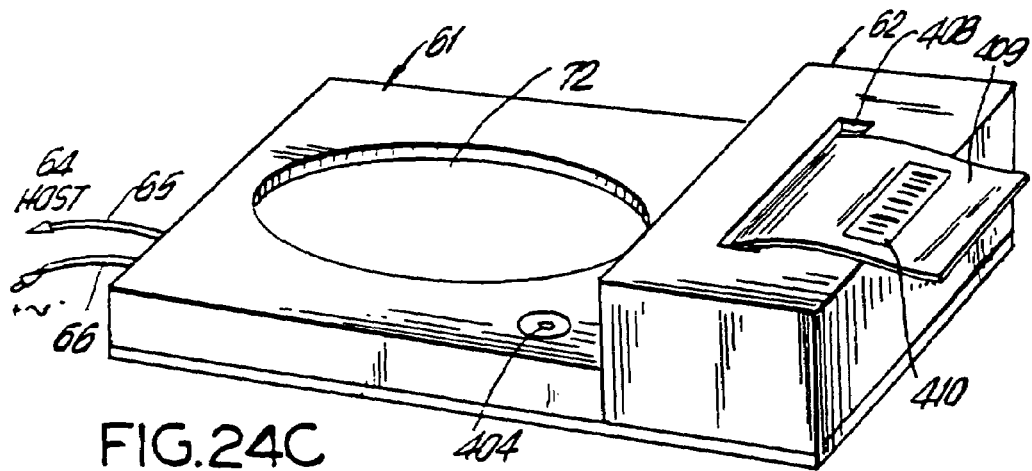
FIG. 24C is a perspective view of the assembled desktop base unit of the present invention, shown physically coupled to a bar code symbol printing engine, and the serial communications port of a host computer system.

As shown in FIG. 24C, a base unit 61 is operably connected to a bar code symbol printing engine 62. As shown, base unit 61 is interfaced with host computer system (e.g., desk-top computer 64 by way of serial data communications cable 65. Power cable 65 is connected to a connector jack on PC board 68 and supplies electrical power to primary transformer 67 by way of a conventional current chopper circuit 412 realized on PC board 68, and wires 69 extending therebetween. As shown, PC board 68 is mounted on a base plate 400 having a pair of spaced apart projections 401A and 401B disposed within the plane of the base plate. Base unit housing 73 is adapted to snap-fit onto base plate 400. A circular aperture 404 is provided in the top panel of housing 73 to permit the energy of acoustical acknowledgment signals emanate from the electroacoustical transducer mounted on PC board 68.

As shown in FIGS. 24A and 24B, bar code symbol printing engine 62 comprises a base plate 405 on which a conventional bar code printing engine 406 is mounted, and a printing engine housing 407 that encloses the engine and connects to base plate 405 in a snap-fit manner. Housing 407 has an aperture 408 in its top panel to permit the substrate 409 on which bar code labels 410 are printed. Base plate 405 has a pair of spaced apart slots 411A and 411B, which are adapted to receive and engage projections 401A and 401B, respectively.

Figure 25:
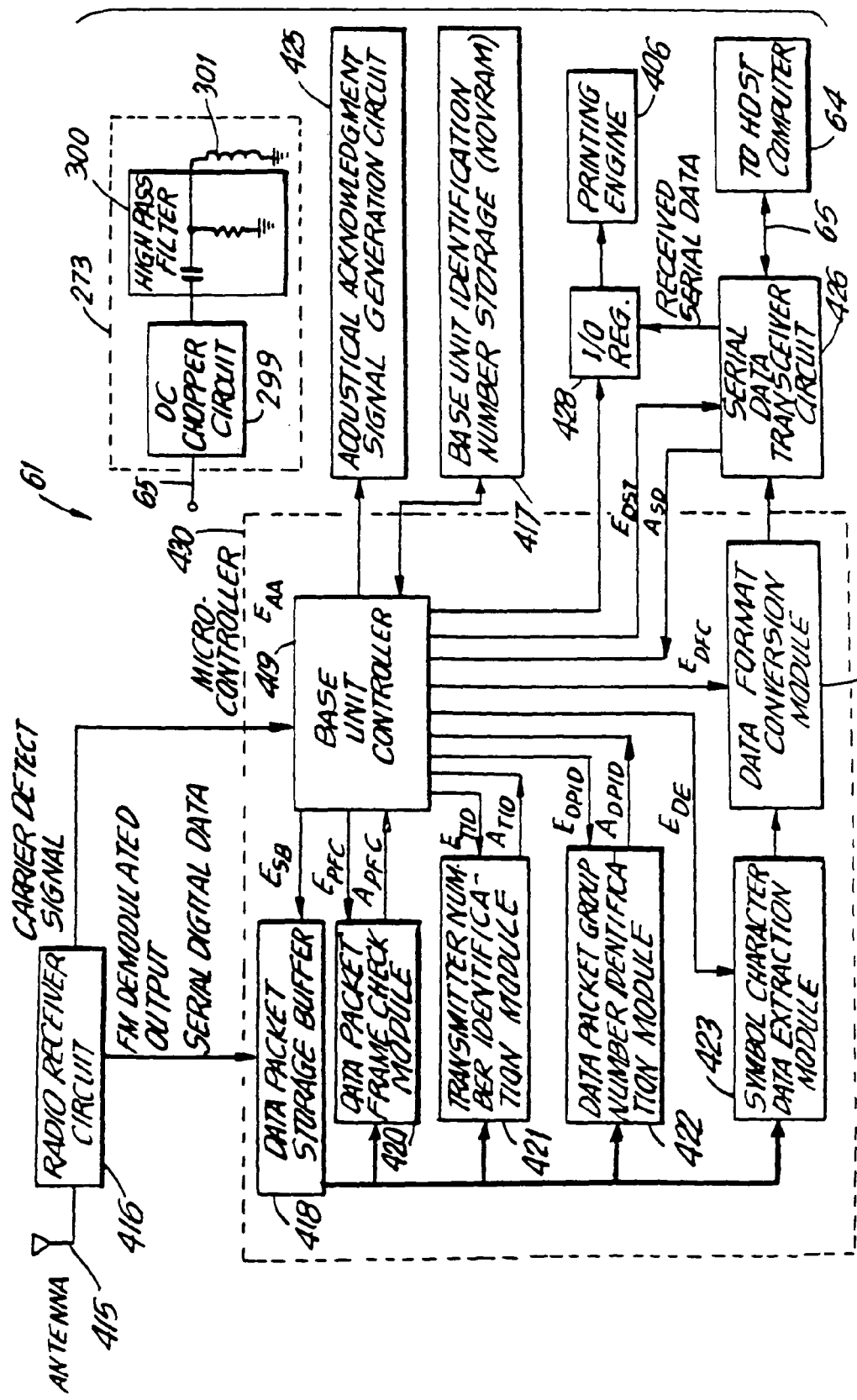
FIG. 25 is a block functional diagram of the data packet receiving and processing circuit the acknowledgment signal generating circuit realized on the printed circuit board aboard the base unit shown in FIG. 24C.

As shown in FIG. 25, base unit 61 comprises a number hardware and software components, namely: a power supply circuit 273; a receiving antenna element 415; an RF carrier signal receiver circuit 416; a data packet storage buffer 418; a base unit system controller 419; a data packet frame check module 420; a transmitter number identification module 421; a data packet number identification module 422; a symbol character data extraction module 423; a data format conversion module 424; an acoustical acknowledgement signal generation circuit 425; serial data transceiver circuit 426; and input/output (I/O) register 428. In the illustrative embodiment, a programmed microprocessor and associated memory (i.e., ROM and RAM) mounted on PC board 68, indicated by reference numeral 430, are used to realize base unit system controller 419 and each of the above-described data processing modules 420 to 424. The details of such a programming implementation are known by those with ordinary skill in the art to which the present invention pertains.

As shown in FIG. 25, the output of the symbol character data extraction module is provided to data format conversion module 424. The output of data format conversion module 424 is connected to serial data transceiver circuit 426. In turn, serial data transceiver circuit 426 is connected to the serial data input port of host computer 64, as shown. Notably, serial data transceiver circuit 426 is enabled by an enable signal $E_{DST}=1$ produced by the base unit system controller. In all other respects, the architecture of base unit 61 is substantially similar to the base unit of the first illustrative embodiment.

The overall operation of base unit 61 will be described, below with reference to the control process shown in FIG. 26.

Figure 26:
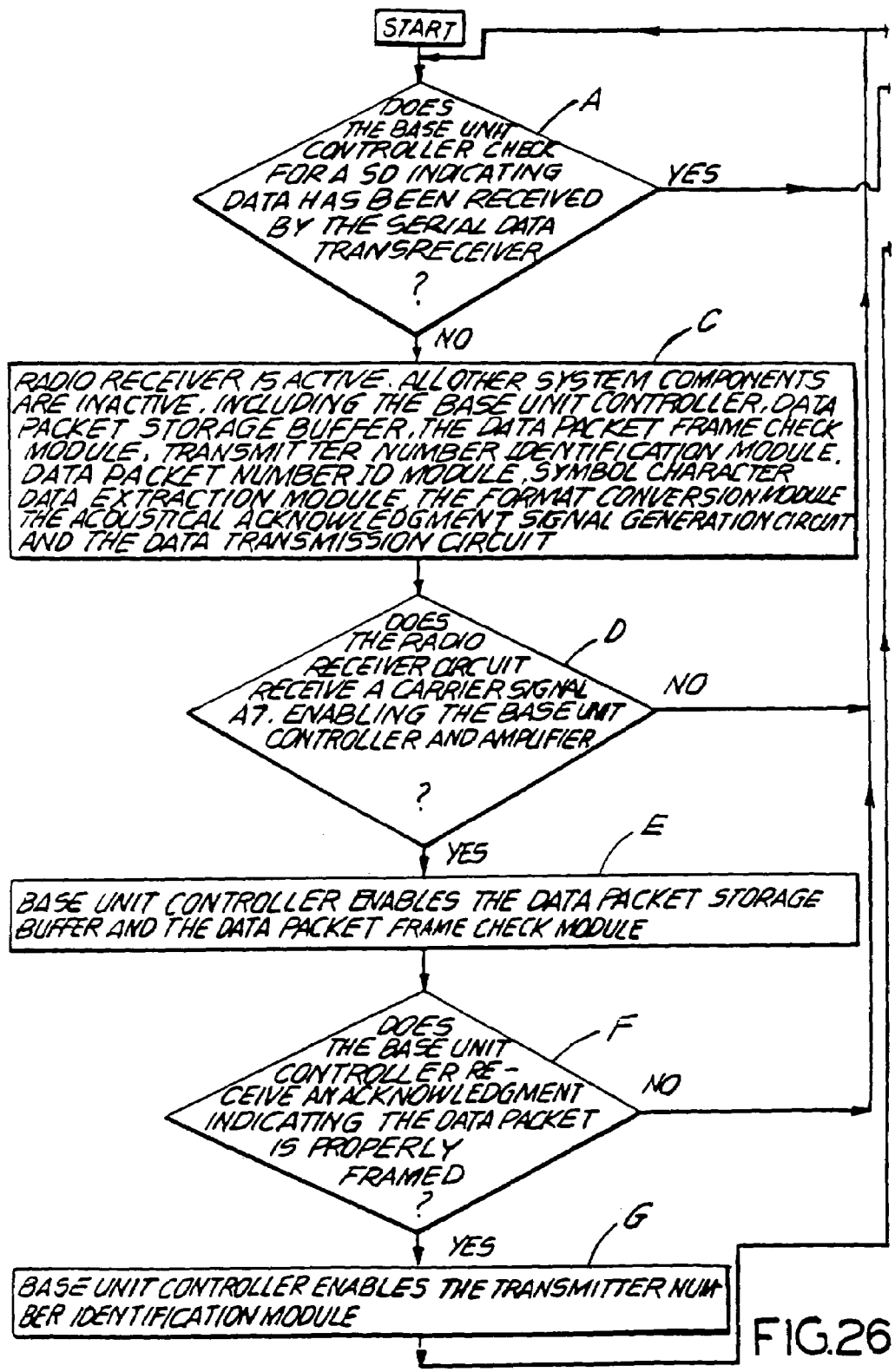
FIG. 26 is a flow chart illustrating the steps performed during the control process carried out within the desktop base unit of FIG. 24C.
Figure 26A:
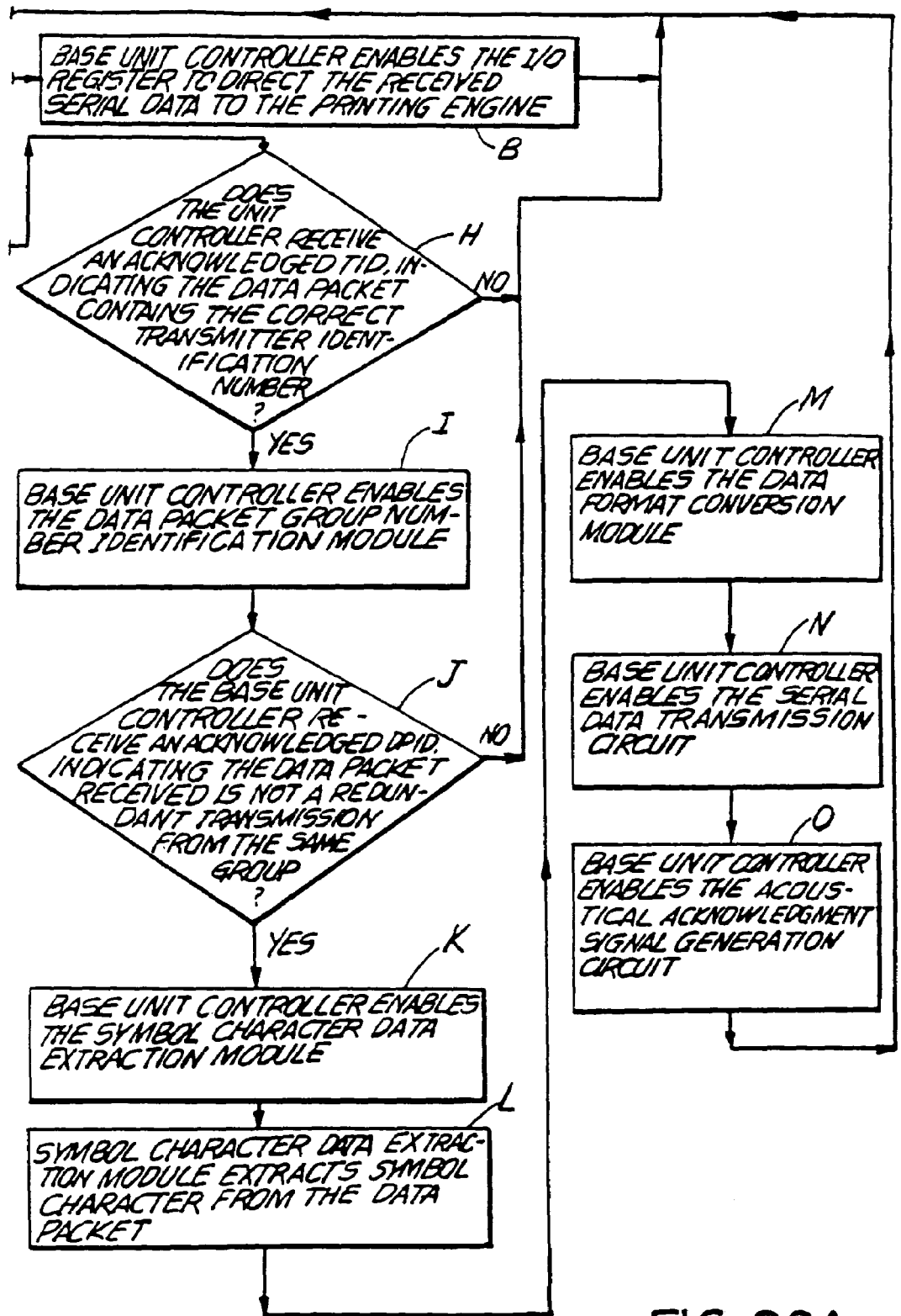

Prior to entering Block A in FIG. 26, only serial data transceiver circuit 426, base unit system controller 419 and radio receiver circuit 416 are activated, while all other system components are disabled. As illustrated at Block A in FIG. 26, the base unit system controller 419 determines whether activation control signal A.sub.SD=1 has been received. If this control activation signal is received, then at Block B, the base unit system controller enables the I/O register 428 to direct the received serial data to the printing engine 406. Thereafter, the base unit system controller returns to Block A in FIG. 26.

If at Block A, the base unit system controller does not receive control activation signal A.sub.SD 32 1, but rather A.sub.SD=0, then the base unit system controller proceeds to Block C in FIG. 26. At this control block, radio receiving circuit 416, system controller 419, and serial data transceiver 426 are the only active system components; all other system components are inactive (i.e., disabled) including base unit system controller 419, data packet storage buffer 418, data packet frame check module 420, transmitter number identification module 421, data packet number identification module 422, symbol character data extraction module 423, data format conversion module 424, acoustical acknowledgement signal generation circuit 425, and serial data transceiver circuit 426. With the radio receiving circuit 416 activated, base unit 61 is capable of receiving any modulated carrier signal transmitted from any of the bar code symbol reading devices within the data transmission range of the base unit.

At Block D in FIG. 26, radio receiving circuit 416 determines whether it has received a transmitted carrier signal on its receiving antenna element 415. If it has, then the radio receiving circuit generates a system controller activation signal A.sub.7 which activates base unit system controller 419 shown in FIG. 25. Then at Block E, the base unit system controller activates (i.e., enables) data packet storage buffer 418 and data packet frame check module 420 by producing activation control signals E.sub.SB=1 and E.sub.PFC=1, respectively. At Block D, the base unit system controller determines whether it has received an acknowledgement (i.e., control activation signal A.sub.PFC=1) from the data packet frame check module, indicating that the received data packet is properly framed. If the received data packet is not properly framed, then the base unit returns to Block A in order to redetect an incoming carrier signal. However, if the received data packet is properly framed, then at Block G the base unit system controller enables the transmitter number identification module by generating enable signal E.sub.TID=1.

At Block H, the base unit system controller determines whether it has received an acknowledgment (i.e., control activation signal A.sub.TID=1) from the transmitter number identification module that the received data packet contains the correct transmitter identification number (i.e., the same number assigned to the base unit and stored in storage unit 417). If the Transmitter Identification Number contained within the received data packet does not match the Base Unit Identification Number stored in storage unit 417, then the base unit system controller returns to Block A, whereupon it resumes carrier signal detection. If, however, the Transmitter Identification Number contained in the received data packet matches the Base Unit Identification Number, then at Block I the base unit system controller enables the data packet number identification module 422 by generating enable signal E.sub.DPID=1.

At Block J in FIG. 26, the base unit system controller determines whether it has received an acknowledgment (i.e., control activation signal A.sub.DPID=1) from the data packet identification module indicating that the received data packet is not a redundant data packet (i.e., from the same transmitted at a packet group). If the received data packet is a redundant data packet, then the base unit system controller returns to Block A, whereupon carrier signal detection is resumed. If, however, the received data packet is not redundant, then at Block K the base unit system controller enables symbol character data extraction module 423 by generating enable signal E.sub.DE=1. At Block L, the symbol data extraction module reads the symbol character data contained in the received data packet, checks the data for statistical reliability, and the writes the extracted symbol character data bytes into a storage buffer (not explicitly shown). Then as indicated at Block M, the base unit system controller enables the data format conversion module 424 by generating enable signal E.sub.DFC=1. In response to this enable signal, data format conversion module 424 converts the data format of the retrieved symbol character data and then buffers the format-converted symbol character data bytes.

When the data format conversion process is successfully completed, the base unit system controller proceeds to Block N and enables the serial data transceiver circuit 426 by generating enable signal E.sub.DSW=1. At this stage of the control process, the format-converted data is transmitted from serial data transceiver circuit 426, to the serial data input port of host computer system 64 using serial data transmission techniques well known in the art. When the serial data transmission process is successfully completed, the base unit system controller enables at Block O the acoustical acknowledgement signal generation circuit 425 by producing enable signal E.sub.AA=1. In response to the production of this enable signal, acoustical acknowledgment signal generation circuit 425 generates a high intensity acoustical signal, as described above, in order to inform the user that a transmitted data packet has been received and that the symbol character data packaged therein has been successfully recovered and transmitted to the host computer. Thereafter, the base unit system controller returns to the Block A, as shown.

The fifth illustrative embodiment of the base unit of the present invention will now be described in greater detail with reference to FIGS. 27 to 30.

Figure 27:
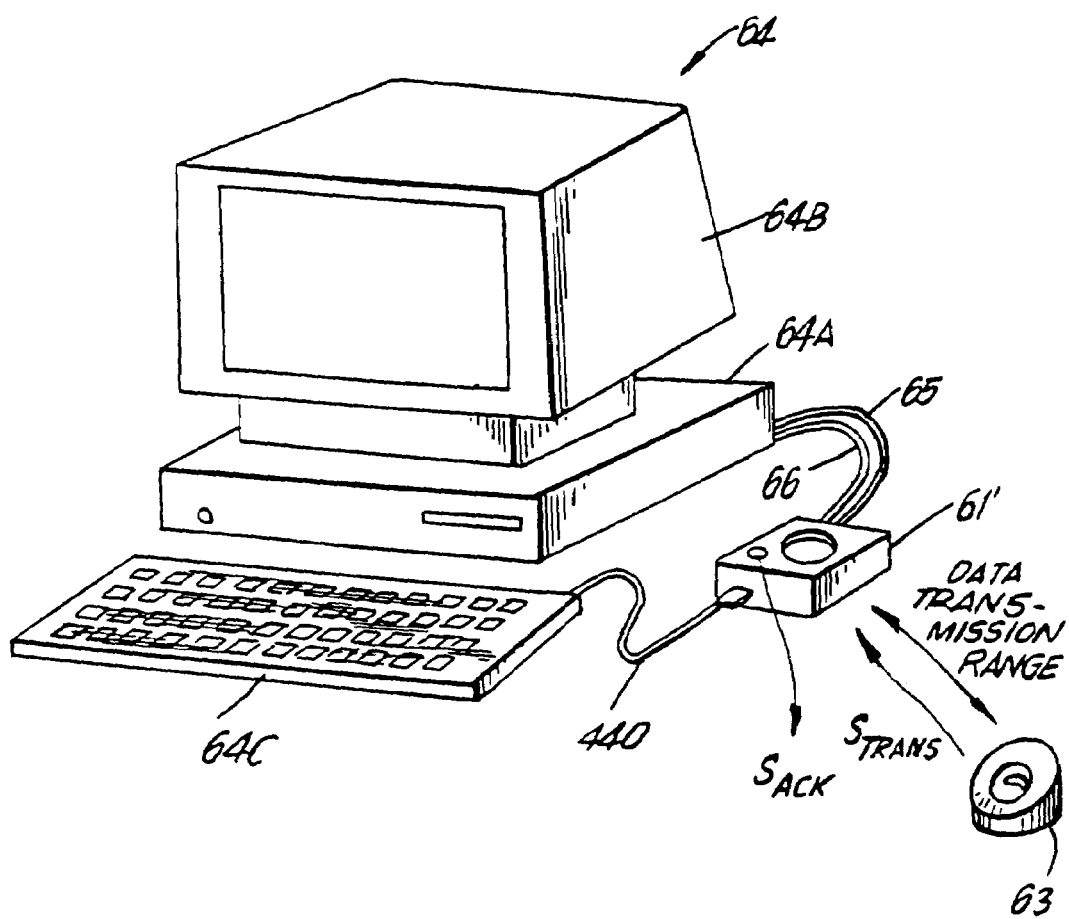
FIG. 27 is a perspective view of a desktop computer workstation, with which the desktop bar code symbol reading system of the present invention is installed.

As shown in FIG. 27, base unit 61' is similar in many respects to the fourth illustrative embodiment of the base unit, shown in FIGS. 6A to 6D and FIG. 24C. As shown, base unit 61' is interfaced with host computer system (e.g., desk-top computer) 64 having a CPU 64A, video display monitor 64B and a keyboard 64C. CPU 64A is interfaced with base unit 61' by way of serial data communication cable 65, and keyboard 64C is interfaced with base unit 61 by way of serial data communication cable 440. Power cable 66 is connected to a connector jack on PC board 68' inside base unit 61' and supplies electrical power to primary transformer 67 by way of wires 69 and a conventional current chopper circuit 412 on PC board 68'. As shown, PC board 68' is mounted on base plate 400, whereas keyboard cable input jack 440 is mounted on base plate 400, for receiving the connector cable of a conventional keyboard. Base unit housing 73' is adapted to snap-fit onto base plate 400. As shown, base unit housing 73 has a keyboard jack aperture 441 to permit a keyboard connector insert into keyboard cable input jack 440. Circular aperture 404 is provided in the top panel of housing 73' to permit the energy of acoustical acknowledgment signals emanate from the electroacoustical transducer 445 mounted on PC board 68'.

As shown in FIG. 29, base unit 61' comprises substantially the same hardware and software components employed in the fourth illustrative embodiment of the base unit shown in FIG. 25, namely: power supply circuit 273; receiving antenna element 415; RF carrier signal receiver circuit 416; base unit identification number storage unit 417; data packet storage buffer 418; base unit system controller 419; data packet frame check module 420; transmitter number identification module 421; data packet number identification module 422; symbol character data extraction module 423; an ASCII-Data-to-Keyboard-Scancode conversion module 442; acoustical acknowledgment signal generation circuit 425; and data switching circuit 443. In the illustrative embodiment, a programmed microprocessor and associated memory (i.e., ROM and RAM) mounted on PC board 68', indicated by referenced numeral 430, are used to realize base unit system controller 419 and each of the above-described data processing modules 418 to 424 and 442. The details of such a programming implementation are known by those with ordinary skill in the art to which the present invention pertains.

As shown in FIG. 29, the output of the symbol character data extraction module is provided to ASCII-Data-to-Keyboard-Scancode conversion module 442. Also, the serial data output port of ASCII-Data-to-Keyboard-Scancode conversion module 442 is connected to one data input port of data switching circuit 443, whereas the serial data output port of keyboard 64C is connected to the other data input port of the data switching circuit 443. In turn, the serial data output port of the data switching circuit 443 is connected to the serial data input port of host computer 64, as shown. Notably, the operation of data switching circuit 443 is normally activated (i.e., enabled) independent of base unit system controller 119 so that serial data output from the keyboard is routed through the data switching circuit to the host computer keyboard port. In all other respects, the architecture of base unit 61' is substantially similar to the base unit of the fourth illustrative embodiment.

The overall operation of base unit 61' will be described below with reference to the control process shown in FIG. 30.

Figure 30:
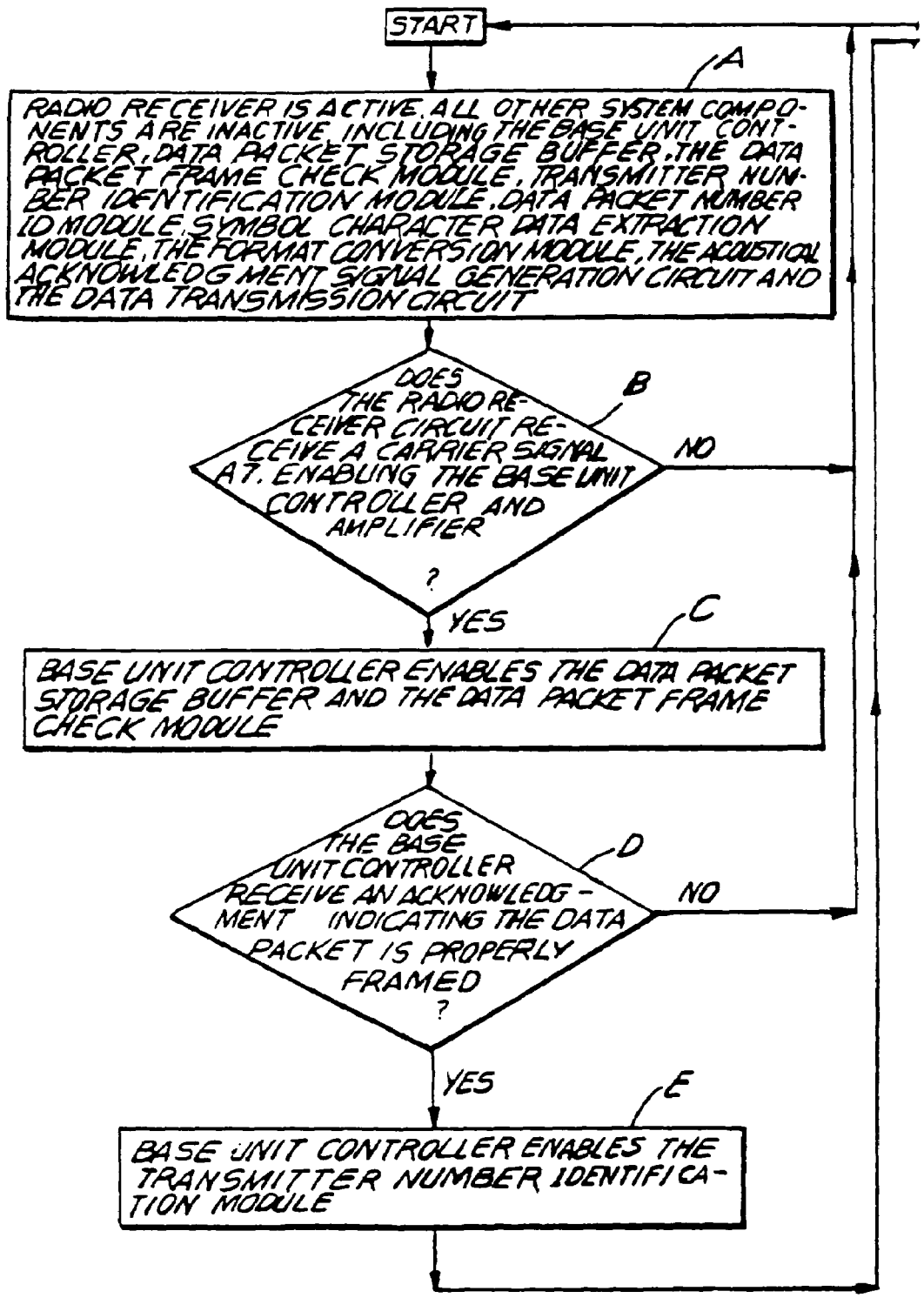
FIG. 30 is a flow chart illustrating the steps performed during the control process carried out within the keyboard-interface base-unit of FIG. 28C.
Figure 30A:
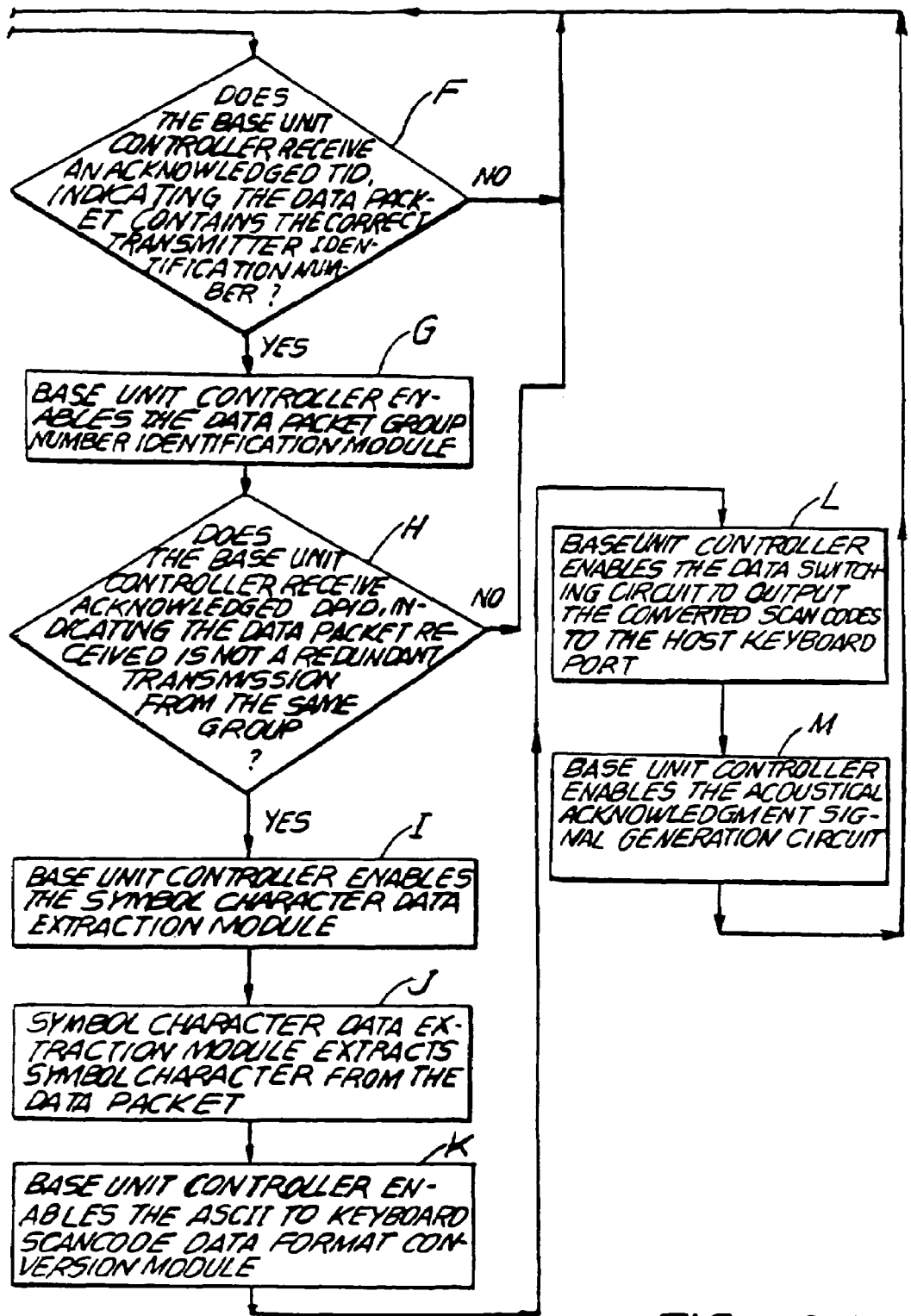

At control Block A in FIG. 30, radio receiving circuit 415 is the only active system component; all other system components are inactive (i.e., disabled) including base unit system controller 419, data packet storage buffer 418, data packet frame check module 420, transmitter number identification module 421, data packet number identification module 422, symbol character data extraction module 423, ASCII-Data-to-Keyboard-Scancode format conversion module 424, and acoustical acknowledgment signal generation circuit 425. With the radio receiving circuit 416 activated, base unit 61' is capable of receiving any modulated carrier signal transmitted from any of the bar code symbol reading devices within the data transmission range of the base unit.

At Block B in FIG. 30, radio receiving circuit 415 determines whether it has received a transmitted carrier signal on its receiving antenna element 415. If it has, then the radio receiving circuit generates a system controller activation signal $A.sub.7$, which activates base unit system controller 419. Then at Block C, the base unit system controller activates (i.e, enables) data packet storage buffer 418 and data packet frame check module 420 by producing activation control signals $E.sub.SB=1$ and $E.sub.PFC=1$, respectively. At Block D, the base unit system controller determines whether it has received an acknowledgment (i.e., control activation signal $A.sub.PFC=1$) from the data packet frame check module, indicating that the received data packet is properly framed. If the received data packet is not properly framed, then the base unit returns to Block A in order to redetect an incoming carrier signal. However, if the received data packet is properly framed, then at Block E the base unit system controller enables the transmitter number identification module by generating enable signal $E.sub.TID=1$.

At Block F, the base unit system controller determines whether it has received an acknowledgment (i.e., control activation signal $A.sub.TID=1$) from the transmitter number identification module that the received data packet contains the correct transmitter identification number (i.e., the same number assigned to the base unit and stored in storage unit 417). If the Transmitter Identification Number contained within the received data packet does not match the Base Unit Identification Number stored in storage unit 417, then the base unit system controller returns to Block A, whereupon it resumes carrier signal detection. If, however, the Transmitter Identification Number contained in the received data packet matches the preassigned Base Unit Identification Number, then at Block G the base unit system controller enables the data packet number identification module 422 by generating enable signal $E.sub.DPID=1$.

At Block H in FIG. 26, the base unit system controller determines whether it has received an acknowledgment (i.e., control activation signal $A.sub.DPID=1$ from the data packet identification module indicating that the received data packet is not a redundant data packet (i.e., from the same transmitted data packet group). If the received data packet is a redundant data packet, then the base unit system controller returns to Block A, whereupon carrier signal detection is resumed. If, however, the received data packet is not redundant, then at Block I the base unit system controller enables symbol character data extraction module 423 by generating enable signal $E.sub.DE=1$. At Block J, the symbol data extraction module reads the symbol character data contained in the received data packet, checks the data for statistical reliability, and then writes the extracted symbol character data bytes into a storage buffer (not explicitly shown). Then as indicated at Block K, the base unit system controller enables the ASII-data-to-Keyboard-Data format conversion module 442 by generating enable signal $E.sub.DFC=1$. In response to this enable signal, data format conversion module 442 converts the data format of the retrieved symbol character data and then buffers the format-converted symbol character data bytes.

When the data format conversion process is successfully completed, the base unit system controller proceeds to Block L and enables data switching circuit 443 to output the converted scan codes to the host keyboard port, by generating enable signal $E.sub.DSW=1$. At this stage of the control process, the format-converted data is transmitted through data switching circuit 443 to the serial data keyboard input port of host computer system 64, using serial data transmission techniques well known in the art. When the serial data transmission process is successfully completed, the base unit system controller enables, at Block M, the acoustical acknowledgement signal generation circuit 425 by producing enable signal $E.sub.AA=1$. In response to the production of this enable signal, acoustical acknowledgment signal generation circuit 425 generates a high intensity acoustical signal, as described above, in order to inform the user that a transmitted data packet has been received and that the symbol character data packaged therein has been successfully recovered and transmitted to the host computer. Thereafter, the base unit system controller returns to the Block A, as shown.

It is appropriate at this juncture to illustrate the automatic hands-on and hands-free modes of operation of the system while utilized in different mounting installations. For purposes of illustration only, the system of the first illustrative embodiment shown in FIGS. 1 to 3A will be used to illustrate such mounting illustrations.

A point-of-sale station is shown in FIGS. 31A to 31D, as comprising an electronic cash register 6 operably connected to the automatic bar code reading system of the first illustrative embodiment by way of flexible communication cable 7. Low voltage DC power is provided to base unit 3 by way of flexible power supply cable 8. In this particular mounting installation, base unit 3 is supported on a horizontal countertop surface. If necessary or desired in such mounting installations, the base plate of base unit 3 may be weighted by affixing one or more dense mass elements to the upper surface of the base plate.

Figure 31A:
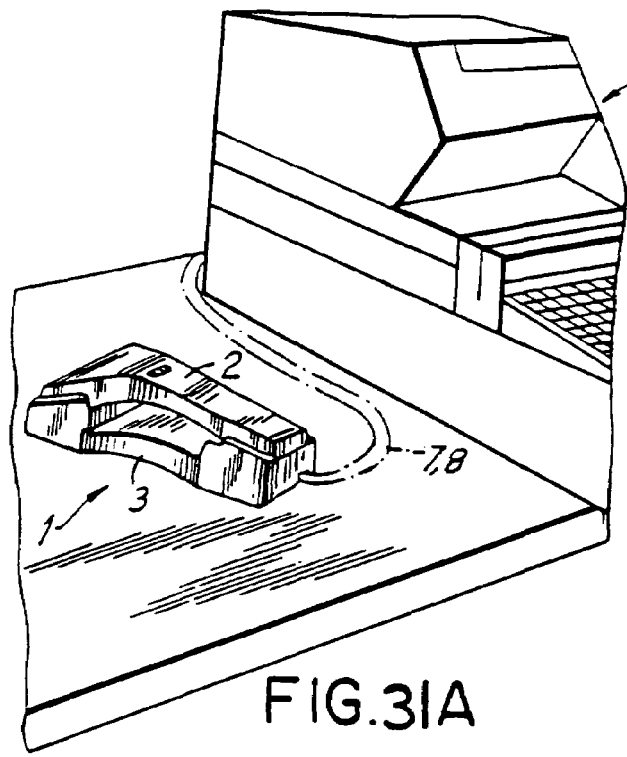
FIGS. 31A to 31D are perspective views of a point-of-sale system, showing the countertop base unit of FIG. 15C supported on a horizontal countertop surface and operably connected to an electronic cash register, with the automatic hand-supportable bar code symbol reading device of FIG. 1 being used in its hand-held short-range mode of operation.
Figure 31B:
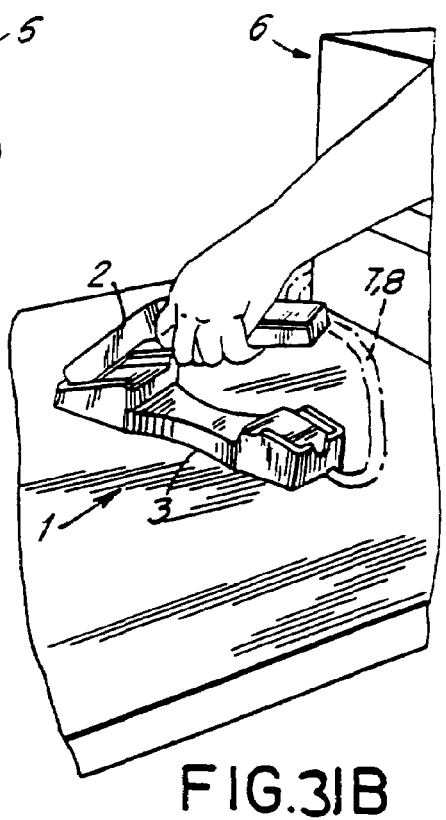

With automatic bar code reading device 2 supported within scanner support stand portion of the base unit, as shown in FIG. 31A, the system is automatically induced into its automatic long-range hands-free mode of operation. However, owing to the positioning of both object detection and scan fields in this mounting installation, only bar code symbols located on small, very low profile objects can be easily read. In order to induce the system into its short-range hands-on mode of operation, the user simply encircles the handle portion of the hand-supportable device with his or her fingers, and then lifts the device out of the scanner support stand, as shown in FIG. 31B. Upon lifting the device out of its stand, the range selection circuit 115 (e.g., including a Halt-effect magnetic flux sensor (mounted in the handle of the housing) detects the absence of magnetic flux produced from a permanent magnet mounted in the support stand, and automatically generates the short-range control activation signal (i.e., R.sub.1=0). The details of this range mode-selection mechanism can be found in copending application Ser. No. 07/761,123, supra.

Figure 31C:
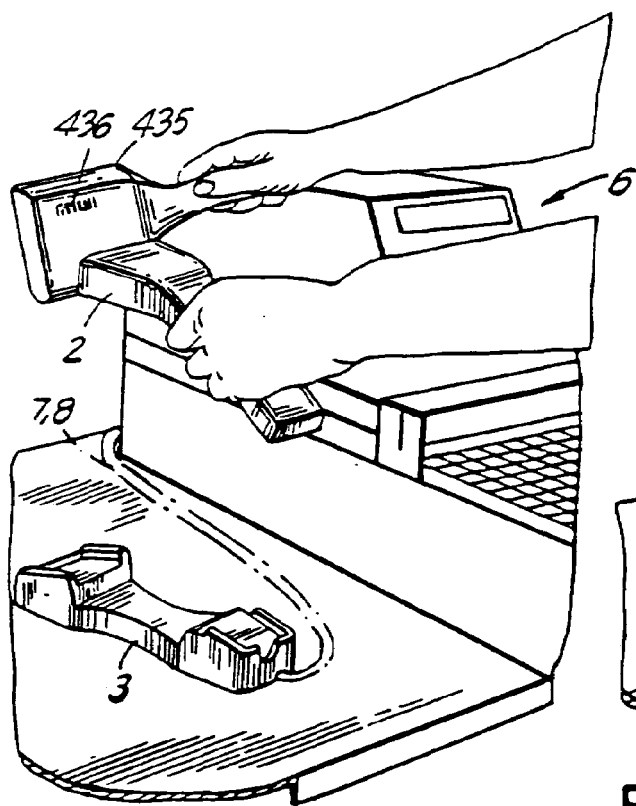
Figure 31D:
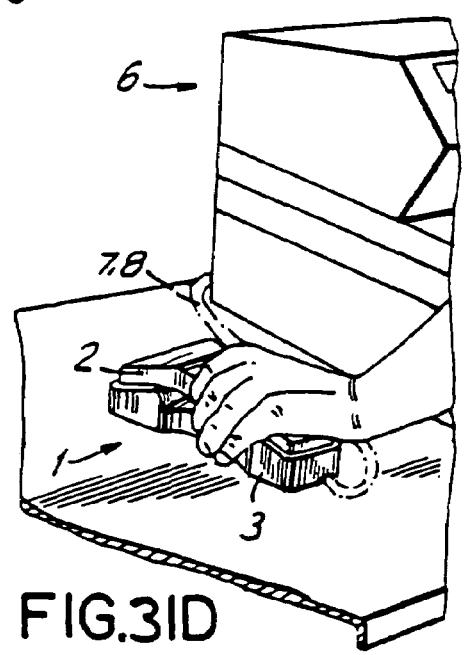

With the automatic bar code reading device held in the user's hand, and a bar coded object 435 in the other hand, the object is moved into the short-range portion of the object detection field as shown in FIG. 31C, where the object is automatically detected, and bar code symbol 436 automatically scanned while the visible laser beam is repeatedly scanned across the scan field. After the bar code symbol has been successfully read (i.e., detected and decoded) and a transmitted data packet containing symbol character data has been received and processed at base unit 3 in a manner described hereinabove, a highly audible acoustical acknowledgement signal sack of a predetermined pitch is produced from the base unit. Thereafter, the bar code reading device is placed back within the scanner support stand, as shown in FIG. 31D, where it is once again induced into its long-range hands-free mode of operation.

In FIGS. 32 to 33B, a point-of-sale station is shown comprising the automatic bar code reading system of the present invention operably connected to electronic cash register 6 by way of flexible communication and power supply cables 7 and 8. In this particular mounting installation, base unit 3 and its associated scanner support stand are pivotally supported above a horizontal counter surface by way of a pivotal joint assembly 265 connected to pedestal base 266 mounted under the electronic cash register, as shown. When installed in the manner illustrated, scanner support stand 3 can be adjustably positioned and locked into virtually any orientation in three-dimensional space, owing to the three principle degrees of freedom provided by the pivotal joint assembly.

With automatic bar code reading device positioned within scanner stand portion of base unit 3 as shown in FIG. 32, the system is automatically induced into its long-range hands-free mode of operation by way of the magnetic flux sensing technique disclosed in copending application Ser. No. 07/761,123. By simply moving object 435 into the object detection field, the bar code symbol 436 is repeatedly scanned by the visible laser beam scanned across the scan field. To induce the automatic bar code reading system into its short-range hands-on mode of operation, the user simply grasps the automatic bar code reading device and lifts it out of the scanner support stand, as illustrated in FIG. 33A. Then, by placing object 435 into the short-range portion of the object detection field as shown in FIG. 33B, the object is automatically detected and bar code symbol 436 scanned by the visible laser beam repeatedly scanned across the scan field. After the bar code symbol has been successfully read and an audible acoustical acknowledgment signal produced as herebefore described, the automatic bar code reading device can be placed back into the scanner support stand, automatically inducing the system into its long-range hands-free mode of operation.

Having described the preferred embodiments of the present invention, several modifications come to mind.

For example, in alternative embodiments of the present invention, the automatic portable bar code symbol reading device may not incorporate within its housing, electronic circuitry for carrying out control, decoding and other data processing functions. Instead such electronic circuitry may be contained within a remote unit operably associated with the hand-supportable device by way of the flexible scanner cable. In such embodiments, the hand-supportable device will function as an automatic hand-supportable laser scanner, rather than a bar code symbol reader.

The automatic bar code reading system of the present invention is capable of performing a wide variety of complex decision-making operations in real-time, endowing the system with a level of intelligence hitherto unattained in the bar code symbol reading art. Within the spirit of the present invention, additional decision-making operations may be provided to further enhance the capabilities of the system.

While the particular illustrative embodiments shown and described above will be useful in many applications in code symbol reading, further modifications to the present invention herein disclosed will occur to persons with ordinary skill in the art. All such modifications are deemed to be within the scope and spirit of the present invention defined by the appended claims to invention.

We claim:
1. A system for reading code symbols comprising:
    (A) a code symbol reading device including
        (1) a housing supportable upon and/or in a hand of a user of said code symbol reading device, and having a light transmission aperture through which optical energy can exit from and enter into said housing,
        (2) a light producing mechanism, disposed in said housing, for producing optical energy,
        (3) a light projecting mechanism, disposed in said housing, for projecting said optical energy into a scan field defined external to said first housing and onto a code symbol on an object located in at least a portion of said scan field, (4) a light detecting mechanism, disposed in said housing, for detecting optical energy reflected off said code symbol and passing through said light transmission aperture as said optical energy is projected onto said code symbol present in said scan field, and, for automatically producing scan data indicative of said detected optical energy, (5) a scan data processing mechanism for processing produced scan data in order to detect and decode said code symbol when said code is present in said scan field and automatically producing symbol character data in a form representative of said decoded symbol, (6) a control mechanism for automatically controlling the operation of at least two of said light producing mechanism, said light projecting mechanism, and said scan data processing mechanism, (7) a data packet construction mechanism for constructing a data packet using said symbol character data produced from said scan data processing mechanism;

(8) a carrier signal generation mechanism for generating an electromagnetic carrier signal;

(9) a carrier signal modulation mechanism for modulating said carrier signal using said data packet; and

(10) a carrier signal transmitting mechanism for transmitting said modulated carrier signal across a data transmission range; and (B) a base unit positionable within the data transmission range of said carrier signal transmitting mechanism and including:

(1) a carrier signal receiving mechanism for receiving said modulated carrier signal transmitted from said carrier signal transmitting mechanism, (2) a carrier signal demodulation mechanism for demodulating said modulated carrier signal so as to recover said data packet, (3) a data packet processing mechanism for processing said recovered data packet to recover said symbol character data therefrom, and (4) an acknowledgment signal producing mechanism for automatically producing, in response to the recovery and storage of said symbol character data, an acknowledgment signal perceptible to the user of said code symbol reading device when said user is situated within said data transmission range, so as to inform said user that said symbol character data produced by said scan data processing mechanism has been received and recovered at said base unit.

2. A system for reading bar code symbols comprising:

(A) an automatic bar code symbol device including (1) a housing having a light transmission aperture through which optical energy can exit from and enter into said housing, said housing supportable upon and/or in a hand of a user of said automatic bar code symbol reading device, (2) a laser beam generator, disposed in said housing, for producing a laser beam, (3) a laser beam scanning mechanism, disposed in said housing, for repeatedly scanning said laser beam across a scan field defined external to said housing and across a bar code symbol on an object located in at least a portion of said scan field, (4) a light detector, disposed in said housing, for detecting laser light reflected off said bar code symbol and passing through said light transmission aperture as said laser beam is repeatedly scanned across said bar code symbol present in said scan field, and for automatically producing scan data indicative of said detected light, (5) a scan data processing mechanism for processing produced scan data so as to detect and decode said bar code symbol when said bar code is present in said scan field and for automatically producing symbol character data in a form representative of said decoded bar code symbol, (6) a control mechanism for automatically controlling the operation of at least two of said laser beam generator, said laser beam scanning mechanism, and said scan data processing mechanism, (7) a data packet construction mechanism for constructing a data packet using said symbol character data produced from said scan data processing mechanism;

(8) a carrier signal generation mechanism for generating an electromagnetic carrier signal;

(9) a carrier signal modulation mechanism for modulating said carrier signal using said data packet, and

(10) a carrier signal transmitting mechanism for transmitting said modulated carrier signal over a data transmission range; and (B) a base unit positionable within the data transmission range and including:

(1) a carrier signal receiving mechanism for receiving said modulated carrier signal transmitted from said carrier signal transmitting mechanism, (2) a carrier signal demodulation mechanism for demodulating said modulated carrier signal so as to recover said data packet, (3) a data packet processing mechanism for processing said recovered data packet so as to recover said symbol character data therefrom, (4) a data packet buffering mechanism for buffering said symbol character data recovered from said data packet processing mechanism, and (5) an acknowledgment signal producing mechanism for automatically producing, in response to the recovery of said symbol character data, an acknowledgment signal perceptible to the user of said automatic bar code symbol reading device when said user is situated within said data transmission range, so as to inform said user that said symbol character data processed by said scan data processing mechanism has been received and recovered at said base unit.

3. An automatic bar code symbol reading device comprising:

a housing including a removable attachment mechanism for removably attaching the housing to an arm of a user, the housing having a light transmission window permitting entry and exit of optical energy, wherein laser and object detection fields extend laterally transverse to the pointing direction of the hand of the user on which the bar code symbol reading device is mounted;

an automatic bar code symbol reading mechanism in the housing for automatically reading a bar code symbol on an object disposed in at least a portion of a scan field defined external to the housing, and for automatically producing symbol character data representative of the bar code symbol; and a wireless data transmission mechanism in the housing for generating and transmitting an electromagnetic carrier signal modulated by the produced symbol character data.

4. An automatic bar code symbol reading device comprising:
a housing having an optical transmission aperture and an interior volume of approximately 1.7 cubic inches or less;
an object detector in the housing for detecting an object located within at least a portion of a scan field defined external to the optical transmission aperture, and for automatically generating a first activation signal indicative of the detection of the object in at least a portion of the scan field;
a scan data producing mechanism in the housing for producing scan data from the detected object located in the scan field, the scan data producing mechanism including:
(a) a laser beam source in the housing for producing a beam of optical energy, and
(b) a laser beam scanner for projecting the beam through the optical transmission aperture and for repeatedly scanning the beam across the scan field, such that the beam is incident upon a bar code symbol on the detected object, and
(c) an optical detector for detecting optical energy reflected off the bar code symbol and passing through said optical transmission aperture, and for automatically producing scan data indicative of the detected optical energy;
a bar code symbol detection circuit in the housing for processing produced scan data so as to detect the bar code symbol on the detected object, and for automatically generating a second activation signal in response to the detection of the bar code symbol;
a programmed microprocessor in the housing for processing produced scan data so as to decode said detected bar code symbol, and for automatically producing symbol character data representative of the decoded bar code symbol in response to the decoding of the detected bar code symbol; and
a system control mechanism for automatically activating the scan data producing mechanism and the bar code symbol detection circuit for up to a first predetermined time period in response to the generation of the first activation signal, and for automatically activating said scan data producing mechanism and the programmed microprocessor for up to a second predetermined time period in response to the generation of the second activation signal.

5. A portable bar code symbol reading device comprising:
a hand-supportable housing of lightweight, compact construction;
a bar code symbol reading engine within the hand-supportable housing, the bar code symbol reading engine including
a receiver for receiving a data packet modulated electromagnetic carrier signal transmitted from a portable bar code symbol reading device; the receiver including a carrier signal demodulator for demodulating the modulated carrier signal and for recovering the symbol character data;
a data storage mechanism for storing the recovered symbol character data;
an acoustical acknowledgment signal generator for generating an audible acoustical acknowledgment signal upon recovering the symbol character data from the carrier signal demodulator; and
a data transmission mechanism in the compact housing for transmitting the recovered symbol character data from the data storage mechanism to an input port of a host device.

6. A portable data collection device for receiving symbol character data transmitted over a data packet modulated electromagnetic carrier signal, the portable data collection device comprising:
a compact housing of lightweight construction;
a receiver in the compact housing for receiving the data packet modulated electromagnetic carrier signal transmitted from a portable bar code symbol reading device;
a carrier signal demodulator in the compact housing for demodulating the modulated carrier signal and recovering the symbol character data;
a data storage mechanism for storing the recovered symbol character data;
an acoustical acknowledgment signal generating mechanism in the compact housing for producing an audible acoustical acknowledgment signal upon recovering the symbol, character data from the carrier signal demodulator; and
a data transmission mechanism in the compact housing for transmitting the recovered symbol character data from the data storage means to an input port of a host device.

7. A method of receiving symbol character data transmitted over a data packet modulated electromagnetic carrier signal, the method comprising the steps of:
(a) receiving, at a base unit, a data packet modulated electromagnetic carrier signal transmitted from a portable bar code symbol reading device;
(b) demodulating, at said base unit, the modulated carrier signal and recovering the symbol character data from the demodulated carrier signal;
(c) storing, in said base unit, the recovered symbol character data; and
(d) generating, at said base unit, an audible acoustical acknowledgment signal after recovering the symbol character data.

8. A method of reading bar code symbols, the method comprising the steps of:
(a) reading a bar code symbol on an object present in at least a portion of a scan field defined externally with respect to a portable bar code symbol reading device, and automatically producing symbol character data in a form representative of the bar code symbol;
(b) using the produced symbol character data to construct a data packet within the bar code symbol reading device;
(c) generating an electromagnetic carrier signal within the bar code symbol reading device;
(d) modulating the generated carrier signal using the constructed data packet;
(e) transmitting the modulated carrier signal from the portable bar code symbol reading device over a data transmission range;
(f) receiving the transmitted modulated carrier signal at a base unit positioned within the data transmission range of the portable bar code symbol reading device;
(g) demodulating the modulated carrier signal at the base unit so as to recover the data packet;
(b) processing the recovered data packet so as to recover the symbol character data therefrom; and (i) in response to the recovery of the symbol character data, automatically producing from the base unit, an acoustical acknowledgment signal perceptible to the user of the portable bar code symbol reading device when said user is situated within the data transmission range, so as to inform the user that the symbol character data produced by the scan data processing means has been received and recovered at the base unit.

* * * * *